US012810325B2

(12) United States Patent
Azmoodeh et al.

(10) Patent No.: US 12,810,325 B2
(45) **Date of Patent: *Nov. 24, 2026**

(54) MUTABLE GEO-FENCING SYSTEM

(71) Applicant: Snap Inc., Santa Monica, CA (US)

(72) Inventors: Farnaz Azmoodeh, Venice, CA (US); Peter Sellis, Venice, CA (US); Jinlin Yang, Redondo Beach, CA (US)

(73) Assignee: Snap Inc., Santa Monica, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 18/508,771

(22) Filed: Nov. 14, 2023

(65) Prior Publication Data

US 2024/0086968 A1 Mar. 14, 2024

Related U.S. Application Data

(63) Continuation of application No. 15/474,821, filed on Mar. 30, 2017, now Pat. No. 11,900,418.
(Continued)

(51) Int. Cl.
*G06Q 30/0251* (2023.01)
*G06Q 30/0272* (2023.01)
(Continued)

(52) U.S. Cl.
CPC ..... *G06Q 30/0261* (2013.01); *G06Q 30/0272* (2013.01); *H04M 15/58* (2013.01);
(Continued)

(58) Field of Classification Search
CPC ........... G06Q 30/0261; G06Q 30/0272; G06Q 30/0271; H04M 15/58; H04M 15/8033;
(Continued)

(56) References Cited

U.S. PATENT DOCUMENTS

| | | | |
|---|---|---|---|
| 666,223 | A | 1/1901 | Shedlock |
| 4,581,634 | A | 4/1986 | Williams |

(Continued)

FOREIGN PATENT DOCUMENTS

| | | | |
|---|---|---|---|
| CA | 2887596 | A1 | 7/2015 |
| CA | 2894332 | C | 8/2018 |

(Continued)

OTHER PUBLICATIONS

US 10,503,924 B1, 12/2019, Murphy et al. (withdrawn)

(Continued)

*Primary Examiner* — Tarek Elchanti
(74) *Attorney, Agent, or Firm* — Schwegman Lundberg & Woessner, P.A.

(57) ABSTRACT

In various embodiments, boundaries of geo-fences can be made mutable based on principles described herein. The term "mutable" refers to the ability of a thing (in this case, the boundary of a geo-fence) to change and adjust. In a typical embodiment, a mutable geo-fence system is configured to generate and monitor a geo-fence that encompasses a region, in order to dynamically vary the boundary of the geo-fence based on a number of boundary variables. The term "geo-fence" as used herein describes a virtual perimeter (e.g., a boundary) for a real-world geographic area. A geo-fence could be a radius around a point (e.g., a store), or a set of predefined boundaries. Boundary variables, as used herein, refers to a set of variables utilized by the mutable geo-fence system in determining a location of the boundary of the geo-fence.

20 Claims, 10 Drawing Sheets

Related U.S. Application Data

(60) Provisional application No. 62/318,049, filed on Apr. 4, 2016.

(51) Int. Cl.
*H04M 15/00* (2024.01)
*H04W 4/021* (2018.01)
*H04W 4/24* (2024.01)

(52) U.S. Cl.
CPC ....... *H04M 15/8033* (2013.01); *H04W 4/022* (2013.01); *H04W 4/24* (2013.01)

(58) Field of Classification Search
CPC ......... H04W 4/022; H04W 4/24; H04W 4/23; H04W 4/023
USPC ............. 705/14.58, 14.43; 455/405; 707/754
See application file for complete search history.

(56) References Cited

U.S. PATENT DOCUMENTS

| | | | |
|---|---|---|---|
| 4,975,690 | A | 12/1990 | Torres |
| 5,072,412 | A | 12/1991 | Henderson, Jr. et al. |
| 5,493,692 | A | 2/1996 | Theimer et al. |
| 5,539,395 | A | 7/1996 | Buss et al. |
| 5,713,073 | A | 1/1998 | Warsta |
| 5,754,939 | A | 5/1998 | Herz et al. |
| 5,855,008 | A | 12/1998 | Goldhaber et al. |
| 5,883,639 | A | 3/1999 | Walton et al. |
| 5,999,932 | A | 12/1999 | Paul |
| 6,012,098 | A | 1/2000 | Bayeh et al. |
| 6,014,090 | A | 1/2000 | Rosen et al. |
| 6,029,141 | A | 2/2000 | Bezos et al. |
| 6,038,295 | A | 3/2000 | Mattes |
| 6,049,711 | A | 4/2000 | Yehezkel et al. |
| 6,075,535 | A | 6/2000 | Fitzhugh et al. |
| 6,154,764 | A | 11/2000 | Nitta et al. |
| 6,158,044 | A | 12/2000 | Tibbetts |
| 6,167,435 | A | 12/2000 | Druckenmiller et al. |
| 6,204,840 | B1 | 3/2001 | Petelycky et al. |
| 6,205,432 | B1 | 3/2001 | Gabbard et al. |
| 6,216,141 | B1 | 4/2001 | Straub et al. |
| 6,285,381 | B1 | 9/2001 | Sawano et al. |
| 6,285,987 | B1 | 9/2001 | Roth et al. |
| 6,290,504 | B1 | 9/2001 | Benitz et al. |
| 6,310,694 | B1 | 10/2001 | Okimoto et al. |
| 6,317,789 | B1 | 11/2001 | Rakavy et al. |
| 6,334,149 | B1 | 12/2001 | Davis, Jr. et al. |
| 6,349,203 | B1 | 2/2002 | Asaoka et al. |
| 6,353,170 | B1 | 3/2002 | Eyzaguirre et al. |
| 6,363,380 | B1 | 3/2002 | Dimitrova |
| 6,446,004 | B1 | 9/2002 | Cao et al. |
| 6,449,657 | B2 | 9/2002 | Stanbach et al. |
| 6,456,852 | B2 | 9/2002 | Bar et al. |
| 6,484,196 | B1 | 11/2002 | Maurille |
| 6,487,586 | B2 | 11/2002 | Ogilvie et al. |
| 6,487,601 | B1 | 11/2002 | Hubacher et al. |
| 6,499,016 | B1 | 12/2002 | Anderson |
| 6,523,008 | B1 | 2/2003 | Avrunin |
| 6,542,749 | B2 | 4/2003 | Tanaka et al. |
| 6,549,768 | B1 | 4/2003 | Fraccaroli |
| 6,618,593 | B1 | 9/2003 | Drutman et al. |
| 6,622,174 | B1 | 9/2003 | Ukita et al. |
| 6,631,463 | B1 | 10/2003 | Floyd et al. |
| 6,636,247 | B1 | 10/2003 | Hamzy et al. |
| 6,636,855 | B2 | 10/2003 | Holloway et al. |
| 6,643,684 | B1 | 11/2003 | Malkin et al. |
| 6,658,095 | B1 | 12/2003 | Yoakum et al. |
| 6,665,531 | B1 | 12/2003 | Soderbacka et al. |
| 6,668,173 | B2 | 12/2003 | Greene |
| 6,684,238 | B1 | 1/2004 | Dutta |
| 6,684,257 | B1 | 1/2004 | Camut et al. |
| 6,698,020 | B1 | 2/2004 | Zigmond et al. |
| 6,700,506 | B1 | 3/2004 | Winkler |
| 6,701,347 | B1 | 3/2004 | Ogilvie |
| 6,711,608 | B1 | 3/2004 | Ogilvie |
| 6,720,860 | B1 | 4/2004 | Narayanaswami |
| 6,724,403 | B1 | 4/2004 | Santoro et al. |
| 6,757,713 | B1 | 6/2004 | Ogilvie et al. |
| 6,832,222 | B1 | 12/2004 | Zimowski |
| 6,834,195 | B2 | 12/2004 | Brandenberg et al. |
| 6,836,792 | B1 | 12/2004 | Chen |
| 6,898,626 | B2 | 5/2005 | Ohashi |
| 6,922,634 | B2 | 7/2005 | Odakura et al. |
| 6,959,324 | B1 | 10/2005 | Kubik et al. |
| 6,970,088 | B2 | 11/2005 | Kovach |
| 6,970,907 | B1 | 11/2005 | Ullmann et al. |
| 6,980,909 | B2 | 12/2005 | Root et al. |
| 6,981,040 | B1 | 12/2005 | Konig et al. |
| 7,004,394 | B2 | 2/2006 | Kim |
| 7,020,494 | B2 | 3/2006 | Spriestersbach et al. |
| 7,027,124 | B2 | 4/2006 | Foote et al. |
| 7,072,963 | B2 | 7/2006 | Anderson et al. |
| 7,085,571 | B2 | 8/2006 | Kalhan et al. |
| 7,110,744 | B2 | 9/2006 | Freeny, Jr. |
| 7,124,091 | B1 | 10/2006 | Khoo et al. |
| 7,124,164 | B1 | 10/2006 | Chemtob |
| 7,142,823 | B1 | 11/2006 | Logue et al. |
| 7,149,893 | B1 | 12/2006 | Leonard et al. |
| 7,173,651 | B1 | 2/2007 | Knowles |
| 7,188,143 | B2 | 3/2007 | Szeto |
| 7,203,380 | B2 | 4/2007 | Chiu et al. |
| 7,206,568 | B2 | 4/2007 | Sudit |
| 7,227,937 | B1 | 6/2007 | Yoakum et al. |
| 7,237,002 | B1 | 6/2007 | Estrada et al. |
| 7,240,025 | B2 | 7/2007 | Stone et al. |
| 7,240,089 | B2 | 7/2007 | Boudreau |
| 7,243,163 | B1 | 7/2007 | Friend et al. |
| 7,254,585 | B2 | 8/2007 | Frieden et al. |
| 7,269,426 | B2 | 9/2007 | Kokkonen et al. |
| 7,278,168 | B1 | 10/2007 | Chaudhury et al. |
| 7,280,658 | B2 | 10/2007 | Amini et al. |
| 7,315,823 | B2 | 1/2008 | Brondrup |
| 7,349,768 | B2 | 3/2008 | Bruce et al. |
| 7,356,564 | B2 | 4/2008 | Hartselle et al. |
| 7,376,715 | B2 | 5/2008 | Cunningham et al. |
| 7,394,345 | B1 | 7/2008 | Ehlinger et al. |
| 7,411,493 | B2 | 8/2008 | Smith |
| 7,423,580 | B2 | 9/2008 | Markhovsky et al. |
| 7,454,442 | B2 | 11/2008 | Cobleigh et al. |
| 7,478,402 | B2 | 1/2009 | Christensen et al. |
| 7,496,347 | B2 | 2/2009 | Puranik |
| 7,496,567 | B1 | 2/2009 | Steichen |
| 7,508,419 | B2 | 3/2009 | Toyama et al. |
| 7,512,649 | B2 | 3/2009 | Faybishenko et al. |
| 7,519,670 | B2 | 4/2009 | Hagale et al. |
| 7,535,890 | B2 | 5/2009 | Rojas |
| 7,546,554 | B2 | 6/2009 | Chiu et al. |
| 7,571,244 | B2 | 8/2009 | Costanzo et al. |
| 7,607,096 | B2 | 10/2009 | Oreizy et al. |
| 7,630,724 | B2 | 12/2009 | Beyer, Jr. et al. |
| 7,639,943 | B1 | 12/2009 | Kalajan |
| 7,650,231 | B2 | 1/2010 | Gadler |
| 7,668,537 | B2 | 2/2010 | DeVries |
| 7,703,140 | B2 | 4/2010 | Nath et al. |
| 7,770,137 | B2 | 8/2010 | Forbes et al. |
| 7,778,973 | B2 | 8/2010 | Choi |
| 7,779,444 | B2 | 8/2010 | Glad |
| 7,787,886 | B2 | 8/2010 | Markhovsky et al. |
| 7,796,946 | B2 | 9/2010 | Eisenbach |
| 7,801,954 | B2 | 9/2010 | Cadiz et al. |
| 7,856,360 | B2 | 12/2010 | Kramer et al. |
| 7,856,449 | B1 | 12/2010 | Martino et al. |
| 7,912,896 | B2 | 3/2011 | Wolovitz et al. |
| 7,934,156 | B2 | 4/2011 | Forstall et al. |
| 7,991,638 | B1 | 8/2011 | House et al. |
| 8,001,204 | B2 | 8/2011 | Burtner et al. |
| 8,014,762 | B2 | 9/2011 | Chmaytelli et al. |
| 8,032,586 | B2 | 10/2011 | Challenger et al. |
| 8,063,797 | B1 | 11/2011 | Sonnabend et al. |
| 8,073,947 | B1 | 12/2011 | Yeh et al. |
| 8,082,255 | B1 | 12/2011 | Carlson, Jr. et al. |
| 8,090,351 | B2 | 1/2012 | Klein |
| 8,098,904 | B2 | 1/2012 | Loffe et al. |

(56) References Cited

U.S. PATENT DOCUMENTS 8,099,109 B2 1/2012 Altman et al.
8,112,716 B2 2/2012 Kobayashi
8,127,035 B1 2/2012 Hood et al.
8,131,597 B2 3/2012 Hudetz
8,135,166 B2 3/2012 Rhoads
8,136,028 B1 3/2012 Loeb et al.
8,146,001 B1 3/2012 Reese
8,161,115 B2 4/2012 Yamamoto
8,161,417 B1 4/2012 Lee
8,170,957 B2 5/2012 Richard
8,171,048 B2 5/2012 Ge et al.
8,195,203 B1 6/2012 Tseng
8,199,747 B2 6/2012 Rojas et al.
8,208,943 B2 6/2012 Petersen
8,214,443 B2 7/2012 Hamburg
8,229,473 B1 7/2012 De La Rue
8,234,350 B1 7/2012 Gu et al.
8,238,947 B2 8/2012 Lottin et al.
8,244,593 B2 8/2012 Klinger et al.
8,276,092 B1 9/2012 Narayanan et al.
8,279,319 B2 10/2012 Date
8,280,406 B2 10/2012 Ziskind et al.
8,285,199 B2 10/2012 Hsu et al.
8,287,380 B2 10/2012 Nguyen et al.
8,290,513 B2 10/2012 Forstall et al.
8,301,159 B2 10/2012 Hamynen et al.
8,306,922 B1 11/2012 Kunal et al.
8,312,086 B2 11/2012 Velusamy et al.
8,312,097 B1 11/2012 Siegel et al.
8,312,380 B2 11/2012 Churchill et al.
8,326,315 B2 12/2012 Phillips et al.
8,326,327 B2 12/2012 Hymel et al.
8,332,402 B2 12/2012 Forstall et al.
8,332,475 B2 12/2012 Rosen et al.
8,352,494 B1 1/2013 Badoiu
8,352,546 B1 1/2013 Dollard
8,369,866 B2 2/2013 Ashley, Jr. et al.
8,379,130 B2 2/2013 Forutanpour et al.
8,385,950 B1 2/2013 Wagner et al.
8,402,097 B2 3/2013 Szeto
8,405,773 B2 3/2013 Hayashi et al.
8,418,067 B2 4/2013 Cheng et al.
8,423,409 B2 4/2013 Rao
8,428,453 B1 4/2013 Spiegel et al.
8,433,296 B2 4/2013 Hardin et al.
8,471,914 B2 6/2013 Sakiyama et al.
8,472,935 B1 6/2013 Fujisaki
8,494,481 B1 7/2013 Bacco et al.
8,510,383 B2 8/2013 Hurley et al.
8,527,345 B2 9/2013 Rothschild et al.
8,542,685 B2 9/2013 Forbes, Jr. et al.
8,548,735 B2 10/2013 Forstall et al.
8,554,627 B2 10/2013 Svendsen et al.
8,559,980 B2 10/2013 Pujol
8,560,612 B2 10/2013 Kilmer et al.
8,570,907 B2 10/2013 Garcia, Jr. et al.
8,594,680 B2 11/2013 Ledlie et al.
8,606,792 B1 12/2013 Jackson et al.
8,613,089 B1 12/2013 Holloway et al.
8,626,187 B2 1/2014 Grosman et al.
8,639,648 B2 1/2014 Koponen et al.
8,649,803 B1 2/2014 Hamill
8,660,358 B1 2/2014 Bergboer et al.
8,660,369 B2 2/2014 Llano et al.
8,660,793 B2 2/2014 Ngo et al.
8,666,152 B1 3/2014 Ramanathan et al.
8,681,178 B1 3/2014 Tseng
8,682,350 B2 3/2014 Altman et al.
8,686,962 B2 4/2014 Christie
8,687,021 B2 4/2014 Bathiche et al.
8,688,519 B1 4/2014 Lin et al.
8,694,026 B2 4/2014 Forstall et al.
8,718,333 B2 5/2014 Wolf et al.
8,724,622 B2 5/2014 Rojas
8,732,168 B2 5/2014 Johnson
8,744,523 B2 6/2014 Fan et al.
8,745,132 B2 6/2014 Obradovich
8,751,310 B2 6/2014 Van Datta et al.
8,761,800 B2 6/2014 Kuwahara
8,762,201 B1 6/2014 Noonan
8,768,876 B2 7/2014 Shim et al.
8,775,401 B2 7/2014 Zhou et al.
8,775,972 B2 7/2014 Spiegel
8,788,680 B1 7/2014 Naik
8,788,947 B2 7/2014 Putz et al.
8,790,187 B2 7/2014 Walker et al.
8,797,415 B2 8/2014 Arnold
8,798,646 B1 8/2014 Wang et al.
8,812,024 B2 8/2014 Obermeyer et al.
8,812,027 B2 8/2014 Obermeyer et al.
8,838,140 B1 9/2014 Ledet
8,856,349 B2 10/2014 Jain et al.
8,868,223 B1 10/2014 Sharifi
8,874,677 B2 10/2014 Rosen et al.
8,886,227 B2 11/2014 Schmidt et al.
8,909,679 B2 12/2014 Root et al.
8,909,714 B2 12/2014 Agarwal et al.
8,909,725 B1 12/2014 Sehn
8,914,752 B1 12/2014 Spiegel
8,923,823 B1 12/2014 Wilde
8,924,144 B2 12/2014 Forstall et al.
8,925,106 B1 12/2014 Steiner et al.
8,943,140 B1 1/2015 Kothari
8,965,271 B1 2/2015 Vucurevich
8,972,357 B2 3/2015 Shim et al.
8,977,296 B1 3/2015 Briggs et al.
8,995,433 B2 3/2015 Rojas
9,015,069 B2 4/2015 Brantley et al.
9,015,285 B1 4/2015 Ebsen et al.
9,020,745 B2 4/2015 Johnston et al.
9,026,943 B1 5/2015 Spiegel
9,037,577 B1 5/2015 Saylor et al.
9,040,574 B2 5/2015 Wang et al.
9,043,329 B1 5/2015 Patton et al.
9,055,416 B2 6/2015 Rosen et al.
9,063,638 B1 6/2015 Schrock et al.
9,080,877 B2 7/2015 Dave et al.
9,083,770 B1 7/2015 Drose et al.
9,094,137 B1 7/2015 Sehn et al.
9,098,832 B1 8/2015 Scardino
9,100,806 B2 8/2015 Rosen et al.
9,100,807 B2 8/2015 Rosen et al.
9,113,301 B1 8/2015 Spiegel et al.
9,119,027 B2 8/2015 Sharon et al.
9,123,074 B2 9/2015 Jacobs et al.
9,137,700 B2 9/2015 Elefant et al.
9,143,382 B2 9/2015 Bhogal et al.
9,143,681 B1 9/2015 Ebsen et al.
9,148,424 B1 9/2015 Yang
9,148,742 B1 9/2015 Koulomzin et al.
9,152,477 B1 10/2015 Campbell et al.
9,159,364 B1 10/2015 Matias et al.
9,175,967 B2 11/2015 Abramson et al.
9,191,776 B2 11/2015 Root et al.
9,204,252 B2 12/2015 Root
9,210,542 B2 12/2015 Longo et al.
9,225,805 B2 12/2015 Kujawa et al.
9,225,897 B1 12/2015 Sehn et al.
9,237,202 B1 1/2016 Sehn
9,258,459 B2 2/2016 Hartley
9,264,463 B2 2/2016 Rubinstein et al.
9,269,011 B1 2/2016 Sikka et al.
9,276,886 B1 3/2016 Samaranayake
9,277,365 B1 3/2016 Wilden et al.
9,294,425 B1 3/2016 Son
9,319,472 B2 4/2016 Cathcart et al.
9,344,606 B2 5/2016 Hartley et al.
9,385,983 B1 7/2016 Sehn
9,396,354 B1 7/2016 Murphy et al.
9,407,712 B1 8/2016 Sehn
9,407,816 B1 8/2016 Sehn
9,414,422 B2 8/2016 Belghoul et al.
9,417,754 B2 8/2016 Smith
9,430,783 B1 8/2016 Sehn

(56) References Cited

U.S. PATENT DOCUMENTS

| | | | |
|---|---|---|---|
| 9,439,041 B2 | 9/2016 | Parvizi et al. | |
| 9,443,227 B2 | 9/2016 | Evans et al. | |
| 9,450,907 B2 | 9/2016 | Pridmore et al. | |
| 9,459,778 B2 | 10/2016 | Hogeg et al. | |
| 9,477,391 B2 | 10/2016 | Flynn, III et al. | |
| 9,482,882 B1 | 11/2016 | Hanover et al. | |
| 9,482,883 B1 | 11/2016 | Meisenholder | |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,542,422 B2 | 1/2017 | Duggal et al. | |
| 9,544,379 B2 | 1/2017 | Gauglitz et al. | |
| 9,560,006 B2 | 1/2017 | Prado et al. | |
| 9,591,445 B2 | 3/2017 | Zises | |
| 9,628,950 B1 | 4/2017 | Noeth et al. | |
| 9,635,500 B1 | 4/2017 | Becker et al. | |
| 9,641,572 B1 | 5/2017 | Yeskel et al. | |
| 9,641,972 B1 * | 5/2017 | Hughes ................. | H04W 4/021 |
| 9,645,221 B1 | 5/2017 | Heizer | |
| 9,648,056 B1 | 5/2017 | Kim et al. | |
| 9,648,074 B2 | 5/2017 | Liu | |
| 9,648,581 B1 | 5/2017 | Vaynblat et al. | |
| 9,652,896 B1 | 5/2017 | Jurgenson et al. | |
| 9,659,244 B2 | 5/2017 | Anderton et al. | |
| 9,672,538 B1 | 6/2017 | Vaynblat et al. | |
| 9,674,660 B1 | 6/2017 | Vaynblat et al. | |
| 9,693,191 B2 | 6/2017 | Sehn | |
| 9,705,831 B2 | 7/2017 | Spiegel | |
| 9,706,355 B1 | 7/2017 | Cali et al. | |
| 9,710,821 B2 | 7/2017 | Heath | |
| 9,710,969 B2 | 7/2017 | Malamud et al. | |
| 9,736,627 B2 | 8/2017 | Holm et al. | |
| 9,742,713 B2 | 8/2017 | Spiegel et al. | |
| 9,749,429 B1 | 8/2017 | Simkhai et al. | |
| 9,781,490 B2 | 10/2017 | Makhlouf | |
| 9,785,796 B1 | 10/2017 | Murphy et al. | |
| 9,788,027 B1 | 10/2017 | Vucurevich | |
| 9,802,121 B2 | 10/2017 | Ackley et al. | |
| 9,823,724 B2 | 11/2017 | Vaccari et al. | |
| 9,825,898 B2 | 11/2017 | Sehn | |
| 9,843,720 B1 | 12/2017 | Ebsen et al. | |
| 9,854,219 B2 | 12/2017 | Sehn | |
| 9,866,999 B1 | 1/2018 | Noeth | |
| 9,881,094 B2 | 1/2018 | Pavlovskaia | |
| 9,894,478 B1 | 2/2018 | Deluca et al. | |
| 9,961,520 B2 | 5/2018 | Brooks et al. | |
| 9,961,535 B2 | 5/2018 | Bucchieri | |
| 10,026,226 B1 | 7/2018 | Lotto | |
| 10,044,818 B2 | 8/2018 | Wilden et al. | |
| 10,080,102 B1 | 9/2018 | Noeth et al. | |
| 10,135,949 B1 | 11/2018 | Pavlovskaia et al. | |
| 10,176,195 B2 | 1/2019 | Patel | |
| 10,182,311 B2 | 1/2019 | Sehn | |
| 10,186,299 B2 | 1/2019 | Wang et al. | |
| 10,200,813 B1 | 2/2019 | Allen et al. | |
| 10,250,683 B2 | 4/2019 | Karkkainen et al. | |
| 10,271,158 B1 | 4/2019 | Ledet | |
| 10,282,753 B2 | 5/2019 | Cheung | |
| 10,284,508 B1 | 5/2019 | Allen et al. | |
| 10,285,002 B2 | 5/2019 | Colonna et al. | |
| 10,285,006 B2 | 5/2019 | Colonna et al. | |
| 10,311,916 B2 | 6/2019 | Sehn | |
| 10,349,209 B1 | 7/2019 | Noeth et al. | |
| 10,354,425 B2 | 7/2019 | Yan et al. | |
| 10,382,372 B1 | 8/2019 | Chung et al. | |
| 10,395,519 B2 | 8/2019 | Colonna et al. | |
| 10,416,845 B1 | 9/2019 | Allen et al. | |
| 10,438,094 B1 | 10/2019 | Ko et al. | |
| 10,440,420 B2 | 10/2019 | Hogeg et al. | |
| 10,445,777 B2 | 10/2019 | McDevitt et al. | |
| 10,448,201 B1 | 10/2019 | Sehn et al. | |
| 10,476,830 B2 | 11/2019 | Allen et al. | |
| 10,514,876 B2 | 12/2019 | Sehn | |
| 10,524,087 B1 | 12/2019 | Allen et al. | |
| 10,565,795 B2 | 2/2020 | Charlton et al. | |
| 10,572,681 B1 | 2/2020 | Murphy et al. | |
| 10,580,458 B2 | 3/2020 | Sehn | |
| 10,581,782 B2 | 3/2020 | Tang | |
| 10,582,277 B2 | 3/2020 | Tang | |
| 10,616,239 B2 | 4/2020 | Allen et al. | |
| 10,616,727 B2 | 4/2020 | Constantinides | |
| 10,623,891 B2 | 4/2020 | Sehn et al. | |
| 10,659,914 B1 | 5/2020 | Allen et al. | |
| 10,694,317 B2 | 6/2020 | Cheung | |
| 10,708,210 B1 | 7/2020 | Allen et al. | |
| 10,771,924 B2 | 9/2020 | Colonna et al. | |
| 10,779,113 B2 | 9/2020 | Sehn et al. | |
| 10,811,053 B2 | 10/2020 | Sehn | |
| 10,824,654 B2 | 11/2020 | Chang et al. | |
| 10,880,252 B2 | 12/2020 | Gauglitz et al. | |
| 10,893,055 B2 | 1/2021 | Allen et al. | |
| 10,915,911 B2 | 2/2021 | Ahmed et al. | |
| 10,944,710 B1 | 3/2021 | Allen et al. | |
| 10,958,607 B2 | 3/2021 | Gauglitz et al. | |
| 10,958,608 B1 | 3/2021 | Allen et al. | |
| 10,990,697 B2 | 4/2021 | Murphy et al. | |
| 11,012,398 B1 | 5/2021 | Allen et al. | |
| 11,038,829 B1 | 6/2021 | Allen et al. | |
| 11,166,121 B2 | 11/2021 | Sehn et al. | |
| 11,190,679 B2 | 11/2021 | Ebsen et al. | |
| 11,216,869 B2 | 1/2022 | Allen et al. | |
| 11,281,701 B2 | 3/2022 | Chang et al. | |
| 11,317,240 B2 | 4/2022 | Allen et al. | |
| 11,627,141 B2 | 4/2023 | Allen et al. | |
| 11,741,136 B2 | 8/2023 | Chang et al. | |
| 11,900,418 B2 | 2/2024 | Azmoodeh et al. | |
| 2001/0025316 A1 | 9/2001 | Oh | |
| 2001/0028787 A1 | 10/2001 | Nomura et al. | |
| 2002/0023101 A1 | 2/2002 | Kurihara et al. | |
| 2002/0032771 A1 | 3/2002 | Gledje | |
| 2002/0047686 A1 | 4/2002 | Kodama et al. | |
| 2002/0047858 A1 | 4/2002 | Bayliss et al. | |
| 2002/0047868 A1 | 4/2002 | Miyazawa | |
| 2002/0078456 A1 | 6/2002 | Hudson et al. | |
| 2002/0087631 A1 | 7/2002 | Sharma | |
| 2002/0097257 A1 | 7/2002 | Miller et al. | |
| 2002/0098850 A1 | 7/2002 | Akhteruzzaman et al. | |
| 2002/0122659 A1 | 9/2002 | Mcgrath et al. | |
| 2002/0123327 A1 | 9/2002 | Vataja | |
| 2002/0128047 A1 | 9/2002 | Gates | |
| 2002/0141378 A1 | 10/2002 | Bays et al. | |
| 2002/0144154 A1 | 10/2002 | Tomkow | |
| 2002/0146103 A1 | 10/2002 | Holt et al. | |
| 2002/0171669 A1 | 11/2002 | Meron et al. | |
| 2003/0001846 A1 | 1/2003 | Davis et al. | |
| 2003/0016247 A1 | 1/2003 | Lai et al. | |
| 2003/0016253 A1 | 1/2003 | Aoki et al. | |
| 2003/0017823 A1 | 1/2003 | Mager et al. | |
| 2003/0020623 A1 | 1/2003 | Cao et al. | |
| 2003/0023874 A1 | 1/2003 | Prokupets et al. | |
| 2003/0037124 A1 | 2/2003 | Yamaura et al. | |
| 2003/0052925 A1 | 3/2003 | Daimon et al. | |
| 2003/0074404 A1 | 4/2003 | Parker et al. | |
| 2003/0083929 A1 | 5/2003 | Springer et al. | |
| 2003/0101230 A1 | 5/2003 | Benschoter et al. | |
| 2003/0110503 A1 | 6/2003 | Perkes | |
| 2003/0126215 A1 | 7/2003 | Udell | |
| 2003/0131362 A1 | 7/2003 | Jasinschi et al. | |
| 2003/0148773 A1 | 8/2003 | Spriestersbach et al. | |
| 2003/0163370 A1 | 8/2003 | Chen et al. | |
| 2003/0164856 A1 | 9/2003 | Prager et al. | |
| 2003/0210280 A1 | 11/2003 | Baker et al. | |
| 2003/0217106 A1 | 11/2003 | Adar et al. | |
| 2003/0217118 A1 | 11/2003 | Kobayashi et al. | |
| 2003/0229607 A1 | 12/2003 | Zellweger et al. | |
| 2003/0236823 A1 | 12/2003 | Patzer et al. | |
| 2004/0027371 A1 | 2/2004 | Jaeger | |
| 2004/0064429 A1 | 4/2004 | Hirstius et al. | |
| 2004/0078367 A1 | 4/2004 | Anderson et al. | |
| 2004/0091116 A1 | 5/2004 | Staddon et al. | |
| 2004/0111467 A1 | 6/2004 | Willis | |
| 2004/0158739 A1 | 8/2004 | Wakai et al. | |
| 2004/0185877 A1 | 9/2004 | Asthana et al. | |

(56) References Cited

U.S. PATENT DOCUMENTS

2004/0189465 A1 9/2004 Capobianco et al.
2004/0193488 A1 9/2004 Khoo et al.
2004/0199402 A1 10/2004 Walker et al.
2004/0203959 A1 10/2004 Coombes
2004/0205480 A1 10/2004 Moore
2004/0205514 A1 10/2004 Sommerer et al.
2004/0215625 A1 10/2004 Svendsen et al.
2004/0243531 A1 12/2004 Dean
2004/0243688 A1 12/2004 Wugofski
2004/0243704 A1 12/2004 Botelho et al.
2005/0019014 A1 1/2005 Yoo et al.
2005/0021444 A1 1/2005 Bauer et al.
2005/0022211 A1 1/2005 Veselov et al.
2005/0032527 A1 2/2005 Sheha et al.
2005/0048989 A1 3/2005 Jung
2005/0071435 A1 3/2005 Karstens
2005/0078804 A1 4/2005 Yomoda
2005/0097176 A1 5/2005 Schatz et al.
2005/0102180 A1 5/2005 Gailey et al.
2005/0102381 A1 5/2005 Jiang et al.
2005/0104976 A1 5/2005 Currans
2005/0114783 A1 5/2005 Szeto
2005/0119936 A1 6/2005 Buchanan et al.
2005/0122405 A1 6/2005 Voss et al.
2005/0193340 A1 9/2005 Amburgey et al.
2005/0193345 A1 9/2005 Klassen et al.
2005/0198128 A1 9/2005 Anderson
2005/0223066 A1 10/2005 Buchheit et al.
2005/0288954 A1 12/2005 McCarthy et al.
2006/0004630 A1 1/2006 Criddle et al.
2006/0026067 A1 2/2006 Nicholas et al.
2006/0107297 A1 5/2006 Toyama et al.
2006/0109238 A1 5/2006 Lau et al.
2006/0114338 A1 6/2006 Rothschild
2006/0119882 A1 6/2006 Harris et al.
2006/0127054 A1 6/2006 Matsuyama
2006/0136297 A1 6/2006 Willis et al.
2006/0199612 A1 9/2006 Beyer et al.
2006/0242234 A1 10/2006 Counts et al.
2006/0242239 A1 10/2006 Morishima et al.
2006/0242550 A1 10/2006 Rahman et al.
2006/0242554 A1 10/2006 Gerace et al.
2006/0252438 A1 11/2006 Ansamaa et al.
2006/0259359 A1 11/2006 Gogel
2006/0265417 A1 11/2006 Amato et al.
2006/0270419 A1 11/2006 Crowley et al.
2006/0276184 A1 12/2006 Tretyak et al.
2006/0282819 A1 12/2006 Graham et al.
2006/0287878 A1 12/2006 Wadhwa et al.
2007/0003221 A1 1/2007 Hamada et al.
2007/0004426 A1 1/2007 Pfleging et al.
2007/0028183 A1 2/2007 Ostojic et al.
2007/0032225 A1 2/2007 Konicek et al.
2007/0038715 A1 2/2007 Collins et al.
2007/0040931 A1 2/2007 Nishizawa
2007/0064899 A1 3/2007 Boss et al.
2007/0067317 A1 3/2007 Stevenson
2007/0073517 A1 3/2007 Panje
2007/0073823 A1 3/2007 Cohen et al.
2007/0075898 A1 4/2007 Markhovsky et al.
2007/0082707 A1 4/2007 Flynt et al.
2007/0088832 A1 4/2007 Tsang et al.
2007/0106706 A1 5/2007 Ahrens et al.
2007/0118801 A1 5/2007 Harshbarger et al.
2007/0136228 A1 6/2007 Petersen
2007/0192128 A1 8/2007 Celestini
2007/0198340 A1 8/2007 Lucovsky et al.
2007/0198495 A1 8/2007 Buron et al.
2007/0208751 A1 9/2007 Cowan et al.
2007/0210936 A1 9/2007 Nicholson
2007/0214180 A1 9/2007 Crawford
2007/0214216 A1 9/2007 Carrer et al.
2007/0233556 A1 10/2007 Koningstein
2007/0233801 A1 10/2007 Eren et al.
2007/0233859 A1 10/2007 Zhao et al.
2007/0243887 A1 10/2007 Bandhole et al.
2007/0244750 A1 10/2007 Grannan et al.
2007/0250791 A1 10/2007 Halliday et al.
2007/0255456 A1 11/2007 Funayama
2007/0260741 A1 11/2007 Bezancon
2007/0262860 A1 11/2007 Salinas et al.
2007/0268988 A1 11/2007 Hedayat et al.
2007/0281690 A1 12/2007 Altman et al.
2007/0294735 A1 12/2007 Luo
2007/0299807 A1 12/2007 Lea et al.
2008/0005240 A1 1/2008 Knighton et al.
2008/0012987 A1 1/2008 Hirata et al.
2008/0022329 A1 1/2008 Glad
2008/0025701 A1 1/2008 Ikeda
2008/0032703 A1 2/2008 Krumm et al.
2008/0033795 A1 2/2008 Wishnow et al.
2008/0033930 A1 2/2008 Warren
2008/0043041 A2 2/2008 Hedenstroem et al.
2008/0046476 A1 2/2008 Anderson et al.
2008/0046831 A1 2/2008 Imai et al.
2008/0046956 A1 2/2008 Kulas
2008/0049704 A1 2/2008 Witteman et al.
2008/0055269 A1 3/2008 Lemay et al.
2008/0062141 A1 3/2008 Chandhri
2008/0076505 A1 3/2008 Ngyen et al.
2008/0091723 A1 4/2008 Zuckerberg et al.
2008/0092233 A1 4/2008 Tian et al.
2008/0094387 A1 4/2008 Chen
2008/0104503 A1 5/2008 Beall et al.
2008/0109844 A1 5/2008 Baldeschwieler et al.
2008/0120409 A1 5/2008 Sun et al.
2008/0133336 A1 6/2008 Altman et al.
2008/0147730 A1 6/2008 Lee et al.
2008/0148150 A1 6/2008 Mall
2008/0158230 A1 7/2008 Sharma et al.
2008/0160956 A1 7/2008 Jackson et al.
2008/0167106 A1 7/2008 Lutnick et al.
2008/0168033 A1 7/2008 Ott et al.
2008/0168489 A1 7/2008 Schraga
2008/0172413 A1 7/2008 Chiu
2008/0183485 A1 7/2008 Drabble et al.
2008/0189177 A1 8/2008 Anderton et al.
2008/0193101 A1 8/2008 Agnihotri et al.
2008/0200189 A1 8/2008 Lagerstedt et al.
2008/0207176 A1 8/2008 Brackbill et al.
2008/0208692 A1 8/2008 Garaventi et al.
2008/0214210 A1 9/2008 Rasanen et al.
2008/0222158 A1 9/2008 Saika
2008/0222545 A1 9/2008 Lemay et al.
2008/0244438 A1 10/2008 Peters et al.
2008/0255976 A1 10/2008 Altberg et al.
2008/0256430 A1 10/2008 Gold
2008/0256446 A1 10/2008 Yamamoto
2008/0256450 A1 10/2008 Takakura et al.
2008/0256577 A1 10/2008 Funaki et al.
2008/0263103 A1 10/2008 Mcgregor et al.
2008/0266421 A1 10/2008 Takahata et al.
2008/0270938 A1 10/2008 Carlson
2008/0284587 A1 11/2008 Saigh et al.
2008/0288338 A1 11/2008 Wiseman et al.
2008/0306826 A1 12/2008 Kramer et al.
2008/0313329 A1 12/2008 Wang et al.
2008/0313346 A1 12/2008 Kujawa et al.
2008/0316181 A1 12/2008 Nurmi
2008/0318616 A1 12/2008 Chipalkatti et al.
2009/0006191 A1 1/2009 Arankalle et al.
2009/0006336 A1 1/2009 Forstall et al.
2009/0006565 A1 1/2009 Velusamy et al.
2009/0015703 A1 1/2009 Kim et al.
2009/0019472 A1 1/2009 Cleland et al.
2009/0024956 A1 1/2009 Kobayashi
2009/0030774 A1 1/2009 Rothschild et al.
2009/0030999 A1 1/2009 Gatzke et al.
2009/0040324 A1 2/2009 Nonaka
2009/0042588 A1 2/2009 Lottin et al.
2009/0058822 A1 3/2009 Chaudhri
2009/0063992 A1 3/2009 Gandhi et al.
2009/0079846 A1 3/2009 Chou
2009/0087161 A1 4/2009 Roberts et al.

(56) References Cited

U.S. PATENT DOCUMENTS

| | | | |
|---|---|---|---|
| 2009/0089169 | A1 | 4/2009 | Gupta et al. |
| 2009/0089378 | A1 | 4/2009 | Maresh |
| 2009/0089678 | A1 | 4/2009 | Sacco et al. |
| 2009/0089710 | A1 | 4/2009 | Wood et al. |
| 2009/0093261 | A1 | 4/2009 | Ziskind |
| 2009/0098859 | A1 | 4/2009 | Kamdar et al. |
| 2009/0132341 | A1 | 5/2009 | Klinger |
| 2009/0132453 | A1 | 5/2009 | Hangartner et al. |
| 2009/0132665 | A1 | 5/2009 | Thomsen et al. |
| 2009/0148045 | A1 | 6/2009 | Lee et al. |
| 2009/0153492 | A1 | 6/2009 | Popp |
| 2009/0157450 | A1 | 6/2009 | Athsani et al. |
| 2009/0157752 | A1 | 6/2009 | Gonzalez |
| 2009/0158183 | A1 | 6/2009 | Mccurdy et al. |
| 2009/0160970 | A1 | 6/2009 | Fredlund et al. |
| 2009/0163182 | A1 | 6/2009 | Gatti et al. |
| 2009/0169062 | A1 | 7/2009 | Cheung et al. |
| 2009/0177299 | A1 | 7/2009 | Van De Sluis |
| 2009/0177588 | A1 | 7/2009 | Marchese |
| 2009/0177730 | A1 | 7/2009 | Annamalai et al. |
| 2009/0187825 | A1 | 7/2009 | Sandquist et al. |
| 2009/0192900 | A1 | 7/2009 | Collision |
| 2009/0197582 | A1 | 8/2009 | Lewis et al. |
| 2009/0197616 | A1 | 8/2009 | Lewis et al. |
| 2009/0199242 | A1 | 8/2009 | Johnson et al. |
| 2009/0215469 | A1 | 8/2009 | Fisher et al. |
| 2009/0232354 | A1 | 9/2009 | Camp, Jr. et al. |
| 2009/0234815 | A1 | 9/2009 | Boerries et al. |
| 2009/0235155 | A1 | 9/2009 | Ueda |
| 2009/0239552 | A1 | 9/2009 | Churchill et al. |
| 2009/0249222 | A1 | 10/2009 | Schmidt et al. |
| 2009/0249244 | A1 | 10/2009 | Robinson et al. |
| 2009/0254840 | A1 | 10/2009 | Churchill et al. |
| 2009/0260010 | A1 | 10/2009 | Burkhart et al. |
| 2009/0265647 | A1 | 10/2009 | Martin et al. |
| 2009/0284658 | A1 | 11/2009 | Cho |
| 2009/0288022 | A1 | 11/2009 | Almstrand et al. |
| 2009/0291665 | A1 | 11/2009 | Gaskarth et al. |
| 2009/0291672 | A1 | 11/2009 | Treves et al. |
| 2009/0292608 | A1 | 11/2009 | Polachek |
| 2009/0299857 | A1 | 12/2009 | Brubaker |
| 2009/0300139 | A1 | 12/2009 | Shoemaker et al. |
| 2009/0319607 | A1 | 12/2009 | Belz et al. |
| 2009/0327073 | A1 | 12/2009 | Li |
| 2010/0001980 | A1 | 1/2010 | Kim et al. |
| 2010/0004003 | A1 | 1/2010 | Duggal et al. |
| 2010/0011316 | A1 | 1/2010 | Sar et al. |
| 2010/0014833 | A1 | 1/2010 | Pjanovic et al. |
| 2010/0039505 | A1 | 2/2010 | Inoue et al. |
| 2010/0041378 | A1 | 2/2010 | Aceves et al. |
| 2010/0062794 | A1 | 3/2010 | Han |
| 2010/0073509 | A1 | 3/2010 | Shioji |
| 2010/0082427 | A1 | 4/2010 | Burgener et al. |
| 2010/0082693 | A1 | 4/2010 | Hugg et al. |
| 2010/0100568 | A1 | 4/2010 | Papin et al. |
| 2010/0100729 | A1 | 4/2010 | Read et al. |
| 2010/0113065 | A1 | 5/2010 | Narayan et al. |
| 2010/0113066 | A1 | 5/2010 | Dingler et al. |
| 2010/0115281 | A1 | 5/2010 | Camenisch et al. |
| 2010/0130233 | A1 | 5/2010 | Parker |
| 2010/0131880 | A1 | 5/2010 | Lee et al. |
| 2010/0131895 | A1 | 5/2010 | Wohlert |
| 2010/0153144 | A1 | 6/2010 | Miller et al. |
| 2010/0153197 | A1 | 6/2010 | Byon |
| 2010/0156933 | A1 | 6/2010 | Jones et al. |
| 2010/0159944 | A1 | 6/2010 | Pascal et al. |
| 2010/0161635 | A1 | 6/2010 | Dey |
| 2010/0161658 | A1 | 6/2010 | Hamynen et al. |
| 2010/0161831 | A1 | 6/2010 | Haas et al. |
| 2010/0162149 | A1 | 6/2010 | Sheleheda et al. |
| 2010/0178939 | A1 | 7/2010 | Kang et al. |
| 2010/0183280 | A1 | 7/2010 | Beauregard et al. |
| 2010/0185552 | A1 | 7/2010 | Deluca et al. |
| 2010/0185665 | A1 | 7/2010 | Horn et al. |
| 2010/0185750 | A1 | 7/2010 | Nakayama |
| 2010/0185987 | A1 | 7/2010 | Yang et al. |
| 2010/0191631 | A1 | 7/2010 | Weidmann |
| 2010/0197318 | A1 | 8/2010 | Petersen et al. |
| 2010/0197319 | A1 | 8/2010 | Petersen et al. |
| 2010/0198683 | A1 | 8/2010 | Aarabi |
| 2010/0198694 | A1 | 8/2010 | Muthukrishnan |
| 2010/0198826 | A1 | 8/2010 | Petersen et al. |
| 2010/0198828 | A1 | 8/2010 | Petersen et al. |
| 2010/0198862 | A1 | 8/2010 | Jennings et al. |
| 2010/0198870 | A1 | 8/2010 | Petersen et al. |
| 2010/0198917 | A1 | 8/2010 | Petersen et al. |
| 2010/0199166 | A1 | 8/2010 | Fisk, III |
| 2010/0199227 | A1 | 8/2010 | Xiao et al. |
| 2010/0201482 | A1 | 8/2010 | Robertson et al. |
| 2010/0201536 | A1 | 8/2010 | Robertson et al. |
| 2010/0211431 | A1 | 8/2010 | Lutnick et al. |
| 2010/0214436 | A1 | 8/2010 | Kim et al. |
| 2010/0216491 | A1 | 8/2010 | Winkler et al. |
| 2010/0223128 | A1 | 9/2010 | Dukellis et al. |
| 2010/0223343 | A1 | 9/2010 | Bosan et al. |
| 2010/0247064 | A1 | 9/2010 | Yeh et al. |
| 2010/0250109 | A1 | 9/2010 | Johnston et al. |
| 2010/0251143 | A1 | 9/2010 | Thomas et al. |
| 2010/0255865 | A1 | 10/2010 | Karmarkar |
| 2010/0257196 | A1 | 10/2010 | Waters et al. |
| 2010/0259386 | A1 | 10/2010 | Holley et al. |
| 2010/0262461 | A1 | 10/2010 | Bohannon |
| 2010/0273463 | A1 | 10/2010 | Bonnefoy |
| 2010/0273509 | A1 | 10/2010 | Sweeney et al. |
| 2010/0281045 | A1 | 11/2010 | Dean |
| 2010/0293105 | A1 | 11/2010 | Blinn et al. |
| 2010/0299763 | A1 | 11/2010 | Marcus et al. |
| 2010/0306669 | A1 | 12/2010 | Della Pasqua |
| 2010/0318628 | A1 | 12/2010 | Pacella et al. |
| 2010/0323666 | A1 | 12/2010 | Cai et al. |
| 2010/0332958 | A1 | 12/2010 | Weinberger et al. |
| 2011/0004071 | A1 | 1/2011 | Faiola et al. |
| 2011/0010205 | A1 | 1/2011 | Richards |
| 2011/0029512 | A1 | 2/2011 | Folgner et al. |
| 2011/0035284 | A1 | 2/2011 | Moshfeghi |
| 2011/0037605 | A1 | 2/2011 | Robison, Jr. et al. |
| 2011/0040783 | A1 | 2/2011 | Uemichi et al. |
| 2011/0040804 | A1 | 2/2011 | Peirce et al. |
| 2011/0044563 | A1 | 2/2011 | Blose et al. |
| 2011/0050909 | A1 | 3/2011 | Ellenby et al. |
| 2011/0050915 | A1 | 3/2011 | Wang et al. |
| 2011/0064388 | A1 | 3/2011 | Brown et al. |
| 2011/0066743 | A1 | 3/2011 | Hurley et al. |
| 2011/0083101 | A1 | 4/2011 | Sharon et al. |
| 2011/0085059 | A1 | 4/2011 | Noh |
| 2011/0098061 | A1 | 4/2011 | Yoon |
| 2011/0099507 | A1 | 4/2011 | Nesladek et al. |
| 2011/0099519 | A1 | 4/2011 | Ma et al. |
| 2011/0102630 | A1 | 5/2011 | Rukes |
| 2011/0106882 | A1 | 5/2011 | Takakura et al. |
| 2011/0119133 | A1 | 5/2011 | Igelman et al. |
| 2011/0131633 | A1 | 6/2011 | Macaskill et al. |
| 2011/0137881 | A1 | 6/2011 | Cheng et al. |
| 2011/0141025 | A1 | 6/2011 | Tsai |
| 2011/0145564 | A1 | 6/2011 | Moshir et al. |
| 2011/0159890 | A1 | 6/2011 | Fortescue et al. |
| 2011/0161423 | A1 | 6/2011 | Pratt et al. |
| 2011/0164163 | A1 | 7/2011 | Bilbrey et al. |
| 2011/0170838 | A1 | 7/2011 | Rosengart et al. |
| 2011/0184980 | A1 | 7/2011 | Jeong et al. |
| 2011/0191368 | A1 | 8/2011 | Muzatko |
| 2011/0197194 | A1 | 8/2011 | D'Angelo et al. |
| 2011/0202598 | A1 | 8/2011 | Evans et al. |
| 2011/0202968 | A1 | 8/2011 | Nurmi |
| 2011/0211534 | A1 | 9/2011 | Schmidt et al. |
| 2011/0213845 | A1 | 9/2011 | Logan et al. |
| 2011/0215966 | A1 | 9/2011 | Kim et al. |
| 2011/0225048 | A1 | 9/2011 | Nair |
| 2011/0238300 | A1 | 9/2011 | Schenken |
| 2011/0238762 | A1 | 9/2011 | Soni et al. |
| 2011/0238763 | A1 | 9/2011 | Shin et al. |
| 2011/0249551 | A1 | 10/2011 | Rollins |
| 2011/0251790 | A1 | 10/2011 | Liotopoulos et al. |
| 2011/0255736 | A1 | 10/2011 | Thompson et al. |

(56) References Cited

U.S. PATENT DOCUMENTS

| | | | |
|---|---|---|---|
| 2011/0256881 | A1 | 10/2011 | Huang et al. |
| 2011/0258260 | A1 | 10/2011 | Isaacson |
| 2011/0269479 | A1 | 11/2011 | Ledlie |
| 2011/0273575 | A1 | 11/2011 | Lee |
| 2011/0276637 | A1 | 11/2011 | Thornton et al. |
| 2011/0282799 | A1 | 11/2011 | Huston |
| 2011/0283172 | A1 | 11/2011 | Berger et al. |
| 2011/0283188 | A1 | 11/2011 | Farrenkopf |
| 2011/0286586 | A1 | 11/2011 | Saylor et al. |
| 2011/0288917 | A1 | 11/2011 | Wanek |
| 2011/0294541 | A1 | 12/2011 | Zheng et al. |
| 2011/0295577 | A1 | 12/2011 | Ramachandran |
| 2011/0295677 | A1 | 12/2011 | Dhingra et al. |
| 2011/0295719 | A1 | 12/2011 | Chen et al. |
| 2011/0296474 | A1 | 12/2011 | Babic |
| 2011/0302525 | A1 | 12/2011 | Jeon |
| 2011/0306387 | A1 | 12/2011 | Moon |
| 2011/0314084 | A1 | 12/2011 | Saretto et al. |
| 2011/0314419 | A1 | 12/2011 | Dunn et al. |
| 2011/0320373 | A1 | 12/2011 | Lee et al. |
| 2012/0004956 | A1 | 1/2012 | Hustan |
| 2012/0011031 | A1 | 1/2012 | Lewis et al. |
| 2012/0019722 | A1 | 1/2012 | Kwisthout et al. |
| 2012/0023522 | A1 | 1/2012 | Anderson et al. |
| 2012/0028659 | A1 | 2/2012 | Whitney et al. |
| 2012/0033718 | A1 | 2/2012 | Kauffman et al. |
| 2012/0036015 | A1 | 2/2012 | Sheikh |
| 2012/0036443 | A1 | 2/2012 | Ohmori et al. |
| 2012/0054001 | A1 | 3/2012 | Zivkovic et al. |
| 2012/0054797 | A1 | 3/2012 | Skog et al. |
| 2012/0054811 | A1 | 3/2012 | Spears |
| 2012/0059722 | A1 | 3/2012 | Rao |
| 2012/0062805 | A1 | 3/2012 | Candelore |
| 2012/0070045 | A1 | 3/2012 | Vesper et al. |
| 2012/0084731 | A1 | 4/2012 | Filman et al. |
| 2012/0084835 | A1 | 4/2012 | Thomas et al. |
| 2012/0098836 | A1 | 4/2012 | Kim et al. |
| 2012/0099800 | A1 | 4/2012 | Llano et al. |
| 2012/0108293 | A1 | 5/2012 | Law et al. |
| 2012/0110096 | A1 | 5/2012 | Smarr et al. |
| 2012/0113143 | A1 | 5/2012 | Adhikari et al. |
| 2012/0113272 | A1 | 5/2012 | Hata |
| 2012/0117456 | A1 | 5/2012 | Koskimies |
| 2012/0123830 | A1 | 5/2012 | Svendsen et al. |
| 2012/0123867 | A1 | 5/2012 | Hannan |
| 2012/0123871 | A1 | 5/2012 | Svendsen et al. |
| 2012/0123875 | A1 | 5/2012 | Svendsen et al. |
| 2012/0124126 | A1 | 5/2012 | Alcazar et al. |
| 2012/0124147 | A1 | 5/2012 | Hamlin et al. |
| 2012/0124176 | A1 | 5/2012 | Curtis et al. |
| 2012/0124458 | A1 | 5/2012 | Cruzada |
| 2012/0127196 | A1 | 5/2012 | Landry |
| 2012/0129548 | A1 | 5/2012 | Rao et al. |
| 2012/0131507 | A1 | 5/2012 | Sparandara et al. |
| 2012/0131512 | A1 | 5/2012 | Takeuchi et al. |
| 2012/0136998 | A1 | 5/2012 | Hough et al. |
| 2012/0143760 | A1 | 6/2012 | Abulafia et al. |
| 2012/0143963 | A1 | 6/2012 | Kennberg et al. |
| 2012/0150978 | A1 | 6/2012 | Monaco |
| 2012/0158532 | A1 | 6/2012 | Fitzsimmons |
| 2012/0163664 | A1 | 6/2012 | Zhu |
| 2012/0165100 | A1 | 6/2012 | Lalancette et al. |
| 2012/0166462 | A1 | 6/2012 | Pathak et al. |
| 2012/0166468 | A1 | 6/2012 | Gupta et al. |
| 2012/0166971 | A1 | 6/2012 | Sachson et al. |
| 2012/0169855 | A1 | 7/2012 | Oh |
| 2012/0172062 | A1 | 7/2012 | Altman et al. |
| 2012/0173991 | A1 | 7/2012 | Roberts et al. |
| 2012/0176401 | A1 | 7/2012 | Hayward et al. |
| 2012/0179549 | A1 | 7/2012 | Sigmund et al. |
| 2012/0184248 | A1 | 7/2012 | Speede |
| 2012/0197690 | A1 | 8/2012 | Agulnek |
| 2012/0197724 | A1 | 8/2012 | Kendall |
| 2012/0200743 | A1 | 8/2012 | Blanchflower et al. |
| 2012/0201362 | A1 | 8/2012 | Crossan et al. |
| 2012/0202525 | A1 | 8/2012 | Pettini |
| 2012/0203849 | A1 | 8/2012 | Collins et al. |
| 2012/0208564 | A1 | 8/2012 | Clark et al. |
| 2012/0209892 | A1 | 8/2012 | Macaskill et al. |
| 2012/0209921 | A1 | 8/2012 | Adafin et al. |
| 2012/0209924 | A1 | 8/2012 | Evans et al. |
| 2012/0210244 | A1 | 8/2012 | De et al. |
| 2012/0212632 | A1 | 8/2012 | Mate et al. |
| 2012/0214568 | A1 | 8/2012 | Herrmann |
| 2012/0220264 | A1 | 8/2012 | Kawabata |
| 2012/0221687 | A1 | 8/2012 | Hunter et al. |
| 2012/0226663 | A1 | 9/2012 | Valdez et al. |
| 2012/0226748 | A1 | 9/2012 | Bosworth et al. |
| 2012/0233000 | A1 | 9/2012 | Fisher et al. |
| 2012/0236162 | A1 | 9/2012 | Imamura |
| 2012/0239761 | A1 | 9/2012 | Linner et al. |
| 2012/0250951 | A1 | 10/2012 | Chen |
| 2012/0252418 | A1 | 10/2012 | Kandekar et al. |
| 2012/0254324 | A1 | 10/2012 | Majeti et al. |
| 2012/0254325 | A1 | 10/2012 | Majeti et al. |
| 2012/0259815 | A1 | 10/2012 | Olson |
| 2012/0263439 | A1 | 10/2012 | Lassman et al. |
| 2012/0270563 | A1 | 10/2012 | Sayed |
| 2012/0271684 | A1 | 10/2012 | Shutter |
| 2012/0278387 | A1 | 11/2012 | Garcia et al. |
| 2012/0278692 | A1 | 11/2012 | Shi |
| 2012/0281129 | A1 | 11/2012 | Wang et al. |
| 2012/0288147 | A1 | 11/2012 | Fujitani |
| 2012/0290637 | A1 | 11/2012 | Perantatos et al. |
| 2012/0299954 | A1 | 11/2012 | Wada et al. |
| 2012/0302259 | A1 | 11/2012 | Busch |
| 2012/0304052 | A1 | 11/2012 | Tanaka et al. |
| 2012/0304080 | A1 | 11/2012 | Wormald et al. |
| 2012/0307096 | A1 | 12/2012 | Ford et al. |
| 2012/0307112 | A1 | 12/2012 | Kunishige et al. |
| 2012/0311465 | A1 | 12/2012 | Nealer et al. |
| 2012/0311623 | A1 | 12/2012 | Davis et al. |
| 2012/0319904 | A1 | 12/2012 | Lee et al. |
| 2012/0323933 | A1 | 12/2012 | He et al. |
| 2012/0324018 | A1 | 12/2012 | Metcalf et al. |
| 2013/0004014 | A1 | 1/2013 | Hickman |
| 2013/0006759 | A1 | 1/2013 | Srivastava et al. |
| 2013/0006777 | A1 | 1/2013 | Krishnareddy et al. |
| 2013/0017802 | A1 | 1/2013 | Adibi et al. |
| 2013/0018960 | A1 | 1/2013 | Knysz et al. |
| 2013/0023284 | A1 | 1/2013 | Stanger |
| 2013/0024292 | A1 | 1/2013 | David |
| 2013/0024757 | A1 | 1/2013 | Doll et al. |
| 2013/0036364 | A1 | 2/2013 | Johnson |
| 2013/0045753 | A1 | 2/2013 | Obermeyer et al. |
| 2013/0050260 | A1 | 2/2013 | Reitan |
| 2013/0055083 | A1 | 2/2013 | Fino |
| 2013/0057489 | A1 | 3/2013 | Morton |
| 2013/0057587 | A1 | 3/2013 | Leonard et al. |
| 2013/0059607 | A1 | 3/2013 | Herz et al. |
| 2013/0060690 | A1 | 3/2013 | Oskolkov et al. |
| 2013/0063369 | A1 | 3/2013 | Malhotra et al. |
| 2013/0067027 | A1 | 3/2013 | Song et al. |
| 2013/0071093 | A1 | 3/2013 | Hanks et al. |
| 2013/0076758 | A1 | 3/2013 | Li et al. |
| 2013/0080254 | A1 | 3/2013 | Thramann |
| 2013/0082959 | A1 | 4/2013 | Shimazu et al. |
| 2013/0085790 | A1 | 4/2013 | Palmer et al. |
| 2013/0086072 | A1 | 4/2013 | Peng et al. |
| 2013/0090171 | A1 | 4/2013 | Holton et al. |
| 2013/0095857 | A1 | 4/2013 | Garcia et al. |
| 2013/0099977 | A1 | 4/2013 | Sheshadri et al. |
| 2013/0103766 | A1 | 4/2013 | Gupta |
| 2013/0104053 | A1 | 4/2013 | Thornton et al. |
| 2013/0110885 | A1 | 5/2013 | Brundrett, III |
| 2013/0111514 | A1 | 5/2013 | Slavin et al. |
| 2013/0115872 | A1 | 5/2013 | Huang et al. |
| 2013/0117261 | A1 | 5/2013 | Sambrani |
| 2013/0117365 | A1 | 5/2013 | Padmanabhan et al. |
| 2013/0122862 | A1 | 5/2013 | Horn et al. |
| 2013/0122929 | A1 | 5/2013 | Al-Mufti et al. |
| 2013/0124297 | A1 | 5/2013 | Hegeman et al. |
| 2013/0128059 | A1 | 5/2013 | Kristensson |
| 2013/0129252 | A1 | 5/2013 | Lauper |

(56) References Cited

U.S. PATENT DOCUMENTS

2013/0132194 A1 5/2013 Rajaram
2013/0132477 A1 5/2013 Bosworth et al.
2013/0132908 A1 5/2013 Lee et al.
2013/0144979 A1 6/2013 Kansal et al.
2013/0145286 A1 6/2013 Feng et al.
2013/0147837 A1 6/2013 Stroila
2013/0157684 A1 6/2013 Moser
2013/0159110 A1 6/2013 Rajaram et al.
2013/0159919 A1 6/2013 Leydon
2013/0169822 A1 7/2013 Zhu et al.
2013/0173380 A1 7/2013 Akbari et al.
2013/0173467 A1 7/2013 Nuzzi et al.
2013/0173729 A1 7/2013 Starenky et al.
2013/0182133 A1 7/2013 Tanabe
2013/0185131 A1 7/2013 Sinha et al.
2013/0191198 A1 7/2013 Carlson et al.
2013/0194301 A1 8/2013 Robbins et al.
2013/0198176 A1 8/2013 Kim
2013/0203373 A1 8/2013 Edge
2013/0210518 A1 8/2013 Barclay et al.
2013/0217366 A1 8/2013 Kolodziej
2013/0218965 A1 8/2013 Abrol et al.
2013/0218968 A1 8/2013 Mcevilly et al.
2013/0222323 A1 8/2013 Mckenzie
2013/0226453 A1 8/2013 Trussel et al.
2013/0227476 A1 8/2013 Frey
2013/0231144 A1 9/2013 Daniel et al.
2013/0232194 A1 9/2013 Knapp et al.
2013/0254227 A1 9/2013 Shim et al.
2013/0263031 A1 10/2013 Oshiro et al.
2013/0265450 A1 10/2013 Barnes, Jr.
2013/0267253 A1 10/2013 Case et al.
2013/0275505 A1 10/2013 Gauglitz et al.
2013/0283167 A1 10/2013 Xu
2013/0290337 A1 10/2013 Lansford et al.
2013/0290443 A1 10/2013 Collins et al.
2013/0304243 A1 11/2013 Iseli
2013/0304527 A1 11/2013 Santos, III
2013/0304646 A1 11/2013 De Geer
2013/0311255 A1 11/2013 Cummins et al.
2013/0325964 A1 12/2013 Berberat
2013/0344896 A1 12/2013 Kirmse et al.
2013/0346205 A1 12/2013 Hogg et al.
2013/0346869 A1 12/2013 Asver et al.
2013/0346877 A1 12/2013 Borovoy et al.
2014/0003739 A1 1/2014 S V et al.
2014/0006129 A1 1/2014 Heath
2014/0009499 A1 1/2014 Gardenfors et al.
2014/0011538 A1 1/2014 Mulcahy et al.
2014/0013243 A1 1/2014 Flynn et al.
2014/0019264 A1 1/2014 Wachman et al.
2014/0028589 A1 1/2014 Reilly
2014/0029034 A1 1/2014 Toriyama
2014/0032682 A1 1/2014 Prado et al.
2014/0040712 A1 2/2014 Chang et al.
2014/0043204 A1 2/2014 Basnayake et al.
2014/0043355 A1 2/2014 Kim et al.
2014/0045530 A1 2/2014 Gordon et al.
2014/0047016 A1 2/2014 Rao
2014/0047045 A1 2/2014 Baldwin et al.
2014/0047074 A1 2/2014 Chung et al.
2014/0047335 A1 2/2014 Lewis et al.
2014/0049652 A1 2/2014 Moon et al.
2014/0052281 A1 2/2014 Eronen et al.
2014/0052485 A1 2/2014 Shidfar
2014/0052633 A1 2/2014 Gandhi
2014/0057648 A1 2/2014 Lyman et al.
2014/0057660 A1 2/2014 Wager
2014/0059479 A1 2/2014 Hamburg et al.
2014/0066106 A1 3/2014 Ngo et al.
2014/0068692 A1 3/2014 Archibong et al.
2014/0082651 A1 3/2014 Sharifi
2014/0086562 A1 3/2014 Lassman et al.
2014/0089264 A1 3/2014 Talagala et al.
2014/0089314 A1 3/2014 Lizuka et al.
2014/0092130 A1 4/2014 Anderson et al.
2014/0095296 A1 4/2014 Angell et al.
2014/0096029 A1 4/2014 Schultz
2014/0114565 A1 4/2014 Aziz et al.
2014/0122502 A1 5/2014 Kalmes et al.
2014/0122658 A1 5/2014 Haeger et al.
2014/0122787 A1 5/2014 Shalvi et al.
2014/0129627 A1 5/2014 Baldwin et al.
2014/0129953 A1 5/2014 Spiegel
2014/0136985 A1 5/2014 Albir et al.
2014/0143064 A1 5/2014 Tran
2014/0143143 A1 5/2014 Fasoli et al.
2014/0149519 A1 5/2014 Redfern et al.
2014/0153837 A1 6/2014 Steiner
2014/0153902 A1 6/2014 Pearson et al.
2014/0155094 A1 6/2014 Zises et al.
2014/0155102 A1 6/2014 Cooper et al.
2014/0156410 A1 6/2014 Wuersch et al.
2014/0164118 A1 6/2014 Polachi
2014/0164557 A1 6/2014 Keskitalo et al.
2014/0164979 A1 6/2014 Deeter et al.
2014/0172542 A1 6/2014 Poncz et al.
2014/0172877 A1 6/2014 Rubinstein et al.
2014/0173424 A1 6/2014 Hogeg et al.
2014/0173457 A1 6/2014 Wang et al.
2014/0173460 A1 6/2014 Kim
2014/0180829 A1 6/2014 Umeda
2014/0181193 A1 6/2014 Narasimhan et al.
2014/0181934 A1 6/2014 Mayblum et al.
2014/0188815 A1 7/2014 Mentz et al.
2014/0189592 A1 7/2014 Benchenaa et al.
2014/0192737 A1 7/2014 Belghoul et al.
2014/0194101 A1 7/2014 Mullen et al.
2014/0201527 A1 7/2014 Krivorot
2014/0207679 A1 7/2014 Cho
2014/0207860 A1 7/2014 Wang et al.
2014/0214471 A1 7/2014 Schreiner, III
2014/0222564 A1 8/2014 Kranendonk et al.
2014/0222570 A1 8/2014 Devolites et al.
2014/0222913 A1 8/2014 Cathcart et al.
2014/0236468 A1 8/2014 Dave et al.
2014/0250465 A1 9/2014 Mulholland et al.
2014/0258405 A1 9/2014 Perkin
2014/0265359 A1 9/2014 Cheng et al.
2014/0266703 A1 9/2014 Dalley, Jr. et al.
2014/0279040 A1 9/2014 Kuboyama
2014/0279061 A1 9/2014 Elimeliah et al.
2014/0279128 A1 9/2014 Sagebin
2014/0279269 A1 9/2014 Brantley et al.
2014/0279436 A1 9/2014 Dorsey et al.
2014/0279540 A1 9/2014 Jackson
2014/0280140 A1 9/2014 Ling et al.
2014/0280537 A1 9/2014 Pridmore et al.
2014/0282068 A1 9/2014 Levkovitz et al.
2014/0282096 A1 9/2014 Rubinstein et al.
2014/0286566 A1 9/2014 Rhoads
2014/0287779 A1 9/2014 O'Keefe et al.
2014/0289157 A1 9/2014 Kenna, III et al.
2014/0289603 A1 9/2014 Subrahmanya et al.
2014/0289833 A1 9/2014 Briceno
2014/0298210 A1 10/2014 Park et al.
2014/0304622 A1 10/2014 Jorasch et al.
2014/0306986 A1 10/2014 Gottesman et al.
2014/0317302 A1 10/2014 Naik
2014/0320662 A1 10/2014 Mcnamee et al.
2014/0324627 A1 10/2014 Haver et al.
2014/0324629 A1 10/2014 Jacobs
2014/0325383 A1 10/2014 Brown et al.
2014/0325569 A1 10/2014 Suzuki et al.
2014/0331188 A1 11/2014 Sandstrom et al.
2014/0337123 A1 11/2014 Nuernberg et al.
2014/0344698 A1 11/2014 Hohteri et al.
2014/0359024 A1 12/2014 Spiegel
2014/0359032 A1 12/2014 Spiegel et al.
2014/0359656 A1 12/2014 Banica et al.
2014/0372844 A1 12/2014 Zumkhawala
2014/0372850 A1 12/2014 Campbell et al.
2014/0379683 A1 12/2014 Bazaz
2015/0012603 A1 1/2015 Saito

(56) References Cited

U.S. PATENT DOCUMENTS

2015/0013016 A1 1/2015 Kanter et al.
2015/0015680 A1 1/2015 Wang et al.
2015/0018649 A1 1/2015 Lisogurski et al.
2015/0020086 A1 1/2015 Chen et al.
2015/0040011 A1 2/2015 Chun
2015/0042572 A1 2/2015 Lombardi et al.
2015/0043033 A1 2/2015 Sugimoto
2015/0046278 A1 2/2015 Pei et al.
2015/0055197 A1 2/2015 Romanoff et al.
2015/0058957 A1 2/2015 Halliday et al.
2015/0063724 A1 3/2015 Ikeda et al.
2015/0071619 A1 3/2015 Brough
2015/0081630 A1 3/2015 Linsalata et al.
2015/0087263 A1 3/2015 Branscomb et al.
2015/0088622 A1 3/2015 Ganschow et al.
2015/0094083 A1 4/2015 Ngo
2015/0094093 A1 4/2015 Pierce et al.
2015/0094106 A1 4/2015 Grossman et al.
2015/0095020 A1 4/2015 Leydon
2015/0095355 A1* 4/2015 Patton .................... G06F 16/29 707/754
2015/0096042 A1 4/2015 Mizrachi
2015/0103097 A1 4/2015 Li
2015/0116529 A1 4/2015 Wu et al.
2015/0127643 A1 5/2015 Cohen et al.
2015/0127754 A1 5/2015 Clark et al.
2015/0130178 A1 5/2015 Clements
2015/0134318 A1 5/2015 Cuthbert et al.
2015/0142753 A1 5/2015 Soon-Shiong
2015/0149091 A1 5/2015 Milton et al.
2015/0154650 A1 6/2015 Umeda
2015/0161178 A1 6/2015 Doiu
2015/0161822 A1 6/2015 Basu
2015/0163629 A1 6/2015 Cheung
2015/0168174 A1 6/2015 Abramson et al.
2015/0168175 A1 6/2015 Abramson et al.
2015/0169827 A1 6/2015 Laborde
2015/0172534 A1 6/2015 Miyakawa et al.
2015/0177937 A1 6/2015 Poletto et al.
2015/0178260 A1 6/2015 Brunson
2015/0185990 A1 7/2015 Thompson
2015/0186497 A1 7/2015 Patton et al.
2015/0188869 A1 7/2015 Gilad et al.
2015/0189475 A1 7/2015 Schillings
2015/0193685 A1 7/2015 Srinivasan et al.
2015/0199082 A1 7/2015 Scholler et al.
2015/0206349 A1 7/2015 Rosenthal et al.
2015/0220492 A1 8/2015 Simeonov et al.
2015/0222814 A1 8/2015 Li et al.
2015/0227602 A1 8/2015 Ramu et al.
2015/0237472 A1 8/2015 Alsina et al.
2015/0237473 A1 8/2015 Koepke
2015/0241231 A1 8/2015 Abramson et al.
2015/0248683 A1 9/2015 Walkingshaw
2015/0249710 A1 9/2015 Stefansson et al.
2015/0254704 A1 9/2015 Kothe et al.
2015/0261917 A1 9/2015 Smith
2015/0262208 A1 9/2015 Bjontegard
2015/0269624 A1 9/2015 Cheng et al.
2015/0271779 A1 9/2015 Alavudin
2015/0287072 A1* 10/2015 Golden ................. G06Q 30/02 705/14.43
2015/0294367 A1 10/2015 Oberbrunner et al.
2015/0312184 A1 10/2015 Langholz et al.
2015/0325268 A1 11/2015 Berger et al.
2015/0326510 A1 11/2015 Tomlinson et al.
2015/0332310 A1 11/2015 Cui et al.
2015/0332317 A1 11/2015 Cui et al.
2015/0332325 A1 11/2015 Sharma et al.
2015/0332329 A1 11/2015 Luo et al.
2015/0334077 A1 11/2015 Feldman
2015/0334347 A1 11/2015 Kang et al.
2015/0341747 A1* 11/2015 Barrand ............ G06Q 30/0201 455/405
2015/0350136 A1 12/2015 Flynn, III et al.
2015/0356190 A1 12/2015 Rotem et al.
2015/0358806 A1 12/2015 Salqvist
2015/0365795 A1 12/2015 Allen et al.
2015/0367233 A1 12/2015 Hicks et al.
2015/0378502 A1 12/2015 Hu et al.
2015/0381682 A1 12/2015 Rao et al.
2015/0381688 A1 12/2015 Jenkins et al.
2016/0006927 A1 1/2016 Sehn
2016/0014063 A1 1/2016 Hogeg et al.
2016/0019592 A1 1/2016 Muttineni et al.
2016/0021153 A1 1/2016 Hull et al.
2016/0034253 A1 2/2016 Bang et al.
2016/0034712 A1 2/2016 Patton et al.
2016/0034786 A1 2/2016 Suri et al.
2016/0048369 A1 2/2016 Zenoff
2016/0050704 A1 2/2016 Von Sneidern et al.
2016/0055250 A1 2/2016 Rush
2016/0085773 A1 3/2016 Chang et al.
2016/0085863 A1 3/2016 Allen et al.
2016/0085994 A1 3/2016 Pereira
2016/0086670 A1 3/2016 Gross et al.
2016/0092561 A1 3/2016 Liu et al.
2016/0092962 A1 3/2016 Wasserman et al.
2016/0098742 A1 4/2016 Minicucci et al.
2016/0099901 A1 4/2016 Allen et al.
2016/0105387 A1 4/2016 Jackson
2016/0119272 A1 4/2016 Rubinstein et al.
2016/0127871 A1 5/2016 Smith et al.
2016/0134941 A1 5/2016 Selvaraj
2016/0139748 A1 5/2016 Iwaizumi et al.
2016/0149843 A1 5/2016 Spicer et al.
2016/0180887 A1 6/2016 Sehn
2016/0182422 A1 6/2016 Sehn et al.
2016/0182875 A1 6/2016 Sehn
2016/0196584 A1 7/2016 Franklin et al.
2016/0210657 A1 7/2016 Chittilappilly et al.
2016/0219402 A1 7/2016 Zimerman et al.
2016/0234023 A1 8/2016 Mozer et al.
2016/0234556 A1 8/2016 Berridge
2016/0239248 A1 8/2016 Sehn
2016/0239457 A1 8/2016 Gross et al.
2016/0247537 A1 8/2016 Ricciardi
2016/0253833 A1 9/2016 Lew
2016/0253912 A1 9/2016 Heilman et al.
2016/0274705 A1 9/2016 Kapadia et al.
2016/0277419 A1 9/2016 Allen et al.
2016/0286244 A1 9/2016 Chang et al.
2016/0292735 A1 10/2016 Kim
2016/0321708 A1 11/2016 Sehn
2016/0321765 A1* 11/2016 Malone .................. G06Q 30/02
2016/0352659 A1 12/2016 Krishnamoorth
2016/0359957 A1 12/2016 Laliberte
2016/0359987 A1 12/2016 Laliberte
2016/0364668 A1 12/2016 Young et al.
2017/0006094 A1 1/2017 Abou Mahmoud et al.
2017/0026786 A1 1/2017 Barron et al.
2017/0061308 A1 3/2017 Chen et al.
2017/0078760 A1 3/2017 Christoph et al.
2017/0091795 A1 3/2017 Mansour et al.
2017/0111617 A1 4/2017 Kuwahara et al.
2017/0127233 A1 5/2017 Liang et al.
2017/0132647 A1 5/2017 Bostick et al.
2017/0134821 A1 5/2017 D'Amelio et al.
2017/0149717 A1 5/2017 Sehn
2017/0161382 A1 6/2017 Ouimet et al.
2017/0164161 A1 6/2017 Gupta et al.
2017/0185256 A1 6/2017 Bennett
2017/0186038 A1 6/2017 Glover et al.
2017/0222962 A1 8/2017 Gauglitz et al.
2017/0230315 A1 8/2017 Zubas et al.
2017/0263029 A1 9/2017 Yan et al.
2017/0287006 A1 10/2017 Azmoodeh et al.
2017/0295250 A1 10/2017 Samaranayake et al.
2017/0310888 A1 10/2017 Wright et al.
2017/0329481 A1 11/2017 Stoop et al.
2017/0339521 A1 11/2017 Colonna et al.
2017/0359686 A1 12/2017 Colonna et al.
2017/0374003 A1 12/2017 Allen et al.
2017/0374508 A1 12/2017 Davis et al.

(56) References Cited

U.S. PATENT DOCUMENTS

| | | | |
|---|---|---|---|
| 2018/0013975 | A1 | 1/2018 | Tang |
| 2018/0069817 | A1 | 3/2018 | Constantinides |
| 2018/0103002 | A1 | 4/2018 | Sehn |
| 2018/0121957 | A1 | 5/2018 | Cornwall et al. |
| 2018/0131663 | A1 | 5/2018 | Halliday et al. |
| 2018/0189835 | A1 | 7/2018 | Deluca et al. |
| 2018/0225687 | A1 | 8/2018 | Ahmed et al. |
| 2018/0278562 | A1 | 9/2018 | Tang |
| 2018/0279016 | A1 | 9/2018 | Tang |
| 2018/0301169 | A1 | 10/2018 | Ricciardi |
| 2018/0315133 | A1 | 11/2018 | Brody et al. |
| 2018/0315134 | A1 | 11/2018 | Amitay et al. |
| 2018/0316575 | A1 | 11/2018 | Son et al. |
| 2019/0097812 | A1 | 3/2019 | Toth |
| 2019/0220932 | A1 | 7/2019 | Amitay et al. |
| 2019/0222657 | A1 | 7/2019 | Simkhai et al. |
| 2019/0237106 | A1 | 8/2019 | Sehn |
| 2019/0342699 | A1 | 11/2019 | Sehn et al. |
| 2019/0372991 | A1 | 12/2019 | Allen et al. |
| 2020/0057590 | A1 | 2/2020 | Sehn |
| 2020/0105304 | A1 | 4/2020 | Sehn |
| 2020/0112531 | A1 | 4/2020 | Tang |
| 2020/0193053 | A1 | 6/2020 | Murphy et al. |
| 2020/0204726 | A1 | 6/2020 | Ebsen et al. |
| 2020/0213804 | A1 | 7/2020 | Sehn et al. |
| 2020/0288270 | A1 | 9/2020 | Allen et al. |
| 2020/0329336 | A1 | 10/2020 | Sehn et al. |
| 2020/0359166 | A1 | 11/2020 | Noeth et al. |
| 2020/0359167 | A1 | 11/2020 | Noeth et al. |
| 2020/0411058 | A1 | 12/2020 | Sehn |
| 2021/0006526 | A1 | 1/2021 | Allen et al. |
| 2021/0006527 | A1 | 1/2021 | Allen et al. |
| 2021/0006528 | A1 | 1/2021 | Allen et al. |
| 2021/0014238 | A1 | 1/2021 | Allen et al. |
| 2021/0073249 | A1 | 3/2021 | Chang et al. |
| 2021/0273903 | A1 | 9/2021 | Allen et al. |
| 2021/0342473 | A1 | 11/2021 | Murphy et al. |
| 2022/0086340 | A1 | 3/2022 | Ebsen et al. |
| 2022/0237691 | A1 | 7/2022 | Allen et al. |
| 2022/0318281 | A1 | 10/2022 | Chang et al. |
| 2023/0171261 | A1 | 6/2023 | Allen et al. |
| 2025/0348928 | A1 | 11/2025 | Allen et al. |

FOREIGN PATENT DOCUMENTS

| | | | |
|---|---|---|---|
| CA | 2910158 | C | 6/2019 |
| CN | 1879071 | A | 12/2006 |
| CN | 101635763 | A | 1/2010 |
| CN | 101981987 | A | 2/2011 |
| CN | 102118419 | A | 7/2011 |
| CN | 102236848 | A | 11/2011 |
| CN | 102238107 | A | 11/2011 |
| CN | 102572575 | A | 7/2012 |
| CN | 102930107 | A | 2/2013 |
| CN | 102945276 | A | 2/2013 |
| CN | 103020303 | A | 4/2013 |
| CN | 103095768 | A | 5/2013 |
| CN | 103200238 | A | 7/2013 |
| CN | 103248761 | A | 8/2013 |
| CN | 103297936 | A | 9/2013 |
| CN | 103391368 | A | 11/2013 |
| CN | 103440767 | A | 12/2013 |
| CN | 103533501 | A | 1/2014 |
| CN | 103699662 | A | 4/2014 |
| CN | 103947229 | A | 7/2014 |
| CN | 104160728 | A | 11/2014 |
| CN | 104969219 | A | 10/2015 |
| CN | 105760466 | A | 7/2016 |
| CN | 106165463 | A | 11/2016 |
| CN | 106663264 | A | 5/2017 |
| CN | 107004225 | A | 8/2017 |
| CN | 107111828 | A | 8/2017 |
| CN | 107251006 | A | 10/2017 |
| CN | 107637099 | A | 1/2018 |
| CN | 107710772 | A | 2/2018 |
| CN | 109247071 | A | 1/2019 |
| CN | 106663264 | B | 5/2019 |
| CN | 110163663 | A | 8/2019 |
| CN | 110249359 | A | 9/2019 |
| CN | 110462616 | A | 11/2019 |
| CN | 107637099 | B | 10/2020 |
| CN | 112040410 | A | 12/2020 |
| CN | 107111828 | B | 5/2021 |
| CN | 113112306 | A | 7/2021 |
| CN | 109247071 | B | 11/2021 |
| CN | 113825091 | A | 12/2021 |
| CN | 112040410 | B | 10/2022 |
| CN | 110249359 | B | 9/2023 |
| CN | 113825091 | B | 5/2024 |
| DE | 202015009885 | U1 | 1/2021 |
| EP | 2051480 | A1 | 4/2009 |
| EP | 2151797 | A1 | 2/2010 |
| EP | 3234794 | B1 | 5/2020 |
| EP | 3272078 | B1 | 1/2022 |
| GB | 2399928 | A | 9/2004 |
| JP | 2012104106 | A | 5/2012 |
| KR | 19990073076 | A | 10/1999 |
| KR | 20010078417 | A | 8/2001 |
| KR | 20060008469 | A | 1/2006 |
| KR | 20060043137 | A | 5/2006 |
| KR | 1020060038872 | A | 5/2006 |
| KR | 20060102677 | A | 9/2006 |
| KR | 20070121728 | A | 12/2007 |
| KR | 1020080006729 | A | 1/2008 |
| KR | 1020080017854 | A | 2/2008 |
| KR | 20080028962 | A | 4/2008 |
| KR | 20100006371 | A | 1/2010 |
| KR | 20120054671 | A | 5/2012 |
| KR | 20120121452 | A | 11/2012 |
| KR | 20120125381 | A | 11/2012 |
| KR | 1020120140404 | A | 12/2012 |
| KR | 20130061724 | A | 6/2013 |
| KR | 20130091878 | A | 8/2013 |
| KR | 20140066278 | A | 6/2014 |
| KR | 1020140066795 | A | 6/2014 |
| KR | 1020140115413 | A | 10/2014 |
| KR | 101457964 | B1 | 11/2014 |
| KR | 20150091381 | A | 8/2015 |
| KR | 1020150100781 | A | 9/2015 |
| KR | 20160019900 | A | 2/2016 |
| KR | 20160086909 | A | 7/2016 |
| KR | 10-1822920 | | 1/2018 |
| KR | 101869473 | | 6/2018 |
| KR | 101933840 | B1 | 12/2018 |
| KR | 101983523 | B1 | 5/2019 |
| KR | 102017508 | B1 | 8/2019 |
| KR | 102021727 | B1 | 9/2019 |
| KR | 102035405 | B1 | 10/2019 |
| KR | 102051788 | B1 | 12/2019 |
| KR | 102057592 | B1 | 12/2019 |
| KR | 102077441 | B1 | 2/2020 |
| KR | 102094065 | B1 | 3/2020 |
| KR | 20177014135 | A | 3/2020 |
| KR | 102111446 | B1 | 5/2020 |
| KR | 102163528 | B1 | 9/2020 |
| KR | 102207784 | B1 | 1/2021 |
| KR | 102217116 | B1 | 2/2021 |
| KR | 102217723 | B1 | 2/2021 |
| KR | 102337568 | B1 | 12/2021 |
| KR | 102344482 | B1 | 12/2021 |
| KR | 102371138 | B1 | 3/2022 |
| KR | 102466368 | B1 | 11/2022 |
| KR | 102495686 | B1 | 2/2023 |
| KR | 102524426 | B1 | 4/2023 |
| KR | 102656565 | B1 | 4/2024 |
| WO | WO-1996024213 | A1 | 8/1996 |
| WO | WO-1999063453 | A1 | 12/1999 |
| WO | WO-2000058882 | A1 | 10/2000 |
| WO | WO-2001029642 | A1 | 4/2001 |
| WO | WO-2001050703 | A3 | 7/2001 |
| WO | WO-2006118755 | A2 | 11/2006 |
| WO | WO-2007092668 | A2 | 8/2007 |
| WO | WO-2009043020 | A2 | 4/2009 |
| WO | WO-2011040821 | A1 | 4/2011 |

(56) References Cited

FOREIGN PATENT DOCUMENTS

| | | | |
|---|---|---|---|
| WO | WO-2011119407 | A1 | 9/2011 |
| WO | WO-2012000107 | A1 | 1/2012 |
| WO | WO-2013006584 | A1 | 1/2013 |
| WO | WO-2013008238 | A1 | 1/2013 |
| WO | WO-2013008251 | A2 | 1/2013 |
| WO | WO-2013045753 | A1 | 4/2013 |
| WO | WO-2013058897 | A1 | 4/2013 |
| WO | WO-2013126784 | A2 | 8/2013 |
| WO | WO-2014006129 | A1 | 1/2014 |
| WO | WO-2014031562 | A1 | 2/2014 |
| WO | WO-2014031899 | A1 | 2/2014 |
| WO | WO-2014068573 | A1 | 5/2014 |
| WO | WO-2014093668 | A1 | 6/2014 |
| WO | WO-2014115136 | A1 | 7/2014 |
| WO | WO-2014172388 | A1 | 10/2014 |
| WO | WO-2014194262 | A2 | 12/2014 |
| WO | WO-2015085176 | A1 | 6/2015 |
| WO | WO-2015179303 | A1 | 11/2015 |
| WO | WO-2015192026 | A1 | 12/2015 |
| WO | WO-2016007285 | A1 | 1/2016 |
| WO | WO-2016044424 | A1 | 3/2016 |
| WO | WO-2016054562 | A1 | 4/2016 |
| WO | WO-2016065131 | A1 | 4/2016 |
| WO | WO-2016100318 | A2 | 6/2016 |
| WO | WO-2016100318 | A3 | 6/2016 |
| WO | WO-2016100342 | A1 | 6/2016 |
| WO | WO-2016/112299 | A1 | 7/2016 |
| WO | WO-2016123381 | A1 | 8/2016 |
| WO | WO-2016149594 | A1 | 9/2016 |
| WO | WO-2016179166 | A1 | 11/2016 |
| WO | WO-2016179235 | A1 | 11/2016 |
| WO | WO-2016202890 | A1 | 12/2016 |
| WO | WO-2017106529 | A1 | 6/2017 |
| WO | WO-2017176739 | A1 | 10/2017 |
| WO | WO-2017176992 | A1 | 10/2017 |
| WO | WO-2018005644 | A1 | 1/2018 |
| WO | WO-2018144931 | A1 | 8/2018 |
| WO | WO-2018183119 | A1 | 10/2018 |

OTHER PUBLICATIONS

Sandro Rodriguez Garzon, Geofencing 2.0: Taking Location-based Notifications to the Next Level, 2012 (Year: 2012).*

U.S. Appl. No. 14/494,226 U.S. Pat. No. 11,216,869, filed Sep. 23, 2014, User Interface to Augment an Image Using Geolocation.

U.S. Appl. No. 17/567,624, filed Jan. 3, 2022, User Interface to Augment an Image Using Geolocation..

U.S. Appl. No. 15/474,821, filed Mar. 30, 2017, Mutable Geo-Fencing System.

"U.S. Appl. No. 17/567,624, Response filed Dec. 19, 2023 to Non Final Office Action mailed Sep. 29, 2023", 10 pgs.

"Chinese Application Serial No. 202111204686.2, Response filed Dec. 12, 2023 to Office Action mailed Aug. 2, 2023", w English claims, 14 pgs.

"U.S. Appl. No. 17/567,624, Final Office Action mailed Mar. 27, 2024", 38 pgs.

"A Whole New Story", Snap, Inc., [Online] Retrieved from the Internet: <URL: https://www.snap.com/en-US/news/>, (2017), 13 pgs.

"Adding photos to your listing", eBay, [Online] Retrieved from the Internet: <URL: http://pages.ebay.com/help/sell/pictures.html>, (accessed May 24, 2017), 4 pgs.

"Android Getting Started Guide", Voxer Business, [Online] Retrieved from the Internet: <URL: https://voxer.com/assets/AndroidGuide.pdf>, (Feb. 1, 2014), 18 pgs.

"U.S. Appl. No. 14/304,855, Corrected Notice of Allowance mailed Jun. 26, 2015", 8 pgs.

"U.S. Appl. No. 14/304,855, Final Office Action mailed Feb. 18, 2015", 10 pgs.

"U.S. Appl. No. 14/304,855, Non Final Office Action mailed Mar. 18, 2015", 9 pgs.

"U.S. Appl. No. 14/304,855, Non Final Office Action mailed Oct. 22, 2014", 11 pgs.

"U.S. Appl. No. 14/304,855, Notice of Allowance mailed Jun. 1, 2015", 11 pgs.

"U.S. Appl. No. 14/304,855, Response filed Feb. 25, 2015 to Final Office Action mailed Feb. 18, 2015", 5 pgs.

"U.S. Appl. No. 14/304,855, Response filed Apr. 1, 2015 to Non Final Office Action mailed Mar. 18, 2015", 4 pgs.

"U.S. Appl. No. 14/304,855, Response filed Nov. 7, 2014 to Non Final Office Action mailed Oct. 22, 2014", 5 pgs.

"U.S. Appl. No. 14/494,226, Appeal Brief filed Mar. 1, 2019 in response to Final Office Action mailed Jun. 1, 2018", 29 pgs.

"U.S. Appl. No. 14/494,226, Appeal Decision mailed Feb. 26, 2021", 8 pgs.

"U.S. Appl. No. 14/494,226, Corrected Notice of Allowability mailed Sep. 28, 2021", 2 pgs.

"U.S. Appl. No. 14/494,226, Corrected Notice of Allowability mailed Dec. 6, 2021", 2 pgs.

"U.S. Appl. No. 14/494,226, Examiner Interview Summary mailed Oct. 27, 2016", 3 pgs.

"U.S. Appl. No. 14/494,226, Examiner Interview Summary mailed Dec. 20, 2017", 2 pgs.

"U.S. Appl. No. 14/494,226, Final Office Action mailed Mar. 7, 2017", 34 pgs.

"U.S. Appl. No. 14/494,226, Final Office Action mailed Jun. 1, 2018", 33 pgs.

"U.S. Appl. No. 14/494,226, Non Final Office Action mailed Sep. 7, 2017", 36 pgs.

"U.S. Appl. No. 14/494,226, Non Final Office Action mailed Sep. 12, 2016", 32 pgs.

"U.S. Appl. No. 14/494,226, Notice of Allowance mailed Jun. 9, 2021", 7 pgs.

"U.S. Appl. No. 14/494,226, Notice of Allowance mailed Aug. 25, 2021", 5 pgs.

"U.S. Appl. No. 14/494,226, Response filed Jan. 8, 2018 to Non Final Office Action mailed Sep. 7, 2017", 15 pgs.

"U.S. Appl. No. 14/494,226, Response filed Jul. 7, 2017 to Final Office Action mailed Mar. 7, 2017", 13 pgs.

"U.S. Appl. No. 14/494,226, Response filed Dec. 12, 2016 to Non Final Office Action mailed Sep. 12, 2016", 16 pgs.

"U.S. Appl. No. 14/505,478, Advisory Action mailed Apr. 14, 2015", 3 pgs.

"U.S. Appl. No. 14/505,478, Corrected Notice of Allowance mailed May 18, 2016", 2 pgs.

"U.S. Appl. No. 14/505,478, Corrected Notice of Allowance mailed Jul. 22, 2016", 2 pgs.

"U.S. Appl. No. 14/505,478, Final Office Action mailed Mar. 17, 2015", 16 pgs.

"U.S. Appl. No. 14/505,478, Non Final Office Action mailed Jan. 27, 2015", 13 pgs.

"U.S. Appl. No. 14/505,478, Non Final Office Action mailed Sep. 4, 2015", 19 pgs.

"U.S. Appl. No. 14/505,478, Notice of Allowance mailed Apr. 28, 2016", 11 pgs.

"U.S. Appl. No. 14/505,478, Notice of Allowance mailed Aug. 26, 2016", 11 pgs.

"U.S. Appl. No. 14/505,478, Response filed Jan. 30, 2015 to Non Final Office Action mailed Jan. 27, 2015", 10 pgs.

"U.S. Appl. No. 14/505,478, Response filed Mar. 4, 2016 to Non Final Office Action mailed Sep. 4, 2015", 12 pgs.

"U.S. Appl. No. 14/505,478, Response filed Apr. 1, 2015 to Final Office Action mailed Mar. 17, 2015", 6 pgs.

"U.S. Appl. No. 14/506,478, Response filed Aug. 17, 2015 to Advisory Action mailed Apr. 14, 2015", 10 pgs.

"U.S. Appl. No. 14/510,016, Advisory Action mailed Nov. 30, 2017", 7 pgs.

"U.S. Appl. No. 14/510,016, Final Office Action mailed May 22, 2018", 36 pgs.

"U.S. Appl. No. 14/510,016, Final Office Action mailed Sep. 7, 2018", 34 pgs.

"U.S. Appl. No. 14/510,016, Final Office Action mailed Sep. 8, 2017", 21 pgs.

(56) References Cited

OTHER PUBLICATIONS

"U.S. Appl. No. 14/510,016, Non Final Office Action mailed Feb. 7, 2018", 36 pgs.
"U.S. Appl. No. 14/510,016, Non Final Office Action mailed Apr. 21, 2017", 55 pgs.
"U.S. Appl. No. 14/510,016, Response filed Jan. 8, 2017 to Final Office Action mailed Sep. 8, 2017", 22 pgs.
"U.S. Appl. No. 14/510,016, Response Filed May 7, 2018 to Non Final Office Action mailed Feb. 7, 2018", 13 pgs.
"U.S. Appl. No. 14/510,016, Response Filed Jul. 21, 2017 to Non Final Office Action mailed Apr. 21, 2017", 21 pgs.
"U.S. Appl. No. 14/510,016, Response filed Aug. 23, 2018 to Final Office Action mailed May 22, 2018", 16 pgs.
"U.S. Appl. No. 14/510,016, Response filed Nov. 8, 2017 to Final Office Action mailed Sep. 8, 2017", 24 pgs.
"U.S. Appl. No. 14/523,728, Non Final Office Action mailed Dec. 12, 2014", 10 pgs.
"U.S. Appl. No. 14/523,728, Notice of Allowance mailed Mar. 24, 2015", 8 pgs.
"U.S. Appl. No. 14/523,728, Notice of Allowance mailed Apr. 15, 2015", 8 pgs.
"U.S. Appl. No. 14/523,728, Notice of Allowance mailed Jun. 5, 2015", 8 pgs.
"U.S. Appl. No. 14/523,728, Response filed Aug. 25, 2014 to Non Final Office Action mailed Jan. 16, 2015", 5 pgs.
"U.S. Appl. No. 14/529,064, Examiner Interview Summary mailed May 23, 2016", 3 pgs.
"U.S. Appl. No. 14/529,064, Examiner Interview Summary mailed Nov. 17, 2016", 3 pgs.
"U.S. Appl. No. 14/529,064, Final Office Action mailed Jan. 25, 2018", 39 pgs.
"U.S. Appl. No. 14/529,064, Final Office Action mailed Aug. 11, 2015", 23 pgs.
"U.S. Appl. No. 14/529,064, Final Office Action mailed Aug. 24, 2016", 23 pgs.
"U.S. Appl. No. 14/529,064, Non Final Office Action mailed Mar. 12, 2015", 20 pgs.
"U.S. Appl. No. 14/529,064, Non Final Office Action mailed Apr. 6, 2017", 25 pgs.
"U.S. Appl. No. 14/529,064, Non Final Office Action mailed Apr. 18, 2016", 21 pgs.
"U.S. Appl. No. 14/529,064, Non Final Office Action mailed Jul. 13, 2018", 38 pgs.
"U.S. Appl. No. 14/529,064, Response filed Feb. 5, 2015 to Restriction Requirement mailed Feb. 2, 2015", 6 pgs.
"U.S. Appl. No. 14/529,064, Response filed Mar. 26, 2015 to Non Final Office Action mailed Mar. 12, 2015", 8 pgs.
"U.S. Appl. No. 14/529,064, Response filed May 25, 2018 to Final Office Action mailed Jan. 25, 2018", 20 pgs.
"U.S. Appl. No. 14/529,064, Response filed Jul. 18, 2016 to Non Final Office Action mailed Apr. 18, 2016", 20 pgs.
"U.S. Appl. No. 14/529,064, Response filed Sep. 6, 2017 to Non Final Office Action mailed Apr. 6, 2017", 24 pgs.
"U.S. Appl. No. 14/529,064, Response filed Sep. 6, 2017 to Non Final Office Action mailed Apr. 6, 2017", 19 pgs.
"U.S. Appl. No. 14/529,064, Response filed Oct. 12, 2015 to Final Office Action mailed Aug. 11, 2015", 19 pgs.
"U.S. Appl. No. 14/529,064, Response filed Dec. 21, 2016 to Final Office Action mailed Aug. 24, 2016", 17 pgs.
"U.S. Appl. No. 14/529,064, Restriction Requirement mailed Feb. 2, 2015", 5 pgs.
"U.S. Appl. No. 14/539,391, Notice of Allowance mailed Mar. 5, 2015", 17 pgs.
"U.S. Appl. No. 14/548,590, Advisory Action mailed Apr. 19, 2018", 2 pgs.
"U.S. Appl. No. 14/548,590, Advisory Action mailed Nov. 18, 2016", 3 pgs.
"U.S. Appl. No. 14/548,590, Appeal Brief Filed Apr. 20, 2018", 28 pgs.
"U.S. Appl. No. 14/548,590, Appeal Decision mailed Mar. 26, 2020", 13 pgs.
"U.S. Appl. No. 14/548,590, Final Office Action mailed Jul. 5, 2016", 16 pgs.
"U.S. Appl. No. 14/548,590, Final Office Action mailed Jul. 18, 2017", 20 pgs.
"U.S. Appl. No. 14/548,590, Final Office Action mailed Sep. 16, 2015", 15 pgs.
"U.S. Appl. No. 14/548,590, Non Final Office Action mailed Jan. 9, 2017", 14 pgs.
"U.S. Appl. No. 14/548,590, Non Final Office Action mailed Feb. 11, 2016", 16 pgs.
"U.S. Appl. No. 14/548,590, Non Final Office Action mailed Apr. 20, 2015", 14 pgs.
"U.S. Appl. No. 14/548,590, Notice of Allowance mailed Jun. 17, 2020", 9 pgs.
"U.S. Appl. No. 14/548,590, Response filed May 9, 2017 to Non Final Office Action mailed Jan. 9, 2017", 17 pgs.
"U.S. Appl. No. 14/548,590, Response filed May 10, 2016 to Non Final Office Action mailed Feb. 11, 2016", 14 pgs.
"U.S. Appl. No. 14/548,590, Response filed Nov. 7, 2016 to Final Office Action mailed Jul. 5, 2016", 14 pgs.
"U.S. Appl. No. 14/548,590, Response filed Dec. 16, 2015 to Final Office Action mailed Sep. 16, 2015", 13 pgs.
"U.S. Appl. No. 14/548,590, Response filed Jun. 16, 2015 mailed Apr. 20, 2015", 19 pgs.
"U.S. Appl. No. 14/578,258, Examiner Interview Summary mailed Nov. 25, 2015", 3 pgs.
"U.S. Appl. No. 14/578,258, Non Final Office Action mailed Jun. 10, 2015", 12 pgs.
"U.S. Appl. No. 14/578,258, Notice of Allowance mailed Feb. 26, 2016", 5 pgs.
"U.S. Appl. No. 14/578,258, Response filed Dec. 10, 2015 mailed Jun. 10, 2015", 11 pgs.
"U.S. Appl. No. 14/578,271, Corrected Notice of Allowance mailed Oct. 30, 2017", 2 pgs
"U.S. Appl. No. 14/578,271, Final Office Action mailed Dec. 3, 2015", 15 pgs.
"U.S. Appl. No. 14/578,271, Non Final Office Action mailed Aug. 7, 2015", 12 pgs.
"U.S. Appl. No. 14/578,271, Notice of Allowability mailed Nov. 29, 2017", 3 pgs.
"U.S. Appl. No. 14/578,271, Notice of Allowance mailed Aug. 1, 2017", 5 pgs.
"U.S. Appl. No. 14/578,271, Notice of Allowance mailed Dec. 7, 2016", 7 pgs.
"U.S. Appl. No. 14/578,271, Response filed Feb. 9, 2016 to Final Office Action mailed Dec. 3, 2015", 10 pgs.
"U.S. Appl. No. 14/578,271, Response filed Jun. 19, 2015 to Restriction Requirement mailed Apr. 23, 2015", 6 pgs.
"U.S. Appl. No. 14/578,271, Response filed Oct. 28, 2015 to Non Final Office Action mailed Aug. 7, 2015", 9 pgs.
"U.S. Appl. No. 14/578,271, Restriction Requirement mailed Apr. 23, 2015", 8 pgs.
"U.S. Appl. No. 14/594,410, Non Final Office Action mailed Jan. 4, 2016", 10 pgs.
"U.S. Appl. No. 14/594,410, Notice of Allowance mailed Aug. 2, 2016", 5 pgs.
"U.S. Appl. No. 14/594,410, Notice of Allowance mailed Dec. 15, 2016", 6 pgs.
"U.S. Appl. No. 14/594,410, Response filed Jul. 1, 2016 to Non Final Office Action mailed Jan. 4, 2016", 10 pgs.
"U.S. Appl. No. 14/612,692, Examiner Interview Summary mailed Jan. 29, 2016", 5 pgs.
"U.S. Appl. No. 14/612,692, Examiner Interview Summary mailed May 14, 2018", 3 pgs.
"U.S. Appl. No. 14/612,692, Examiner Interview Summary mailed Jul. 6, 2016", 4 pgs.
"U.S. Appl. No. 14/612,692, Examiner Interview Summary mailed Aug. 14, 2015", 3 pgs.
"U.S. Appl. No. 14/612,692, Examiner Interview Summary mailed Sep. 8, 2016", 3 pgs.

(56) References Cited

OTHER PUBLICATIONS

"U.S. Appl. No. 14/612,692, Examiner Interview Summary mailed Nov. 13, 2017", 13 pgs.
"U.S. Appl. No. 14/612,692, Final Office Action mailed Aug. 15, 2016", 18 pgs.
"U.S. Appl. No. 14/612,692, Final Office Action mailed Aug. 25, 2017", 18 pgs.
"U.S. Appl. No. 14/612,692, Final Office Action mailed Nov. 23, 2015", 15 pgs.
"U.S. Appl. No. 14/612,692, Non Final Office Action mailed Jan. 3, 2017", 17 pgs.
"U.S. Appl. No. 14/612,692, Non Final Office Action mailed Jan. 9, 2018", 19 pgs.
"U.S. Appl. No. 14/612,692, Non Final Office Action mailed Mar. 28, 2016", 15 pgs.
"U.S. Appl. No. 14/612,692, Non Final Office Action mailed Jul. 20, 2015", 25 pgs.
"U.S. Appl. No. 14/612,692, Notice of Allowance mailed Jul. 5, 2018", 11 pgs.
"U.S. Appl. No. 14/612,692, Response filed Feb. 23, 2016 to Final Office Action mailed Nov. 23, 2015", 10 pgs.
"U.S. Appl. No. 14/612,692, Response filed May 3, 2017 to Non Final Office Action mailed Jan. 3, 2017", 18 pgs.
"U.S. Appl. No. 14/612,692, Response Filed May 9, 2018 to Non Final Office Action mailed Jan. 9, 2018", 15 pgs.
"U.S. Appl. No. 14/612,692, Response filed Nov. 14, 2016 to Final Office Action mailed Aug. 15, 2016", 15 pgs.
"U.S. Appl. No. 14/612,692, Response Filed Nov. 22, 2017 to Final Office Action mailed Aug. 25, 2017", 11 pgs.
"U.S. Appl. No. 14/612,692, Response filed Jun. 28, 2016 to Non Final Office Action mailed Mar. 28, 2016", 14 pgs.
"U.S. Appl. No. 14/612,692. Response filed Oct. 19, 2015 to Non Final Office Action mailed Jul. 20, 2015", 11 pgs.
"U.S. Appl. No. 14/634,417, Advisory Action mailed Mar. 14, 2017", 3 pgs.
"U.S. Appl. No. 14/634,417, Corrected Notice of Allowability mailed Mar. 11, 2019", 3 pgs.
"U.S. Appl. No. 14/634,417, Corrected Notice of Allowability mailed Mar. 20, 2019", 3 pgs.
"U.S. Appl. No. 14/634,417, Examiner Interview Summary mailed Aug. 7, 2017", 3 pgs.
"U.S. Appl. No. 14/634,417, Final Office Action mailed Jan. 31, 2017", 27 pgs.
"U.S. Appl. No. 14/634,417, Non Final Office Action mailed Jun. 8, 2017", 17 pgs.
"U.S. Appl. No. 14/634,417, Non Final Office Action mailed Aug. 30, 2016", 23 pgs.
"U.S. Appl. No. 14/634,417, Notice of Allowance mailed May 22, 2018", 9 pgs.
"U.S. Appl. No. 14/634,417, Notice of Allowance mailed Oct. 25, 2017", 9 pgs.
"U.S. Appl. No. 14/634,417, Response filed Mar. 2, 2017 to Final Office Action mailed Jan. 31, 2017", 23 pgs.
"U.S. Appl. No. 14/634,417, Response filed Sep. 21, 2017 to Non Final Office Action mailed Jun. 8, 2017", 16 pgs.
"U.S. Appl. No. 14/634,417, Response filed Nov. 30, 2016 to Non Final Office Action mailed Aug. 30, 2016", 18 pgs.
"U.S. Appl. No. 14/682,259, Notice of Allowance mailed Jul. 27, 2015", 17 pgs.
"U.S. Appl. No. 14/704,212, Final Office Action mailed Jun. 17, 2016", 12 pgs.
"U.S. Appl. No. 14/704,212, Non Final Office Action mailed Mar. 12, 2018", 7 pgs.
"U.S. Appl. No. 14/704,212, Non Final Office Action mailed Jun. 16, 2017", 13 pgs.
"U.S. Appl. No. 14/704,212, Non Final Office Action mailed Nov. 25, 2016", 13 pgs.
"U.S. Appl. No. 14/704,212, Non Final Office Action mailed Dec. 4, 2015", 17 pgs.
"U.S. Appl. No. 14/704,212, Notice of Allowance mailed Jul. 2, 2018", 7 pgs.
"U.S. Appl. No. 14/704,212, Response filed Feb. 27, 2017 to Non Final Office Action mailed Nov. 25, 2016", 14 pgs.
"U.S. Appl. No. 14/704,212, Response filed Mar. 4, 2016 to Non Final Office Action mailed Dec. 4, 2015", 11 pgs.
"U.S. Appl. No. 14/704,212, Response Filed Jun. 12, 2018 to Non Final Office Action mailed Mar. 12, 2018", 9 pgs.
"U.S. Appl. No. 14/704,212, Response filed Oct. 17, 2016 to Final Office Action mailed Jun. 17, 2016", 12 pgs.
"U.S. Appl. No. 14/723,400, Final Office Action mailed Jan. 4, 2016", 14 pgs.
"U.S. Appl. No. 14/723,400, Non Final Office Action mailed Jul. 20, 2015", 14 pgs.
"U.S. Appl. No. 14/723,400, Notice of Allowance mailed Mar. 28, 2016", 12 pgs.
"U.S. Appl. No. 14/723,400, Notice of Non Compliant Amendment mailed Sep. 21, 2015", 2 pgs.
"U.S. Appl. No. 14/723,400, Notice of Non Compliant Amendment mailed Nov. 10, 2015", 2 pgs.
"U.S. Appl. No. 14/723,400, Response filed Jan. 29, 2016 to Final Office Action mailed Jan. 4, 2016", 8 pgs.
"U.S. Appl. No. 14/723,400, Response filed Aug. 13, 2015 to Non Final Office Action mailed Jul. 20, 2015", 7 pgs.
"U.S. Appl. No. 14/723,400, Response filed Sep. 23, 2015 to Notice of Non Compliant Amendment mailed Sep. 21, 2015", 5 pgs.
"U.S. Appl. No. 14/723,400, Response filed Nov. 19, 2015 to Notice of Non Compliant Amendment mailed Nov. 10, 2015", 5 pgs.
"U.S. Appl. No. 14/738,069, Non Final Office Action mailed Mar. 21, 2016", 12 pgs.
"U.S. Appl. No. 14/738,069, Notice of Allowance mailed Aug. 17, 2016", 6 pgs.
"U.S. Appl. No. 14/738,069, Response filed Jun. 10, 2016 to Non Final Office Action mailed Mar. 21, 2016", 10 pgs.
"U.S. Appl. No. 14/808,283, Notice of Allowance mailed Apr. 12, 2016", 9 pgs.
"U.S. Appl. No. 14/808,283, Notice of Allowance mailed Jul. 14, 2016", 8 pgs.
"U.S. Appl. No. 14/808,283, Preliminary Amendment filed Jul. 24, 2015", 8 pgs.
"U.S. Appl. No. 14/841,987, Notice of Allowance mailed Mar. 29, 2017", 17 pgs.
"U.S. Appl. No. 14/841,987, Notice of Allowance mailed Aug. 7, 2017", 8 pgs.
"U.S. Appl. No. 14/967,472, Corrected Notice of Allowability mailed Mar. 18, 2019", 3 pgs.
"U.S. Appl. No. 14/967,472, Corrected Notice of Allowability mailed Apr. 24, 2019", 3 pgs.
"U.S. Appl. No. 14/967,472, Final Office Action mailed Mar. 10, 2017", 15 pgs.
"U.S. Appl. No. 14/967,472, Final Office Action mailed Jun. 25, 2018", 14 pgs.
"U.S. Appl. No. 14/967,472, Non Final Office Action mailed Jan. 12, 2018", 17 pgs.
"U.S. Appl. No. 14/967,472, Non Final Office Action mailed Sep. 8, 2016", 11 pgs.
"U.S. Appl. No. 14/967,472, Notice of Allowance mailed Jan. 24, 2019", 6 pgs.
"U.S. Appl. No. 14/967,472, Preliminary Amendment filed Dec. 15, 2015", 6 pgs.
"U.S. Appl. No. 14/967,472, Response filed Mar. 16, 2018 Non Final Office Action mailed Jan. 12, 2018", 13 pgs.
"U.S. Appl. No. 14/967,472, Response filed Jun. 7, 2017 to Final Office Action mailed Mar. 10, 2017", 12 pgs.
"U.S. Appl. No. 14/967,472, Response filed Sep. 21, 2018 to Final Office Action mailed Jun. 25, 2018", 11 pgs.
"U.S. Appl. No. 14/967,472, Response filed Dec. 5, 2016 to Non Final Office Action mailed Sep. 8, 2016", 11 pgs.
"U.S. Appl. No. 14/974,321, Corrected Notice of Allowability mailed Feb. 13, 2019", 6 pgs.
"U.S. Appl. No. 14/974,321, Corrected Notice of Allowability mailed Apr. 19, 2019", 6 pgs.

(56) References Cited

OTHER PUBLICATIONS

"U.S. Appl. No. 14/974,321, Corrected Notice of Allowability mailed Jun. 12, 2019", 6 pgs.
"U.S. Appl. No. 14/974,321, Examiner Interview Summary mailed Dec. 5, 2017", 3 pgs.
"U.S. Appl. No. 14/974,321, Final Office Action mailed Oct. 26, 2017", 16 pgs.
"U.S. Appl. No. 14/974,321, Non Final Office Action mailed May 31, 2018", 14 pgs.
"U.S. Appl. No. 14/974,321, Non Final Office Action mailed Jun. 29, 2017", 36 pgs.
"U.S. Appl. No. 14/974,321, Notice of Allowance mailed Jan. 3, 2019", 9 pgs.
"U.S. Appl. No. 14/974,321, Response filed Aug. 30, 2018 to Non Final Office Action mailed May 31, 2018", 14 pgs.
"U.S. Appl. No. 14/974,321, Response filed Sep. 27, 2017 to Non Final Office Action mailed Jun. 29, 2017", 13 pgs.
"U.S. Appl. No. 15/074,029, Advisory Action mailed Oct. 11, 2018", 3 pgs.
"U.S. Appl. No. 15/074,029, Corrected Notice of Allowability mailed Feb. 5, 2020", 4 pgs.
"U.S. Appl. No. 15/074,029, Corrected Notice of Allowability mailed Aug. 20, 2019", 10 pgs.
"U.S. Appl. No. 15/074,029, Final Office Action mailed Jun. 28, 2018", 22 pgs.
"U.S. Appl. No. 15/074,029, Non Final Office Action mailed Jan. 23, 2019", 19 pgs.
"U.S. Appl. No. 15/074,029, Non Final Office Action mailed Nov. 30, 2017", 16 pgs.
"U.S. Appl. No. 15/074,029, Notice of Allowance mailed Jun. 19, 2019", 14 pgs.
"U.S. Appl. No. 15/074,029, Response filed Feb. 28, 2018 to Non Final Office Action mailed Nov. 30, 2017", 12 pgs.
"U.S. Appl. No. 15/074,029, Response filed Aug. 28, 2018 to Final Office Action mailed Jun. 28, 2018", 21 pgs.
"U.S. Appl. No. 15/074,029, Response filed Apr. 23, 2019 to Non Final Office Action mailed Jan. 23, 2019", 15 pgs.
"U.S. Appl. No. 15/137,608, Amendment and Response filed Jan. 25, 2019 to Non Final Office Action mailed Nov. 2, 2018", 13 pgs.
"U.S. Appl. No. 15/137,608, Corrected Notice of Allowability mailed Oct. 2, 2019", 3 pgs.
"U.S. Appl. No. 15/137,608, Final Office Action mailed May 13, 2019", 10 pgs.
"U.S. Appl. No. 15/137,608, Non Final Office Action mailed Nov. 2, 2018", 10 pgs.
"U.S. Appl. No. 15/137,608, Notice of Allowance mailed Aug. 8, 2019", 7 pgs.
"U.S. Appl. No. 15/137,608, Preliminary Amendment filed Apr. 26, 2016", 6 pgs.
"U.S. Appl. No. 15/137,608, Response filed Jul. 12, 2019 to Final Office Action mailed May 13, 2019", 10 pgs.
"U.S. Appl. No. 15/152,975, Examiner Interview Summary mailed Feb. 4, 2019", 7 pgs.
"U.S. Appl. No. 15/152,975, Examiner Interview Summary mailed May 14, 2018", 3 pgs.
"U.S. Appl. No. 15/152,975, Examiner Interview Summary mailed Nov. 13, 2017", 13 pgs.
"U.S. Appl. No. 15/152,975, Final Office Action mailed Jun. 30, 2017", 17 pgs.
"U.S. Appl. No. 15/152,975, Final Office Action mailed Jul. 2, 2018", 19 pgs.
"U.S. Appl. No. 15/152,975, Non Final Office Action mailed Jan. 10, 2018", 18 pgs.
"U.S. Appl. No. 15/152,975, Non Final Office Action mailed Jan. 12, 2017", 36 pgs.
"U.S. Appl. No. 15/152,975, Non Final Office Action mailed Sep. 28, 2018", 28 pgs.
"U.S. Appl. No. 15/152,975, Notice of Allowance mailed May 17, 2019", 13 pgs.
"U.S. Appl. No. 15/152,975, Preliminary Amendment filed May 19, 2016", 8 pgs.
"U.S. Appl. No. 15/152,975, Response filed Jan. 28, 2019 to Non Final Office Action mailed Sep. 28, 2018", 17 pgs.
"U.S. Appl. No. 15/152,975, Response Filed May 10, 2018 to Non Final Office Action mailed Jan. 10, 2018", 13 pgs.
"U.S. Appl. No. 15/152,975, Response filed Jun. 12, 2017mailed Jan. 12, 2017", 13 pgs.
"U.S. Appl. No. 15/152,975, Response filed Sep. 19, 2018 to Final Office Action mailed Jul. 2, 2018", 14 pgs.
"U.S. Appl. No. 15/152,975, Response filed Nov. 30, 2017 to Final Office Action mailed Jun. 30, 2017", 9 pgs.
"U.S. Appl. No. 15/208,460, Notice of Allowance mailed Feb. 27, 2017", 8 pgs.
"U.S. Appl. No. 15/208,460, Notice of Allowance mailed Dec. 30, 2016", 9 pgs.
"U.S. Appl. No. 15/208,460, Supplemental Preliminary Amendment filed Jul. 18, 2016", 8 pgs.
"U.S. Appl. No. 15/212,095, Final Office Action mailed Mar. 14, 2017", 9 pgs.
"U.S. Appl. No. 15/212,095, Non Final Office Action mailed Feb. 2, 2017", 8 pgs.
"U.S. Appl. No. 15/212,095, Notice of Allowance mailed Jun. 1, 2017", 8 pgs.
"U.S. Appl. No. 15/212,095, Notice of Allowance mailed Sep. 8, 2017", 2 pgs.
"U.S. Appl. No. 15/212,095, Response filed Feb. 28, 2017 to Non Final Office Action mailed Feb. 2, 2017", 2 pgs.
"U.S. Appl. No. 15/212,095, Response filed May 15, 2017 to Final Office Action mailed Mar. 14, 2017", 2 pgs.
"U.S. Appl. No. 15/224,262, Notice of Allowance mailed Mar. 2, 2017", 14 pgs.
"U.S. Appl. No. 15/224,312, Advisory Action mailed Aug. 27, 2019", 3 pgs.
"U.S. Appl. No. 15/224,312, Final Office Action mailed Apr. 11, 2019", 15 pgs.
"U.S. Appl. No. 15/224,312, Final Office Action mailed Apr. 20, 2018", 22 pgs.
"U.S. Appl. No. 15/224,312, Final Office Action mailed May 1, 2020", 18 pgs.
"U.S. Appl. No. 15/224,312, Final Office Action mailed May 12, 2021", 21 pgs.
"U.S. Appl. No. 15/224,312, Non Final Office Action mailed Oct. 11, 2017", 29 pgs.
"U.S. Appl. No. 15/224,312, Non Final Office Action mailed Oct. 22, 2018", 15 pgs.
"U.S. Appl. No. 15/224,312, Non Final Office Action mailed Nov. 9, 2020", 18 pgs.
"U.S. Appl. No. 15/224,312, Non Final Office Action mailed Dec. 16, 2019", 14 pgs.
"U.S. Appl. No. 15/224,312, Preliminary Amendment filed Feb. 1, 2017", 11 pgs.
"U.S. Appl. No. 15/224,312, Response filed Feb. 22, 2019 to Non Final Office Action mailed Oct. 22, 2018", 14 pgs.
"U.S. Appl. No. 15/224,312, Response filed Apr. 9, 2021 to Non Final Office Action mailed Nov. 9, 2020", 17 pgs.
"U.S. Appl. No. 15/224,312, Response filed Apr. 16, 2020 to Non Final Office Action mailed Dec. 16, 2019", 14 pgs.
"U.S. Appl. No. 15/224,312, Response filed Aug. 20, 2018 to Final Office Action mailed Apr. 20, 2018", 16 pgs.
"U.S. Appl. No. 15/224,312, Response filed Oct. 1, 2020 to Final Office Action mailed May 1, 2020", 18 pgs.
"U.S. Appl. No. 15/224,312, Response filed Oct. 11, 2019 to Advisory Action mailed Aug. 27, 2019", 17 pgs.
"U.S. Appl. No. 15/224,312, Response filed Aug. 12, 2019 to Final Office Action mailed Apr. 11, 2019", 14 pgs.
"U.S. Appl. No. 15/224,343, Amendment and Response filed Feb. 4, 2019 to Non Final Office Action mailed Sep. 4, 2018", 18 pgs.
"U.S. Appl. No. 15/224,343, Final Office Action mailed Mar. 22, 2019", 17 pgs.
"U.S. Appl. No. 15/224,343, Final Office Action mailed Apr. 7, 2020", 16 pgs.

(56) References Cited

OTHER PUBLICATIONS

"U.S. Appl. No. 15/224,343, Final Office Action mailed Apr. 19, 2018", 20 pgs.
"U.S. Appl. No. 15/224,343, Non Final Office Action mailed Sep. 4, 2018", 20 pgs.
"U.S. Appl. No. 15/224,343, Non Final Office Action mailed Oct. 4, 2017", 26 pgs.
"U.S. Appl. No. 15/224,343, Non Final Office Action mailed Nov. 12, 2019", 16 pgs.
"U.S. Appl. No. 15/224,343, Notice of Allowance mailed Jul. 29, 2020", 7 pgs.
"U.S. Appl. No. 15/224,343, Notice of Allowance mailed Nov. 16, 2020", 7 pgs.
"U.S. Appl. No. 15/224,343, Preliminary Amendment filed Jan. 31, 2017", 10 pgs.
"U.S. Appl. No. 15/224,343, Response filed Mar. 2, 2020 to Non Final Office Action mailed Nov. 12, 2019", 17 pgs.
"U.S. Appl. No. 15/224,343, Response filed Jun. 3, 2020 to Final Office Action mailed Apr. 7, 2020", 12 pgs.
"U.S. Appl. No. 15/224,343, Response filed Jul. 19, 2018 to Final Office Action mailed Apr. 19, 2018", 16 pgs.
"U.S. Appl. No. 15/224,343, Response filed Mar. 5, 2018 to Non Final Office Action mailed Oct. 4, 2017", 23 pgs.
"U.S. Appl. No. 15/224,343, Response filed Aug. 22, 2019 to Final Office Action mailed Mar. 22, 2019", 16 pgs.
"U.S. Appl. No. 15/224,355, Corrected Notice of Allowability mailed Nov. 18, 2021", 3 pgs.
"U.S. Appl. No. 15/224,355, Examiner Interview Summary mailed Oct. 25, 2017", 3 pgs.
"U.S. Appl. No. 15/224,355, Final Office Action mailed Apr. 24, 2018", 20 pgs.
"U.S. Appl. No. 15/224,355, Final Office Action mailed May 1, 2020", 15 pgs.
"U.S. Appl. No. 15/224,355, Final Office Action mailed Aug. 9, 2019", 15 pgs.
"U.S. Appl. No. 15/224,355, Non Final Office Action mailed Jan. 22, 2020", 13 pgs.
"U.S. Appl. No. 15/224,355, Non Final Office Action mailed Sep. 6, 2017", 30 pgs.
"U.S. Appl. No. 15/224,355, Non Final Office Action mailed Dec. 20, 2018", 14 pgs.
"U.S. Appl. No. 15/224,355, Notice of Allowability mailed Jul. 21, 2021", 13 pgs.
"U.S. Appl. No. 15/224,355, Notice of Allowance mailed Jul. 13, 2021", 16 pgs.
"U.S. Appl. No. 15/224,355, Notice of Allowance mailed Nov. 3, 2021", 10 pgs.
"U.S. Appl. No. 15/224,355, Preliminary Amendment filed Apr. 3, 2017", 12 pgs.
"U.S. Appl. No. 15/224,355, Response filed Mar. 6, 2018 to Non Final Office Action mailed Sep. 6, 2017", 25 pgs.
"U.S. Appl. No. 15/224,355, Response filed Apr. 22, 2020 to Non Final Office Action mailed Jan. 22, 2020", 13 pgs.
"U.S. Appl. No. 15/224,355, Response filed May 20, 2019 to Non Final Office Action mailed Dec. 20, 2018", 13 pgs.
"U.S. Appl. No. 15/224,355, Response filed Sep. 1, 2020 to Final Office Action mailed May 1, 2020", 16 pgs.
"U.S. Appl. No. 15/224,355, Response filed Sep. 24, 2018 to Final Office Action mailed Apr. 24, 2018", 19 pgs.
"U.S. Appl. No. 15/224,355, Response filed Nov. 11, 2019 to Fianl Office Action mailed Aug. 9, 2019", 14 pgs.
"U.S. Appl. No. 15/224,359, Final Office Action mailed Apr. 2, 2018", 18 pgs.
"U.S. Appl. No. 15/224,359, Final Office Action mailed Apr. 11, 2019", 15 pgs.
"U.S. Appl. No. 15/224,359, Final Office Action mailed May 1, 2020", 13 pgs.
"U.S. Appl. No. 15/224,359, Non Final Office Action mailed Jul. 20, 2017", 33 pgs.
"U.S. Appl. No. 15/224,359, Non Final Office Action mailed Sep. 28, 2018", 15 pgs.
"U.S. Appl. No. 15/224,359, Non Final Office Action mailed Dec. 10, 2019", 12 pgs.
"U.S. Appl. No. 15/224,359, Notice of Allowance mailed Nov. 3, 2020", 15 pgs.
"U.S. Appl. No. 15/224,359, Response filed Jan. 22, 2018 to Non Final Office Action mailed Jul. 20, 2017", 13 pgs.
"U.S. Appl. No. 15/224,359, Response filed Feb. 28, 2019 to Non Final Office Action mailed Aug. 28, 2018", 16 pgs.
"U.S. Appl. No. 15/224,359, Response filed Apr. 10, 2020 to Non Final Office Action mailed Dec. 10, 2019", 11 pgs.
"U.S. Appl. No. 15/224,359, Response filed Sep. 1, 2020 to Final Office Action mailed May 1, 2020", 13 pgs.
"U.S. Appl. No. 15/224,359, Response filed Sep. 4, 2018 to Final Office Action mailed Apr. 2, 2018", 14 pgs.
"U.S. Appl. No. 15/224,359, Response filed Sep. 11, 2019 to Final Office Action mailed Apr. 11, 2019", 18 pgs.
"U.S. Appl. No. 15/224,365, Appeal Brief filed Nov. 10, 2021", 15 pgs.
"U.S. Appl. No. 15/224,365, Examiner's Answer to Appeal Brief mailed Dec. 15, 2021", 2 pgs.
"U.S. Appl. No. 15/224,365, Final Office Action mailed Apr. 2, 2018", 19 pgs.
"U.S. Appl. No. 15/224,365, Final Office Action mailed Jul. 2, 2020", 11 pgs.
"U.S. Appl. No. 15/224,365, Final Office Action mailed Aug. 23, 2019", 12 pgs.
"U.S. Appl. No. 15/224,365, Non Final Office Action mailed Jan. 3, 2019", 11 pgs.
"U.S. Appl. No. 15/224,365, Non Final Office Action mailed Mar. 13, 2020", 9 pgs.
"U.S. Appl. No. 15/224,365, Non Final Office Action mailed Aug. 8, 2017", 41 pgs.
"U.S. Appl. No. 15/224,365, Non Final Office Action mailed Dec. 10, 2020", 16 pgs.
"U.S. Appl. No. 15/224,365, Response filed Jan. 23, 2020 to Final Office Action mailed Aug. 23, 2019", 13 pgs.
"U.S. Appl. No. 15/224,365, Response filed Feb. 8, 2018 to Non Final Office Action mailed Aug. 8, 2017", 14 pgs.
"U.S. Appl. No. 15/224,365, Response filed Jun. 15, 2020 to Non Final Office Action mailed Mar. 13, 2020", 12 pgs.
"U.S. Appl. No. 15/224,365, Response filed Oct. 2, 2018 to Final Office Action mailed Apr. 2, 2018", 15 pgs.
"U.S. Appl. No. 15/224,365, Response filed Oct. 2, 2020 to Final Office Action mailed Jul. 2, 2020", 13 pgs.
"U.S. Appl. No. 15/224,365, Response filed Jun. 3, 2019 to Non-Final Office Action mailed Jan. 3, 2019", 12 pgs.
"U.S. Appl. No. 15/224,372, Final Office Action mailed Mar. 6, 2019", 17 pgs.
"U.S. Appl. No. 15/224,372, Final Office Action mailed Apr. 3, 2018", 18 pgs.
"U.S. Appl. No. 15/224,372, Final Office Action mailed May 4, 2020", 15 pgs.
"U.S. Appl. No. 15/224,372, Non Final Office Action mailed Aug. 7, 2017", 40 pgs.
"U.S. Appl. No. 15/224,372, Non Final Office Action mailed Sep. 14, 2018", 20 pgs.
"U.S. Appl. No. 15/224,372, Non Final Office Action mailed Oct. 16, 2019", 14 pgs.
"U.S. Appl. No. 15/224,372, Notice of Allowance mailed Jan. 12, 2021", 8 pgs.
"U.S. Appl. No. 15/224,372, Preliminary Amendment filed May 5, 2017", 10 pgs.
"U.S. Appl. No. 15/224,372, Response filed Jan. 8, 2017 to Non Final Office Action mailed Aug. 7, 2017", 22 pgs.
"U.S. Appl. No. 15/224,372, Response filed Jan. 16, 2019 to Non Final Office Action mailed Sep. 14, 2018", 18 pgs.
"U.S. Appl. No. 15/224,372, Response filed Apr. 16, 2020 to Non Final Office Action mailed Oct. 16, 2019", 14 pgs.
"U.S. Appl. No. 15/224,372, Response filed Jul. 8, 2019 to Final Office Action mailed Mar. 6, 2019", 14 pgs.

(56) References Cited

OTHER PUBLICATIONS

"U.S. Appl. No. 15/224,372, Response filed Aug. 3, 2018 to Final Office Action mailed Apr. 3, 2018", 14 pgs.
"U.S. Appl. No. 15/224,372, Response filed Oct. 5, 2020 to Final Office Action mailed May 4, 2020", 17 pgs.
"U.S. Appl. No. 15/224,377, Corrected Notice of Allowability mailed Oct. 26, 2021", 2 pgs.
"U.S. Appl. No. 15/224,377, Examiner Interview Summary mailed Mar. 4, 2019", 5 pgs.
"U.S. Appl. No. 15/224,377, Final Office Action mailed Jan. 2, 2018", 29 pgs.
"U.S. Appl. No. 15/224,377, Final Office Action mailed Feb. 6, 2019", 14 pgs.
"U.S. Appl. No. 15/224,377, Final Office Action mailed Apr. 14, 2021", 14 pgs.
"U.S. Appl. No. 15/224,377, Final Office Action mailed May 5, 2020", 15 pgs.
"U.S. Appl. No. 15/224,377, Non Final Office Action mailed Jun. 15, 2018", 19 pgs.
"U.S. Appl. No. 15/224,377, Non Final Office Action mailed Aug. 4, 2017", 41 pgs.
"U.S. Appl. No. 15/224,377, Non Final Office Action mailed Oct. 15, 2019", 12 pgs.
"U.S. Appl. No. 15/224,377, Non Final Office Action mailed Oct. 30, 2020", 15 pgs.
"U.S. Appl. No. 15/224,377, Notice of Allowance mailed Oct. 13, 2021", 14 pgs.
"U.S. Appl. No. 15/224,377, Response filed Mar. 30, 2021 to Non Final Office Action mailed Oct. 30, 2020", 14 pgs.
"U.S. Appl. No. 15/224,377, Response filed Apr. 15, 2020 to Non Final Office Action mailed Oct. 15, 2019", 13 pgs.
"U.S. Appl. No. 15/224,377, Response filed Jun. 6, 2019 to Final Office Action mailed Feb. 6, 2019", 10 pgs.
"U.S. Appl. No. 15/224,377, Response filed Sep. 8, 2020 to Final Office Action mailed May 5, 2020", 15 pgs.
"U.S. Appl. No. 15/224,377, Response filed Sep. 14, 2021 to Final Office Action mailed Apr. 14, 2021", 13 pgs.
"U.S. Appl. No. 15/224,377, Response filed Dec. 17, 2018 to Non Final Office Action mailed Jun. 15, 2018", 13 pgs.
"U.S. Appl. No. 15/224,377, Response filed Dec. 6, 2017 to Non Final Office Action mailed Aug. 4, 2017", 22 pgs.
"U.S. Appl. No. 15/224,383, Examiner Interview Summary mailed Aug. 15, 2018", 4 pgs.
"U.S. Appl. No. 15/224,383, Examiner Interview Summary mailed Oct. 25, 2017", 3 pgs.
"U.S. Appl. No. 15/224,383, Final Office Action mailed Jan. 14, 2019", 15 pgs.
"U.S. Appl. No. 15/224,383, Final Office Action mailed Feb. 14, 2018", 25 pgs.
"U.S. Appl. No. 15/224,383, Non Final Office Action mailed Jul. 5, 2018", 19 pgs.
"U.S. Appl. No. 15/224,383, Non Final Office Action mailed Aug. 30, 2017", 26 pgs.
"U.S. Appl. No. 15/224,383, Non-Final Office Action mailed Sep. 23, 2019", 13 pgs.
"U.S. Appl. No. 15/224,383, Notice of Allowance mailed Feb. 27, 2020", 7 pgs.
"U.S. Appl. No. 15/224,383, Preliminary Amendment filed May 9, 2017", 13 pgs.
"U.S. Appl. No. 15/224,383, Response filed Jan. 3, 2018 to Non Final Office Action mailed Aug. 30, 2017", 25 pgs.
"U.S. Appl. No. 15/224,383, Response filed Jan. 23, 2020 to Non Final Office Action mailed Sep. 23, 2019", 14 pgs.
"U.S. Appl. No. 15/224,383, Response filed May 14, 2019 to Final Office Action mailed Jan. 14, 2019", 15 pgs.
"U.S. Appl. No. 15/224,383, Response filed Jun. 14, 2018 to Final Office Action mailed Feb. 14, 2018", 14 pgs.
"U.S. Appl. No. 15/224,383, Response Filed Dec. 5, 2018 to Non Final Office Action mailed Jul. 5, 2018", 16 pgs.
"U.S. Appl. No. 15/224,359, Preliminary Amendment filed Apr. 19, 2017", 8 pgs.
"U.S. Appl. No. 15/298,806, Advisory Action mailed Jan. 29, 2018", 4 pgs.
"U.S. Appl. No. 15/298,806, Examiner Interview Summary mailed Jan. 12, 2018", 3 pgs.
"U.S. Appl. No. 15/298,806, Examiner Interview Summary mailed Aug. 13, 2018", 3 pgs.
"U.S. Appl. No. 15/298,806, Final Office Action mailed Oct. 24, 2017", 15 pgs.
"U.S. Appl. No. 15/298,806, Non Final Office Action mailed May 17, 2018", 16 pgs.
"U.S. Appl. No. 15/298,806, Non Final Office Action mailed Jun. 12, 2017", 26 pgs.
"U.S. Appl. No. 15/298,806, Notice of Allowance mailed Sep. 19, 2018", 5 pgs.
"U.S. Appl. No. 15/298,806, Preliminary Amendment filed Oct. 21, 2016", 8 pgs.
"U.S. Appl. No. 15/298,806, Response filed Jan. 9, 2018 to Final Office Action mailed Oct. 24, 2017", 17 pgs.
"U.S. Appl. No. 15/298,806, Response filed Aug. 10, 2018 to Non Final Office Action mailed May 17, 2018", 15 pgs.
"U.S. Appl. No. 15/298,806, Response filed Sep. 12, 2017 to Non Final Office Action mailed Jun. 12, 2017", 12 pgs.
"U.S. Appl. No. 15/416,846, Notice of Allowance mailed Jul. 19, 2017", 9 pgs.
"U.S. Appl. No. 15/416,846, Preliminary Amendment filed Feb. 18, 2017", 10 pgs.
"U.S. Appl. No. 15/424,184, Advisory Action mailed May 26, 20", 6 pgs.
"U.S. Appl. No. 15/424,184, Advisory Action mailed Aug. 25, 2020", 5 pgs.
"U.S. Appl. No. 15/424,184, Examiner Interview Summary mailed Jan. 10, 2019", 3 pgs.
"U.S. Appl. No. 15/424,184, Examiner Interview Summary mailed Jul. 30, 2019", 2 pgs.
"U.S. Appl. No. 15/424,184, Final Office Action mailed Jan. 29, 2019", 14 pgs.
"U.S. Appl. No. 15/424,184, Final Office Action mailed Mar. 9, 2020", 19 pgs.
"U.S. Appl. No. 15/424,184, Final Office Action mailed Jul. 27, 2020", 18 pgs.
"U.S. Appl. No. 15/424,184, Final Office Action mailed Sep. 9, 2019", 13 pgs.
"U.S. Appl. No. 15/424,184, Non Final Office Action mailed May 21, 2019", 16 pgs.
"U.S. Appl. No. 15/424,184, Non Final Office Action mailed Jun. 29, 2020", 19 pgs.
"U.S. Appl. No. 15/424,184, Non Final Office Action mailed Nov. 30, 2018", 22 pgs.
"U.S. Appl. No. 15/424,184, Non Final Office Action mailed Dec. 2, 2019", 16 pgs.
"U.S. Appl. No. 15/424,184, Notice of Allowance mailed Sep. 25, 2020", 10 pgs.
"U.S. Appl. No. 15/424,184, Response filed Mar. 2, 2020 to Non Final Office Action mailed Dec. 2, 2019", 11 pgs.
"U.S. Appl. No. 15/424,184, Response filed May 11, 2020 to Final Office Action mailed Mar. 9, 2020", 14 pgs.
"U.S. Appl. No. 15/424,184, Response filed Jul. 13, 2020 to Non Final Office Action mailed May 5, 2020", 11 pgs.
"U.S. Appl. No. 15/424,184, Response filed Aug. 5, 2020 to Final Office Action mailed Jul. 27, 2020", 12 pgs.
"U.S. Appl. No. 15/424,184, Response filed Aug. 21, 2019 to Non Final Office Action mailed May 21, 2019", 12 pgs.
"U.S. Appl. No. 15/424,184, Response filed Sep. 1, 2020 to Advisory Action mailed Aug. 25, 2020", 9 pgs.
"U.S. Appl. No. 15/424,184, Response filed Nov. 11, 2019 to Final Office Action mailed Sep. 9, 2019", 12 pgs.
"U.S. Appl. No. 15/424,184, Response filed Apr. 29, 2019 to Final Office Action mailed Jan. 29, 2019", 11 pgs.
"U.S. Appl. No. 15/424,184k, Response filed Jan. 4, 2019 to Non Fianal Office Action mailed Nov. 30, 2018", 17 pgsl.

(56) References Cited

OTHER PUBLICATIONS

"U.S. Appl. No. 15/470,004, Examiner Interview Summary mailed Sep. 12, 2019", 3 pgs.
"U.S. Appl. No. 15/470,004, Final Office Action mailed May 20, 2019", 9 pgs.
"U.S. Appl. No. 15/470,004, Non Final Office Action mailed Jan. 31, 2019", 9 pgs.
"U.S. Appl. No. 15/470,004, Notice of Allowance mailed Oct. 22, 2019", 10 pgs.
"U.S. Appl. No. 15/470,004, Response filed Apr. 29, 2019 to Non Final Office Action mailed Jan. 31, 2019", 12 pgs.
"U.S. Appl. No. 15/470,004, Response filed Sep. 9, 2019 to Final Office Action mailed May 20, 2019", 13 pgs.
"U.S. Appl. No. 15/470,025, Final Office Action mailed May 20, 2019", 10 pgs.
"U.S. Appl. No. 15/470,025, Non Final Office Action mailed Jan. 30, 2019", 10 pgs.
"U.S. Appl. No. 15/470,025, Notice of Allowance mailed Oct. 22, 2019", 10 pgs.
"U.S. Appl. No. 15/470,025, Response filed Apr. 24, 2019 to Non Final Office Action mailed Jan. 30, 2019", 13 pgs.
"U.S. Appl. No. 15/470,025, Response filed Sep. 12, 2019 to Final Office Action mailed May 20, 2019", 14 pgs.
"U.S. Appl. No. 15/474,821, Advisory Action mailed Dec. 19, 2019", 3 pgs.
"U.S. Appl. No. 15/474,821, Final Office Action mailed Apr. 1, 2022", 23 pgs.
"U.S. Appl. No. 15/474,821, Final Office Action mailed Apr. 20, 2023", 61 pgs.
"U.S. Appl. No. 15/474,821, Final Office Action mailed Aug. 19, 2021", 18 pgs.
"U.S. Appl. No. 15/474,821, Final Office Action mailed Sep. 3, 2019", 19 pgs.
"U.S. Appl. No. 15/474,821, Final Office Action mailed Nov. 17, 2022", 40 pgs.
"U.S. Appl. No. 15/474,821, Non Final Office Action mailed Jan. 21, 2022", 19 pgs.
"U.S. Appl. No. 15/474,821, Non Final Office Action mailed Jan. 25, 2019", 17 pgs.
"U.S. Appl. No. 15/474,821, Non Final Office Action mailed Feb. 27, 2023", 60 pgs.
"U.S. Appl. No. 15/474,821, Non Final Office Action mailed Mar. 18, 2021", 17 pgs.
"U.S. Appl. No. 15/474,821, Non Final Office Action mailed Jun. 20, 2022", 43 pgs.
"U.S. Appl. No. 15/474,821, Notice of Allowance mailed Sep. 27, 2023", 12 pgs.
"U.S. Appl. No. 15/474,821, Notice of Non-Compliant Amendment mailed Sep. 8, 2020", 6 pgs.
"U.S. Appl. No. 15/474,821, Response filed Jan. 7, 21 to Notice of Non-Compliant Amendment mailed Sep. 8, 20", 9 pgs.
"U.S. Appl. No. 15/474,821, Response filed Jan. 12, 2023 to Final Office Action mailed Nov. 17, 2022", 10 pgs.
"U.S. Appl. No. 15/474,821, Response filed Mar. 17, 2022 to Non Final Office Action mailed Jan. 21, 2022", 10 pgs.
"U.S. Appl. No. 15/474,821, Response filed Mar. 30, 2023 to Non Final Office Action mailed Feb. 27, 2023", 11 pgs.
"U.S. Appl. No. 15/474,821, Response filed May 11, 2021 to Non Final Office Action mailed Mar. 18, 2021", 10 pgs.
"U.S. Appl. No. 15/474,821, Response filed May 25, 2023 to Final Office Action mailed Apr. 20, 2023", 11 pgs.
"U.S. Appl. No. 15/474,821, Response filed May 31, 2022 to Final Office Action mailed Apr. 1, 2022", 10 pgs.
"U.S. Appl. No. 15/474,821, Response filed Jul. 27, 2022 to Non Final Office Action mailed Jun. 20, 2022", 10 pgs.
"U.S. Appl. No. 15/474,821, Response filed Oct. 20, 2021 to Final Office Action mailed Aug. 19, 2021", 10 pgs.
"U.S. Appl. No. 15/474,821, Response filed Apr. 25, 2019 to Non Final Office Action mailed Jan. 25, 2019", 16 pgs.
"U.S. Appl. No. 15/474,821, Response filed on Dec. 2, 2019 to Final Office Action mailed Sep. 3, 2019", 10 pgs.
"U.S. Appl. No. 15/486,111, Corrected Notice of Allowance mailed Sep. 7, 2017", 3 pgs.
"U.S. Appl. No. 15/486,111, Non Final Office Action mailed May 9, 2017", 17 pgs.
"U.S. Appl. No. 15/486,111, Notice of Allowance mailed Aug. 30, 2017", 5 pgs.
"U.S. Appl. No. 15/486,111, Response filed Aug. 9, 2017 to Non Final Office Action mailed May 9, 2017", 11 pgs.
"U.S. Appl. No. 15/673,137, Final Office Action mailed Jan. 27, 2020", 11 pgs.
"U.S. Appl. No. 15/673,137, Final Office Action mailed May 16, 2019", 8 pgs.
"U.S. Appl. No. 15/673,137, Non Final Office Action mailed May 12, 2020", 14 pgs.
"U.S. Appl. No. 15/673,137, Non Final Office Action mailed Aug. 30, 2019", 10 pgs.
"U.S. Appl. No. 15/673,137, Non Final Office Action mailed Oct. 5, 2018", 7 pgs.
"U.S. Appl. No. 15/673,137, Response filed Jan. 31, 2019 to Non Final Office Action mailed Oct. 5, 2018", 10 pgs.
"U.S. Appl. No. 15/673,137, Response filed Apr. 6, 2020 to Final Office Action mailed Jan. 27, 2020", 14 pgs.
"U.S. Appl. No. 15/673,137, Response filed Jul. 8, 2020 to Non Final Office Action mailed May 12, 2020", 15 pgs.
"U.S. Appl. No. 15/673,137, Response filed Oct. 18, 2019 to Non-Final Office Action mailed Aug. 30, 2019", 12 pgs.
"U.S. Appl. No. 15/673,137, Response filed Aug. 1, 2019 to Final Office Action mailed May 16, 2019", 10 pgs.
"U.S. Appl. No. 15/702,511, 312 Amendment filed Jun. 26, 2019", 11 pgs.
"U.S. Appl. No. 15/702,511, Notice of Allowability mailed Sep. 30, 2019", 2 pgs.
"U.S. Appl. No. 15/702,511, Notice of Allowance mailed Mar. 26, 2019", 7 pgs.
"U.S. Appl. No. 15/702,511, Notice of Allowance mailed Oct. 26, 2018", 7 pgs.
"U.S. Appl. No. 15/702,511, Preliminary Amendment filed Sep. 15, 2017", 13 pgs.
"U.S. Appl. No. 15/702,511, PTO Response to Rule 312 Communication mailed Aug. 13, 2019", 2 pgs.
"U.S. Appl. No. 15/729,582, Corrected Notice of Allowability mailed Oct. 2, 2019", 3 pgs.
"U.S. Appl. No. 15/729,582, Corrected Notice of Allowability mailed Oct. 30, 2019", 3 pgs.
"U.S. Appl. No. 15/729,582, Corrected Notice of Allowability mailed Dec. 18, 2019", 3 pgs.
"U.S. Appl. No. 15/729,582, Final Office Action mailed Dec. 13, 2018", 14 pgs.
"U.S. Appl. No. 15/729,582, Non Final Office Action mailed May 25, 2018", 14 pgs.
"U.S. Appl. No. 15/729,582, Notice of Allowance mailed Jul. 22, 2019", 9 pgs.
"U.S. Appl. No. 15/729,582, Response filed May 13, 2019 to Final Office Action mailed Dec. 13, 2018", 9 pgs.
"U.S. Appl. No. 15/787,467, Corrected Notice of Allowability mailed Sep. 24, 2018", 2 pgs.
"U.S. Appl. No. 15/787,467, Non Final Office Action mailed Apr. 18, 2018", 17 pgs.
"U.S. Appl. No. 15/787,467, Notice of Allowance mailed Aug. 31, 2018", 8 pgs.
"U.S. Appl. No. 15/787,467, Preliminary Amendment filed Oct. 26, 2017", 11 pgs.
"U.S. Appl. No. 15/787,467, Response filed Jul. 18, 2018 to Non Final Office Action mailed Apr. 18, 2018", 12 pgs.
"U.S. Appl.No. 15/835,100, Non Final Office Action mailed Jan. 23, 2018", 18 pgs.
"U.S. Appl. No. 15/835,100, Notice of Allowance mailed May 22, 208", 5 pgs.
"U.S. Appl. No. 15/835,100, Response Filed Apr. 23, 2018 to Non Final Office Action mailed Jan. 23, 2018", 11 pgs.

(56) References Cited

OTHER PUBLICATIONS

"U.S. Appl. No. 15/837,935, Notice of Allowance mailed Nov. 25, 2019", 18 pgs.
"U.S. Appl. No. 15/946,990, Final Office Action mailed May 9, 2019", 11 pgs.
"U.S. Appl. No. 15/946,990, Non Final Office Action mailed Dec. 3, 2018", 10 pgs.
"U.S. Appl. No. 15/946,990, Notice of Allowance mailed Sep. 24, 2019", 5 pgs.
"U.S. Appl. No. 15/946,990, Response filed Feb. 20, 2019 to Non Final Office Action mailed Dec. 3, 2018", 11 pgs.
"U.S. Appl. No. 15/946,990, Response filed Jul. 9, 2019 to Final Office Action mailed May 9, 2019", 12 pgs.
"U.S. Appl. No. 15/947,350, Appeal Brief filed Dec. 8, 2021", 23 pgs.
"U.S. Appl. No. 15/947,350, Examiner Interview Summary mailed Jul. 20, 2020", 4 pgs.
"U.S. Appl. No. 15/947,350, Final Office Action mailed Apr. 8, 2021", 13 pgs.
"U.S. Appl. No. 15/947,350, Final Office Action mailed May 4, 2020", 12 pgs.
"U.S. Appl. No. 15/947,350, Non Final Office Action mailed Sep. 28, 2020", 13 pgs.
"U.S. Appl. No. 15/947,350, Non Final Office Action mailed Dec. 13, 2019", 20 pgs.
"U.S. Appl. No. 15/947,350, Response filed Mar. 1, 2021 to Non Final Office Action mailed Sep. 28, 2020", 12 pgs.
"U.S. Appl. No. 15/947,350, Response filed Apr. 13, 2020 to Non Final Office Action mailed Dec. 13, 2019", 12 pgs.
"U.S. Appl. No. 15/947,350, Response filed Sep. 4, 2005 to Final Office Action mailed May 4, 2020", 12 pgs.
"U.S. Appl. No. 16/000,657, 312 Amendment filed Apr. 30, 2021", 8 pgs.
"U.S. Appl. No. 16/000,657, Advisory Action mailed Oct. 19, 2020", 3 pgs.
"U.S. Appl. No. 16/000,657, Examiner Interview Summary mailed Jun. 12, 2020", 4 pgs.
"U.S. Appl. No. 16/000,657, Examiner Interview Summary mailed Sep. 25, 2020", 3 pgs.
"U.S. Appl. No. 16/000,657, Final Office Action mailed Jul. 27,2020", 17 pgs.
"U.S. Appl. No. 16/000,657, Non Final Office Action mailed Mar. 6, 2020", 30 pgs.
"U.S. Appl. No. 16/000,657, Notice of Allowance mailed Feb. 4, 2021", 8 pgs.
"U.S. Appl. No. 16/000,657, Preliminary Amendment filed Jun. 6, 2018", 8 pgs.
"U.S. Appl. No. 16/000,657, PTO Response to Rule 312 Communication mailed May 11, 2021", 3 pgs.
"U.S. Appl. No. 16/000,657, Response filed Jul. 6, 2020 to Non Final Office Action mailed Mar. 6, 2020", 13 pgs.
"U.S. Appl. No. 16/000,657, Response filed Sep. 28, 2020 to Final Office Action mailed Jul. 27, 2020", 12 pgs.
"U.S. Appl. No. 16/105,687, Non Final Office Action mailed Sep. 14, 2018", 11 pgs.
"U.S. Appl. No. 16/105,687, Notice of Allowance mailed Feb. 25, 2019", 8 pgs.
"U.S. Appl. No. 16/105,687, Response filed Dec. 14, 2018 to Non Final Office Action mailed Sep. 14, 2018", 12 pgs.
"U.S. Appl. No. 16/155,782, Final Office Action mailed Jan. 3, 2020", 14 pgs.
"U.S. Appl. No. 16/155,782, Non Final Office Action mailed May 14, 2020", 14 pgs.
"U.S. Appl. No. 16/155,782, Non Final Office Action mailed Jul. 10, 2019", 7 pgs.
"U.S. Appl. No. 16/155,782, Notice of Allowance mailed Sep. 21, 2020", 5 pgs.
"U.S. Appl. No. 16/155,782, Response filed Apr. 3, 2020 to Final Office Action mailed Jan. 3, 2020", 10 pgs.
"U.S. Appl. No. 16/155,782, Response filed Aug. 14, 2020 to Non Final Office Action mailed May 14, 2020", 9 pgs.
"U.S. Appl. No. 16/155,782, Response filed Oct. 8, 2019 to Non Final Office Action mailed Jul. 10, 2019", 10 pgs.
"U.S. Appl. No. 16/204,886, Corrected Notice of Allowability mailed Aug. 6, 2019", 2pgs.
"U.S. Appl. No. 16/204,886, Corrected Notice of Allowability mailed Sep. 10, 2019", 2pgs.
"U.S. Appl. No. 16/204,886, Non Final Office Action mailed Jan. 4, 2019", 8 pgs.
"U.S. Appl. No. 16/204,886, Notice of Allowance mailed May 15, 2019", 9 pgs.
"U.S. Appl. No. 16/204,886, Response filed Apr. 2, 2019 to Non Final Office Action mailed Jan. 4, 2019", 8 pgs.
"U.S. Appl. No. 16/212,313, Final Office Action mailed Jun. 22, 2020", 20 pgs.
"U.S. Appl. No. 16/212,313, Non Final Office Action mailed Feb. 4, 2020", 20 pgs.
"U.S. Appl. No. 16/212,313, Non FInal Office Action mailed Aug. 30, 2019", 18 pgs.
"U.S. Appl. No. 16/212,313, Preliminary Amendment filed Dec. 12, 2018", 6 pgs.
"U.S. Appl. No. 16/212,313, Response filed May 4, 2020 to Non Final Office Action mailed Feb. 4, 2020", 12 pgs.
"U.S. Appl. No. 16/212,313, Response filed Dec. 2, 2019 to Non Final Office Action mailed Aug. 30, 2019", 11 pgs.
"U.S. Appl. No. 16/219,577, Non Final Office Action mailed Oct. 29, 2019", 7 pgs.
"U.S. Appl. No. 16/219,577, Notice of Allowance mailed Jan. 15, 2020", 7 pgs.
"U.S. Appl. No. 16/219,577, Response filed Oct. 3, 2019 to Restriction Requirement mailed Aug. 7, 2019", 6 pgs.
"U.S. Appl. No. 16/219,577, Response filed Dec. 5, 2019 to Non Final Office Action mailed Oct. 29, 2019", 6 pgs.
"U.S. Appl. No. 16/219,577, Restriction Requirement mailed Aug. 7, 2019", 6 pgs.
"U.S. Appl. No. 16/376,598, Non Final Office Action mailed Jul. 25, 2019", 7 pgs.
"U.S. Appl. No. 16/376,598, Notice of Allowability mailed Jan. 23, 2020", 2 pgs.
"U.S. Appl. No. 16/376,598, Notice of Allowance mailed Oct. 18, 2019", 5 pgs.
"U.S. Appl. No. 16/376,598, Response filed Oct. 7, 2019 to Non-Final Office Action mailed Jul. 25, 2019", 2 pgs.
"U.S. Appl. No. 16/428,210, Advisory Action mailed Sep. 9, 2020", 3 pgs.
"U.S. Appl. No. 16/428,210, Examiner Interview Summary mailed Feb. 15, 2022", 2 pgs.
"U.S. Appl. No. 16/428,210, Examiner Interview Summary mailed Jun. 23, 2022", 2 pgs.
"U.S. Appl. No. 16/428,210, Examiner Interview Summary mailed Aug. 28, 2020", 3 pgs.
"U.S. Appl. No. 16/428,210, Examiner Interview Summary mailed Sep. 7, 2023", 2 pgs.
"U.S. Appl. No. 16/428,210, Examiner Interview Summary mailed Nov. 5, 2021", 2 pgs.
"U.S. Appl. No. 16/428,210, Final Office Action mailed Apr. 1, 2022", 16 pgs.
"U.S. Appl. No. 16/428,210, Final Office Action mailed Jun. 7, 2023", 16 pgs.
"U.S. Appl. No. 16/428,210, Final Office Action mailed Jun. 29, 2020", 16 pgs.
"U.S. Appl. No. 16/428,210, Final Office Action mailed Jul. 9, 2021", 18 pgs.
"U.S. Appl. No. 16/428,210, Non Final Office Action mailed Apr. 6, 2020", 16 pgs.
"U.S. Appl. No. 16/428,210, Non Final Office Action mailed Sep. 9, 2022", 15 pgs.
"U.S. Appl. No. 16/428,210, Non Final Office Action mailed Oct. 26, 2023", 14 pgs.
"U.S. Appl. No. 16/428,210, Non Final Office Action mailed Nov. 27, 2020", 17 pgs.

(56) References Cited

OTHER PUBLICATIONS

"U.S. Appl. No. 16/428,210, Non Final Office Action mailed Nov. 29, 2021", 14 pgs.
"U.S. Appl. No. 16/428,210, Notice of Non-Compliant Amendment mailed Dec. 28, 2022" 2 pgs.
"U.S. Appl. No. 16/428,210, Preliminary Amendment filed Aug. 8, 2019", 8 pgs.
"U.S. Appl. No. 16/428,210, Response filed Feb. 28, 2022 to Non Final Office Action mailed Nov. 29, 2021", 11 pgs.
"U.S. Appl. No. 16/428,210, Response filed Apr. 27, 2021 to Non Final Office Action mailed Nov. 27, 2020", 11 pgs.
"U.S. Appl. No. 16/428,210, Response filed May 5, 2023 to Notice of Non-Compliant Amendment mailed Dec. 28, 2022", 12 pgs.
"U.S. Appl. No. 16/428,210, Response filed Jun. 3, 2020 to Non Final Office Action mailed Apr. 6, 2020", 10 pgs.
"U.S. Appl. No. 16/428,210, Response filed Jul. 29, 2022 to Final Office Action mailed Apr. 1, 2022", 13 pgs.
"U.S. Appl. No. 16/428,210, Response filed Aug. 27, 2020 to Final Office Action mailed Jun. 29, 2020", 12 pgs.
"U.S. Appl. No. 16/428,210, Response filed Sep. 7, 2023 to Final Office Action mailed Jun. 7, 2023", 9 pgs.
"U.S. Appl. No. 16/428,210, Response filed Nov. 9, 2021 to Final Office Action mailed Jul. 9, 2021", 12 pgs.
"U.S. Appl. No. 16/428,210, Response filed Nov. 21, 2022 to Non Final Office Action mailed Sep. 9, 2022", 8 pgs.
"U.S. Appl. No. 16/511,834, Corrected Notice of Allowability mailed Jan. 27, 2020", 2 pgs.
"U.S. Appl. No. 16/511,834, Non-Final Office Action mailed Aug. 20, 2019", 11 pgs.
"U.S. Appl. No. 16/511,834, Notice of Allowance mailed Oct. 23, 2019", 8 pgs.
"U.S. Appl. No. 16/511,834, Response filed Oct. 7, 2019 to Non-Final Office Action mailed Aug. 20, 2019", 3 pgs.
"U.S. Appl. No. 16/529,461, Advisory Action mailed Jan. 8, 2021", 4 pgs.
"U.S. Appl. No. 16/529,461, Examiner Interview Summary mailed Jul. 31, 2020", 3 pgs.
"U.S. Appl. No. 16/529,461, Final Office Action mailed Oct. 20, 2020", 24 pgs.
"U.S. Appl. No. 16/529,461, Non Final Office Action mailed Feb. 22, 2021", 27 pgs.
"U.S. Appl. No. 16/529,461, Non Final Office Action mailed May 21, 2020", 19 pgs.
"U.S. Appl. No. 16/529,461, Notice of Allowance mailed Jun. 23, 2021", 9 pgs.
"U.S. Appl. No. 16/529,461, Notice of Allowance mailed Oct. 1, 2021", 8 pgs.
"U.S. Appl. No. 16/529,461, Response filed Apr. 29, 2021 to Non Final Office Action mailed Feb. 22, 2021", 12 pgs.
"U.S. Appl. No. 16/529,461, Response filed Jul. 29, 2020 to Non Final Office Action mailed May 21, 2020", 11 pgs.
"U.S. Appl. No. 16/529,461, Response filed Dec. 18, 2020 to Final Office Action mailed Oct. 20, 2020", 10 pgs.
"U.S. Appl. No. 16/541,919, Non Final Office Action mailed Apr. 14, 2020", 18 pgs.
"U.S. Appl. No. 16/541,919, Notice of Allowance mailed Jun. 30, 2020", 8 pgs.
"U.S. Appl. No. 16/541,919, Notice of Allowance mailed Oct. 15, 2020", 8 pgs.
"U.S. Appl. No. 16/541,919, Response filed Jun. 12, 2020 to Non Final Office Action mailed Apr. 14, 2020", 8 pgs.
"U.S. Appl. No. 16/662,956, Final Office Action mailed Mar. 29, 2021", 17 pgs.
"U.S. Appl. No. 16/662,956, Final Office Action mailed Oct. 27, 2021", 15 pgs.
"U.S. Appl. No. 16/662,956, Non Final Office Action mailed Jul. 21, 2021", 12 pgs.
"U.S. Appl. No. 16/662,956, Non Final Office Action mailed Oct. 6, 2020", 13 pgs.
"U.S. Appl. No. 16/662,956, Preliminary Amendment filed Oct. 24, 2019", 8 pgs.
"U.S. Appl. No. 16/662,956, Response filed Jun. 24, 2021 to Final Office Action mailed Mar. 29, 2021", 10 pgs.
"U.S. Appl. No. 16/662,956, Response filed Oct. 5, 2021 to Non Final Office Action mailed Jul. 21, 2021", 10 pgs.
"U.S. Appl. No. 16/662,956, Response filedmailed Oct. 6, 2020", 11 pgs.
"U.S. Appl. No. 16/667,814, Corrected Notice of Allowability mailed Mar. 2, 2021", 2 pgs.
"U.S. Appl. No. 16/667,814, Corrected Notice of Allowability mailed Dec. 23, 2020", 2 pgs.
"U.S. Appl. No. 16/667,814, Non Final Office Action mailed Aug. 17, 2020", 6 pgs.
"U.S. Appl. No. 16/667,814, Notice of Allowance mailed Nov. 23, 2020", 8 pgs.
"U.S. Appl. No. 16/667,814, Preliminary Amendment filed Apr. 20, 2020", 6 pgs.
"U.S. Appl. No. 16/667,814, Response filedmailed Aug. 17, 2020", 7 pgs.
"U.S. Appl. No. 16/703,526, Corrected Notice of Allowability mailed Sep. 2, 2020", 2 pgs.
"U.S. Appl. No. 16/703,526, Notice of Allowance mailed Jun. 19, 2020", 10 pgs.
"U.S. Appl. No. 16/703,526, Supplemental Notice of Allowance mailed Aug. 10, 2020", 2 pgs.
"U.S. Appl. No. 16/709,092, Corrected Notice of Allowance mailed Jun. 1, 2020", 2 pgs.
"U.S. Appl. No. 16/709,092, Corrected Notice of Allowability mailed Jul. 22, 2020", 2 pgs.
"U.S. Appl. No. 16/709,092, Notice of Allowance mailed Apr. 9, 2020", 9 pgs.
"U.S. Appl. No. 16/808,101, Notice of Allowance mailed Jul. 27, 2021", 16 pgs.
"U.S. Appl. No. 16/808,101, Preliminary Amendment filed Mar. 10, 2020", 8 pgs.
"U.S. Appl. No. 16/808,101, Supplemental Notice of Allowability mailed Aug. 9, 2021", 3 pgs.
"U.S. Appl. No. 16/841,817, Corrected Notice of Allowability mailed Mar. 13, 2022", 2 pgs.
"U.S. Appl. No. 16/841,817, Corrected Notice of Allowability mailed Sep. 16, 2021", 2 pgs.
"U.S. Appl. No. 16/841,817, Corrected Notice of Allowability mailed Dec. 30, 2021", 2 pgs.
"U.S. Appl. No. 16/841,817, Non Final Office Action mailed May 26, 2021", 7 pgs.
"U.S. Appl. No. 16/841,817, Notice of Allowance mailed Sep. 3, 2021", 7 pgs.
"U.S. Appl. No. 16/841,817, Notice of Allowance mailed Dec. 16, 2021", 8 pgs.
"U.S. Appl. No. 16/841,817, Response filed Aug. 26, 2021 to Non Final Office Action mailed May 26, 2021", 6 pgs.
"U.S. Appl. No. 16/911,854, Corrected Notice of Allowability mailed Sep. 16, 2021", 2 pgs.
"U.S. Appl. No. 16/911,854, Corrected Notice of Allowability mailed Oct. 6, 2021", 2 pgs.
"U.S. Appl. No. 16/911,854, Non Final Office Action mailed Mar. 3, 2021", 12 pgs.
"U.S. Appl. No. 16/911,854, Notice of Allowance mailed Jun. 17, 2021", 8 pgs.
"U.S. Appl. No. 16/911,854, Response filed May 28, 2021 to Non Final Office Action mailed Mar. 3, 2021", 8 pgs.
"U.S. Appl. No. 16/933,205, Final Office Action mailed Nov. 29, 2021", 21 pgs.
"U.S. Appl. No. 16/933,205, Non Final Office Action mailed Apr. 16, 2021", 39 pgs.
"U.S. Appl. No. 16/933,205, Response filed Oct. 18, v21 to Non Final Office Action mailed Apr. 16, 2021", 13 pgs.
"U.S. Appl. No. 16/933,279, Non Final Office Action mailed Mar. 25, 2021", 41 pgs.
"U.S. Appl. No. 16/933,279, Response filed Aug. 25, v21 to Non Final Office Action mailed Mar. 25, 2021", 14 pgs.

(56) References Cited

OTHER PUBLICATIONS

"U.S. Appl. No. 16/933,366, Final Office Action mailed Oct. 21, 2021", 18 pgs.
"U.S. Appl. No. 16/933,366, Non Final Office Action mailed Apr. 27, 2021", 39 pgs.
"U.S. Appl. No. 16/933,366, Response filed Aug. 27, 2021 to Non Final Office Action mailed Apr. 27, 2021", 16 pgs.
"U.S. Appl. No. 16/943,706, Examiner Interview Summary mailed Feb. 15, 2022", 2 pgs.
"U.S. Appl. No. 16/943,706, Examiner Interview Summary mailed Mar. 31, 2021", 2 pgs.
"U.S. Appl. No. 16/943,706, Examiner Interview Summary mailed Jun. 23, 2022", 2 pgs.
"U.S. Appl. No. 16/943,706, Examiner Interview Summary mailed Aug. 28, 2023", 2 pgs.
"U.S. Appl. No. 16/943,706, Examiner Interview Summary mailed Nov. 5, 2021", 2 pgs.
"U.S. Appl. No. 16/943,706, Final Office Action mailed Feb. 24, 2021", 17 pgs.
"U.S. Appl. No. 16/943,706, Final Office Action mailed Aug. 12, 2022", 17 pgs.
"U.S. Appl. No. 16/943,706, Final Office Action mailed Nov. 29, 2021", 17 pgs.
"U.S. Appl. No. 16/943,706, Non Final Office Action mailed Mar. 22, 2022", 18 pgs.
"U.S. Appl. No. 16/943,706, Non Final Office Action mailed Jun. 1, 2023", 19 pgs.
"U.S. Appl. No. 16/943,706, Non Final Office Action mailed Jul. 9, 2021", 17 pgs.
"U.S. Appl. No. 16/943,706, Non Final Office Action mailed Sep. 8, 2020", 16 pgs.
"U.S. Appl. No. 16/943,706, Notice of Non-Responsive Amendment mailed Jan. 31, 2023", 2 pgs.
"U.S. Appl. No. 16/943,706, Response filed Feb. 8, 2021 to Non Final Office Action mailed Sep. 8, 2020", 9 pgs.
"U.S. Appl. No. 16/943,706, Response filed Feb. 28, 2022 to Final Office Action mailed Nov. 29, 2021", 9 pgs.
"U.S. Appl. No. 16/943,706, Response filed May 1, 2023 to Notice of Non-Responsive Amendment mailed Jan. 31, 2023", 13 pgs.
"U.S. Appl. No. 16/943,706, Response filed Jun. 24, 2021 to Final Office Action mailed Feb. 24, 2021", 11 pgs.
"U.S. Appl. No. 16/943,706, Response filed Jul. 29, 2022 to Non Final Office Action mailed Mar. 22, 2022", 12 pgs.
"U.S. Appl. No. 16/943,706, Response filed Sep. 1, 2023 to Non Final Office Action mailed Jun. 1, 2023", 10 pgs.
"U.S. Appl. No. 16/943,706, Response filed Nov. 8, 2021 to Non Final Office Action mailed Jul. 9, 2021", 11 pgs.
"U.S. Appl. No. 16/943,706, Response filed Nov. 11, 2022 to Final Office Action mailed Aug. 12, 2022", 8 pgs.
"U.S. Appl. No. 16/943,804, Examiner Interview Summary mailed Feb. 15, 2022", 2 pgs.
"U.S. Appl. No. 16/943,804, Examiner Interview Summary mailed Mar. 31, 2021", 2 pgs.
"U.S. Appl. No. 16/943,804, Examiner Interview Summary mailed Jun. 23, 2022", 2 pgs.
"U.S. Appl. No. 16/943,804, Examiner Interview Summary mailed Jul. 10, 2023", 2 pgs.
"U.S. Appl. No. 16/943,804, Examiner Interview Summary mailed Oct. 21, 2021", 2 pgs.
"U.S. Appl. No. 16/943,804, Final Office Action mailed Feb. 24, 2021", 15 pgs.
"U.S. Appl. No. 16/943,804, Final Office Action mailed Apr. 5, 2023", 16 pgs.
"U.S. Appl. No. 16/943,804, Final Office Action mailed Aug. 12, 2022", 17 pgs.
"U.S. Appl. No. 16/943,804, Final Office Action mailed Nov. 29, 2021", 17 pgs.
"U.S. Appl. No. 16/943,804, Non Final Office Action mailed Apr. 1, 2022", 17 pgs.
"U.S. Appl. No. 16/943,804, Non Final Office Action mailed Jul. 21, 2021", 16 pgs.
"U.S. Appl. No. 16/943,804, Non Final Office Action mailed Aug. 18, 2023", 16 pgs.
"U.S. Appl. No. 16/943,804, Non Final Office Action mailed Sep. 8, 2020", 14 pgs.
"U.S. Appl. No. 16/943,804, Non Final Office Action mailed Dec. 28, 2022", 18 pgs.
"U.S. Appl. No. 16/943,804, Response filed Feb. 8, 2021 to Non Final Office Action mailed Sep. 8, 2020", 7 pgs.
"U.S. Appl. No. 16/943,804, Response filed Feb. 28, 2022 to Final Office Action mailed Nov. 29, 2021", 8 pgs.
"U.S. Appl. No. 16/943,804, Response filed Mar. 22, 2023 to Non Final Office Action mailed Dec. 28, 2022", 10 pgs.
"U.S. Appl. No. 16/943,804, Response filed Jun. 24, 2021 to Final Office Action mailed Feb. 24, 2021", 8 pgs.
"U.S. Appl. No. 16/943,804, Response filed Jul. 3, 2023 to Final Office Action mailed Apr. 5, 2023", 9 pgs.
"U.S. Appl. No. 16/943,804, Response filed Jul. 29, 2022 to Non Final Office Action mailed Apr. 1, 2022", 10 pgs.
"U.S. Appl. No. 16/943,804, Response filed Oct. 25, 2022 to Final Office Action mailed Aug. 12, 2022", 10 pgs.
"U.S. Appl. No. 16/943,804, Response filed Nov. 4, 2021 to Non Final Office Action mailed Jul. 21, 2021", 9 pgs.
"U.S. Appl. No. 17/023,175, Non Final Office Action mailed Jun. 8, 2021", 8 pgs.
"U.S. Appl. No. 17/023,175, Notice of Allowance mailed Oct. 5, 2021", 7 pgs.
"U.S. Appl. No. 17/023,175, Response filed Sep. 8, 2021 to Non Final Office Action mailed Jun. 8, 2021", 6 pgs.
"U.S. Appl. No. 17/031,310, Notice of Allowance mailed Nov. 15, 2021", 9 pgs.
"U.S. Appl. No. 17/031,310, Preliminary Amendment filed Jan. 22, 21", 8 pgs.
"U.S. Appl. No. 17/035,575, Corrected Notice of Allowability mailed Mar. 8, 23", 4 pgs.
"U.S. Appl. No. 17/035,575, Non Final Office Action mailed May 26, 22", 31 pgs.
"U.S. Appl. No. 17/035,575, Notice of Allowance mailed Oct. 17, 22", 8 pgs.
"U.S. Appl. No. 17/035,575, Response filed Aug. 25, 22 to Non Final Office Action mailed May 26, 22", 12 pgs.
"U.S. Appl. No. 17/112,676, Advisory Action mailed Aug. 4, 23", 5 pgs.
"U.S. Appl. No. 17/112,676, Final Office Action mailed Feb. 10, 22", 30 pgs.
"U.S. Appl. No. 17/112,676, Final Office Action mailed May 11, 23", 17 pgs.
"U.S. Appl. No. 17/112,676, Final Office Action mailed Jun. 29, 2022", 35 pgs.
"U.S. Appl. No. 17/112,676, Final Office Action mailed Dec. 1, 2022", 14 pgs.
"U.S. Appl. No. 17/112,676, Non Final Office Action mailed Jan. 20, 2023", 13 pgs.
"U.S. Appl. No. 17/112,676, Non Final Office Action mailed Apr. 25, 2022".
"U.S. Appl. No. 17/112,676, Non Final Office Action mailed Sep. 1, 2023", 19 pgs.
"U.S. Appl. No. 17/112,676, Non Final Office Action mailed Sep. 9, 2022", 24 pgs.
"U.S. Appl. No. 17/112,676, Non Final Office Action mailed Sep. 23, 2021", 26 pgs.
"U.S. Appl. No. 17/112,676, Response filed Jan. 12, 2023 to Final Office Action mailed Dec. 1, 2022", 10 pgs.
"U.S. Appl. No. 17/112,676, Response filed Jan. 24, 2022 to Non Final Office Action mailed Sep. 23, 2021", 17 pgs.
"U.S. Appl. No. 17/112,676, Response filed Apr. 13, 2022 to Final Office Action mailed Feb. 10, 2022", 12 pgs.
"U.S. Appl. No. 17/112,676, Response filed Apr. 19, 2023 to Non Final Office Action mailed Jan. 20, 2023", 10 pgs.
"U.S. Appl. No. 17/112,676, Response filed Jun. 16, 2022 to Non Final Office Action mailed Apr. 25, 2022", 12 pgs.

(56) References Cited

OTHER PUBLICATIONS

"U.S. Appl. No. 17/112,676, Response filed Jul. 24, 2023 to Final Office Action mailed May 11, 2023", 14 pgs.
"U.S. Appl. No. 17/112,676, Response filed Aug. 24, 2022 to Final Office Action mailed Jun. 29, 2022", 13 pgs.
"U.S. Appl. No. 17/112,676, Response filed Nov. 17, 2022 to Non Final Office Action mailed Sep. 9, 2022", 13 pgs.
"U.S. Appl. No. 17/537,194, Final Office Action mailed Feb. 13, 2023", 20 pgs.
"U.S. Appl. No. 17/537,194, Non Final Office Action mailed Aug. 4, 2023", 23 pgs.
"U.S. Appl. No. 17/537,194, Non Final Office Action mailed Sep. 16, 2022", 17 pgs.
"U.S. Appl. No. 17/537,194, Preliminary Amendment filed Aug. 3, 2022", 8 pgs.
"U.S. Appl. No. 17/537,194, Response filed Jan. 17, 2023 to Non Final Office Action mailed Sep. 16, 2022", 11 pgs.
"U.S. Appl. No. 17/537,194, Response filed May 15, 2023 to Final Office Action mailed Feb. 13, 2023", 12 pgs.
"U.S. Appl. No. 17/567,624, Non Final Office Action mailed Sep. 29, 2023", 33 pgs.
"U.S. Appl. No. 17/567,624, Preliminary Amendment filed Sep. 20, 2022", 7 pgs.
"U.S. Appl. No. 17/699,985, Final Office Action mailed Dec. 27, 2022", 7 pgs.
"U.S. Appl. No. 17/699,985, Non Final Office Action mailed Jul. 25, 2022", 7 pgs.
"U.S. Appl. No. 17/699,985, Notice of Allowance mailed Apr. 7, 2023", 7 pgs.
"U.S. Appl. No. 17/699,985, Response filed Mar. 21, 2023 to Final Office Action mailed Dec. 27, 2022", 9 pgs.
"U.S. Appl. No. 17/699,985, Response filed Oct. 25, 2022 to Non Final Office Action mailed Jul. 25, 2022", 10 pgs.
"U.S. Appl. No. 18/162,404, Non Final Office Action mailed Jun. 5, 2023", 29 pgs.
"U.S. Appl. No. 18/162,404, Notice of Allowance mailed Oct. 2, 2023", 11 pgs.
"U.S. Appl. No. 18/162,404, Response filed Aug. 22, 2023 to Non Final Office Action mailed Jun. 5, 2023", 11 pgs.
"BlogStomp", StompSoftware, [Online] Retrieved from the Internet: <URL: http://stompsoftware.com/blogstomp>, (accessed May 24, 2017), 12 pgs.
"Canadian Application Serial No. 2,894,332 Response filed Jan. 24, 2017 to Office Action mailed Aug. 16, 2016", 15 pgs.
"Canadian Application Serial No. 2,894,332, Office Action mailed Aug. 16, 2016", 4 pgs.
"Canadian Application Serial No. 2,894,332, Request for Reinstatement filed Jun. 11, 2018", w/Amended Claims, 17 pgs.
"Canadian Application Serial No. 2,910, 158, Office Action mailed Jun. 6, 2018", 5 pgs.
"Canadian Application Serial No. 2,910,158, Office Action mailed Dec. 15, 2016", 5 pgs.
"Canadian Application Serial No. 2,910,158, Response filed Dec. 6, 2018 to Office Action mailed Jun. 6, 2018", w/ English Claims, 18 pgs.
"Canadian Application Serial No. 2,910,158, Response filed Apr. 11, 2017 to Office Action mailed Dec. 2015, 16", 21 pgs.
"Canadian Application Serial No. 2,962,822, Office Action mailed Jul. 20, 2020", 5 pgs.
"Canadian Application Serial No. 3,027,981, Office Action mailed Oct. 2, 2020", 5 pgs.
"Canadian Application Serial No. 3,027,981, Office Action mailed Dec. 5, 2019", 4 pgs.
"Canadian Application Serial No. 3,027,981, Response filed Feb. 2, 2021 to Office Action mailed Oct. 2, 2020", 15 pgs.
"Canadian Application Serial No. 3,027,981, Response filed Mar. 31, 2020 to Office Action mailed Dec. 5, 2019", 12 pgs.
"Chinese Application Serial No. 201580031616.8, Office Action mailed Jul. 2, 2018", w/ English translation, 8 pgs.
"Chinese Application Serial No. 201580031616.8, Office Action mailed Oct. 9, 2017", w/ English Translation, 18 pgs.
"Chinese Application Serial No. 201580031616.8, Response filed Feb. 26, 2018 to Office Action mailed Oct. 9, 2017", w/ English Translation, 8 pgs.
"Chinese Application Serial No. 201580065266.7, Office Action mailed Mar. 19, 2020", w/English translation, 15 pgs.
"Chinese Application Serial No. 201580065266.7, Response filed Jul. 17, 2020 Office Action mailed Mar. 19, 2020", w/ English Claims, 11 pgs.
"Chinese Application Serial No. 201580070593.1, Office Action mailed Apr. 8, 2020", w/ English Translation, 11 pgs.
"Chinese Application Serial No. 201580070593.1, Office Action mailed Oct. 23, 2020", w/ English Translation, 9 pgs.
"Chinese Application Serial No. 201580070593.1, Response filed Aug. 13, 2020 to Office Action mailed Apr. 8, 2020", w/ English Claims, 18 pgs.
"Chinese Application Serial No. 201580070593.1, Response filed Dec. 29, 2020 to Office Action mailed Oct. 23, 2020", 11 pgs.
"Chinese Application Serial No. 201580076228.1, Decision of Rejection mailed Jul. 9, v19", w/ English Translation, 19 pgs.
"Chinese Application Serial No. 201580076228.1, Office Action mailed Feb. 12, 2019", w/ English Translation, 18 pgs.
"Chinese Application Serial No. 201580076228.1, Office Action mailed Jul. 19, 2018", w/ English translation, 19 pgs.
"Chinese Application Serial No. 201580076228.1, Response filed Apr. 11, 2019 to Office Action mailed Feb. 12, 2019", w/ English Claims, 12 pgs.
"Chinese Application Serial No. 201580076228.1, Response filed Oct. 11, 2019 to Decision of Rejection mailed Jul. 9, 2019", w/ English Claims, 13 pgs.
"Chinese Application Serial No. 201580076228.1, Response filed Nov. 26, 2018 to Office Action mailed Jul. 19, 2018", w/ English Claims, 16 pgs.
"Chinese Application Serial No. 201680027177.8, Office Action mailed Oct. 28, 2019", W/English Translation, 15 pgs.
"Chinese Application Serial No. 201680027177.8, Response filed Mar. 5, 2020 to Office Action mailed Oct. 28, 2019", w/ English Claims, 11 pgs.
"Chinese Application Serial No. 201680035076.5, Office Action mailed May 27, 2020", w/ English Translation, 28 pgs.
"Chinese Application Serial No. 201680035076.5, Office Action mailed Sep. 4, 2019", w/ English Translation, 16 pgs.
"Chinese Application Serial No. 201680035076.5, Response filed Jul. 9, 2020 to Office Action mailed May 27, 2020", w/ English Claims, 18 pgs.
"Chinese Application Serial No. 201680035076.5, Response filed Dec. 26, 2019 to Office Action mailed Sep. 4, 2019", w/ English Claims, 15 pgs.
"Chinese Application Serial No. 201780034240.5, Office Action mailed Feb. 3, 2021", w/ English Translation, 13 pgs.
"Chinese Application Serial No. 201780034240.5, Office Action mailed Jun. 3, 2020", w/ English translation, 13 pgs.
"Chinese Application Serial No. 201780034240.5, Response filed Apr. 14, 2021 to Office Action mailed Feb. 3, 2021", w/ English Claims, 13 pgs.
"Chinese Application Serial No. 201780034240.5, Response filed Jul. 8, 2021 to Office Action", w/ English Claims, 11 pgs.
"Chinese Application Serial No. 201780034240.5, Response filed Oct. 16, 20 to Office Action mailed Jun. 3, 2020", w/ English Translation, 8 pgs.
"Chinese Application Serial No. 201880009907.0, Office Action mailed May 18, 2023", w/ English Translation, 4 pgs.
"Chinese Application Serial No. 201880009907.0, Office Action mailed Oct. 27, 2022", W/ English Translation, 13 pgs.
"Chinese Application Serial No. 201880009907.0, Response filed Mar. 11, 2023 to Office Action mailed Oct. 27, 2022", w/ English Claims, 17 pgs.
"Chinese Application Serial No. 202010978249.5, Office Action mailed Mar. 11, 2022", w/ English translation, 8 pgs.
"Chinese Application Serial No. 202010978249.5, Response filed Jul. 7, 2022 to Office Action mailed Mar. 11, 2022", w/ English claims, 8 pgs.

(56) References Cited

OTHER PUBLICATIONS

"Chinese Application Serial No. 202111204686.2, Office Action mailed Aug. 2, 2023", w/ English Translation, 13 pgs.
"Connecting To Your Customers In the Triangle and Beyond", Newsobserver.com, (2013), 16 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"Demystifying Location Data Accuracy", Mobile Marketing Association, (Nov. 2015), 18 pgs.
"European Application Serial No. 14804343.3, Extended European Search Report mailed Sep. 29, 2016", 12 pgs.
"European Application Serial No. 15733026.7, Communication Pursuant to Article 94(3) EPC mailed Jul. 28, 2017", 6 pgs.
"European Application Serial No. 15733026.7, Decision to Refuse a European Patent Application mailed Nov. 18, 2019", 20 pgs.
"European Application Serial No. 15733026.7, Response filed Jan. 30, 2018 to Communication Pursuant to Article 94(3) EPC mailed Jul. 28, 2017", w/ Amended Claims, 37 pgs.
"European Application Serial No. 15733026.7, Response filed Aug. 9, 2019 to Summons to Attend Oral Proceedings mailed Jan. 10, 2019", w/ English Claims, 19 pgs.
"European Application Serial No. 15733026.7, Summons to Attend Oral Proceedings mailed Jan. 10, 2019", 7 pgs.
"European Application Serial No. 15782165.3, Communication Pursuant to Article 94(3) EPC mailed Sep. 14, 2018", 7 pgs.
"European Application Serial No. 15782165.3, Decision to Refuse a European Patent Application mailed Mar. 19, 2020", 23 pgs.
"European Application Serial No. 15782165.3, Response filed Jan. 10, 2020 to Summons to Attend Oral Proceedings mailed Sep. 18, 2019", 18 pgs.
"European Application Serial No. 15782165.3, Response filed Jan. 24, 2019 to Communication Pursuant to Article 94(3) EPC mailed Sep. 14, 2018", w/ English Claims, 54 pgs.
"European Application Serial No. 15782165.3, Response filed Oct. 17, 2017 to Communication pursuant to Rules 161(1) and 162 EPC mailed May 10, 2017", 15 pgs.
"European Application Serial No. 15782165.3, Summons to Attend Oral Proceedings mailed Sep. 18, 2019", 6 pgs.
"European Application Serial No. 15787854.7, Communication Pursuant to Article 94(3) EPC mailed Feb. 12, 2020", 7 pgs.
"European Application Serial No. 15787854.7, Response filed Dec. 11, 2017 to Communication Pursuant to Rules 161(1) and 162 EPC mailed Jun. 1, 2017", 16 pgs.
"European Application Serial No. 15841735.2, Communication Pursuant to Article 94(3) EPC mailed Jan. 17, 2019", 7 pgs.
"European Application Serial No. 15841735.2, Extended European Search Report mailed Feb. 12, 2018", 9 pgs.
"European Application Serial No. 15870861.0, Communication Pursuant to Article 94(3) EPC mailed Jul. 12, 2018", 5 pgs.
"European Application Serial No. 15870861.0, Extended European Search Report mailed Jul. 3, 2018", 4 pgs.
"European Application Serial No. 15870861.0, Response filed May 31, 2019 to Summons to Attend Oral Proceedings mailed Dec. 21, 2018", w/ English Claims, 23 pgs.
"European Application Serial No. 15870861.0, Response filed Aug. 9, 2017 to Communication Pursuant to Rules 161(2) and 162 EPC mailed Aug. 4, 2017", 10 pgs.
"European Application Serial No. 15870861.0, Response filed Nov. 14, 2018 to Communication Pursuant to Article 94(3) EPC mailed Jul. 12, 2018", w/ English Claims, 27 pgs.
"European Application Serial No. 15870861.0, Summons to Attend Oral Proceedings mailed Dec. 21, 2018", 5 pgs.
"European Application Serial No. 15870874.3, Communication Pursuant to Article 94(3) EPC mailed Feb. 22, 2021", 5 pgs.
"European Application Serial No. 15870874.3, Extended European Search Report mailed Nov. 29, 2017", 7 pgs.
"European Application Serial No. 16716090.2, Communication Pursuant to Article 94(3) EPC mailed Jan. 15, 2020", 6 pgs.
"European Application Serial No. 16716090.2, Response filed Apr. 15, 2020 to Communication Pursuant to Article 94(3) EPC mailed Jan. 15, 2020", 10 pgs.
"European Application Serial No. 16716090.2, Response filed May 21, 2018 to Communication pursuant to Rules 161(1) and 162 EPC mailed Nov. 10, 2017", w/ English Claims, 89 pgs.
"European Application Serial No. 16829020.3, Communication Pursuant to Article 94(3) EPC mailed Sep. 9, 2020", 3 pgs.
"European Application Serial No. 16829020.3, Response filed Jan. 29, 2019 to Communication Pursuant to Rules 161(1) and 162 EPC mailed Jul. 25, 2018", w/ English Claims, 17 pgs.
"European Application Serial No. 18747246.9, Communication Pursuant to Article 94(3) EPC mailed Jun. 25, 2020", 10 pgs.
"European Application Serial No. 18747246.9, Extended European Search Report mailed Nov. 7, 2019", 7 pgs.
"European Application Serial No. 18747246.9, Response Filed Jun. 3, 2020 to Extended European Search Report mailed Nov. 7, 2019", 15 pgs.
"European Application Serial No. 18747246.9, Response filed Oct. 15, 2020 to Communication Pursuant to Article 94(3) EPC mailed Jun. 25, 2020", 16 pgs.
"European Application Serial No. 18747246.9, Summons to Attend Oral Proceedings mailed Jun. 29, 2021", 12 pgs.
"European Application Serial No. 20173925.7, Extended European Search Report mailed Aug. 20, 2020", 8 pgs.
"European Application Serial No. 21195813.7, Extended European Search Report mailed Dec. 20, 2021", 8 pgs.
"European Application Serial No. 21218403.0, Extended European Search Report mailed Apr. 20, 2022", 13 pgs.
"Geofencing and the event industry", Goodbarber Blog, [Online] Retrieved from the internet by the examiner on May 16, 2019: <URL: https://www.goodbarber.com/blog/geofencing-and-the-event-industry-a699/>, (Nov. 9, 2015), 7 pgs.
"How Snaps Are Stored And Deleted", Snapchat, [Online] Retrieved from the Internet: <URL: https://www.snap.com/en-us/news/post/how-snaps-are-stored-and-deleted/>, (May 9, 2013), 2 pgs.
"IAB Platform Status Report: A Mobile Advertising Review", Interactive Advertising Bureau, (Jul. 2008), 24 pgs.
"InstaPlace Photo App Tell The Whole Story", [Online] Retrieved from the Internet: <URL: youtu.be/uF_gFkg1hBM>, (Nov. 8, 2013), 113 pgs, 1:02 min.
"International Application Serial No. PCT/EP2008/063682, International Search Report mailed Nov. 24, 2008", 3 pgs.
"International Application Serial No. PCT/US2014/040346, International Search Report mailed Mar. 23, 2015", 2 pgs.
"International Application Serial No. PCT/US2014/040346, Written Opinion mailed Mar. 23, 2015", 6 pgs.
"International Application Serial No. PCT/US2015/035591, International Preliminary Report on Patentability mailed Dec. 22, 2016", 7 pgs.
"International Application Serial No. PCT/US2015/035591, International Search Report mailed Aug. 11, 2015", 5 pgs.
"International Application Serial No. PCT/US2015/035591, International Written Opinion mailed Aug. 11, 2015", 5 pgs.
"International Application Serial No. PCT/US2015/037251, International Search Report mailed Sep. 29, 2015", 2 pgs.
"International Application Serial No. PCT/US2015/037251, Written Opinion mailed Sep. 29, 2015", 4 pgs.
"International Application Serial No. PCT/US2015/050424, International Preliminary Report on Patentability mailed Mar. 30, 2017", 12 pgs.
"International Application Serial No. PCT/US2015/050424, International Search Report mailed Dec. 4, 2015", 2 pgs.
"International Application Serial No. PCT/US2015/050424, Written Opinion mailed Dec. 4, 2015", 10 pgs.
"International Application Serial No. PCT/US2015/053811, International Preliminary Report on Patentability mailed Apr. 13, 2017", 9 pgs.

(56) References Cited

OTHER PUBLICATIONS

"International Application Serial No. PCT/US2015/053811, International Search Report mailed Nov. 23, 2015", 5 pgs.
"International Application Serial No. PCT/US2015/053811, Written Opinion mailed Nov. 23, 2015", 8 pgs.
"International Application Serial No. PCT/US2015/056884, International Preliminary Report on Patentability mailed May 4, 2017", 8 pgs.
"International Application Serial No. PCT/US2015/056884, International Search Report mailed Dec. 22, 2015", 5 pgs.
"International Application Serial No. PCT/US2015/056884, Written Opinion mailed Dec. 22, 2015", 6 pgs.
"International Application Serial No. PCT/US2015/065785, International Preliminary Report on Patentability mailed Jun. 29, 2017", 7 pgs.
"International Application Serial No. PCT/US2015/065785, International Search Report mailed Jul. 21, 2016", 5 pgs.
"International Application Serial No. PCT/US2015/065785, Written Opinion mailed Jul. 21, 2016", 5 pgs.
"International Application Serial No. PCT/US2015/065821, International Preliminary Report on Patentability mailed Jun. 29, 2017", 5 pgs.
"International Application Serial No. PCT/US2015/065821, International Search Report mailed Mar. 3, 2016", 2 pgs.
"International Application Serial No. PCT/US2015/065821, Written Opinion mailed Mar. 3, 2016", 3 pgs.
"International Application Serial No. PCT/US2016/023085, International Preliminary Report on Patentability mailed Sep. 28, 2017", 8 pgs.
"International Application Serial No. PCT/US2016/023085, International Search Report mailed Jun. 17, 2016", 5 pgs.
"International Application Serial No. PCT/US2016/023085, Written Opinion mailed Jun. 17, 2016", 6 pgs.
"International Application Serial No. PCT/US2016/066976, International Preliminary Report on Patentability mailed Jun. 28, 2018", 9 pgs.
"International Application Serial No. PCT/US2016/066976, International Search Report mailed May 17, 2017", 7 pgs.
"International Application Serial No. PCT/US2016/066976, Invitation to Pay Add'l Fees and Partial Search Rpt mailed Mar. 6, 2017", 8 pgs.
"International Application Serial No. PCT/US2016/066976, Written Opinion mailed May 17, 2017", 7 pgs.
"International Application Serial No. PCT/US2017/025925,on Patentability mailed Oct. 18, 2018", 6 pgs.
"International Application Serial No. PCT/US2017/025925, International Search Report mailed Jun. 28, 2017", 2 pgs.
"International Application Serial No. PCT/US2017/025925, Written Opinion mailed Jun. 28, 2017", 4 pgs.
"International Application Serial No. PCT/US2018/016723, International Preliminary Report on Patentability mailed Aug. 15, 2019", 19 pgs.
"International Application Serial No. PCT/US2018/016723, International Search Report mailed Apr. 5, 2018", 2 pgs.
"International Application Serial No. PCT/US2018/016723, Written Opinion mailed Apr. 5, 2018", 17 pgs.
"International Application Serial No. PCT/US2018/024093, International Preliminary Report on Patentability mailed Oct. 10, 2019", 7 pgs.
"International Application Serial No. PCT/US2018/024093, International Search Report mailed Jul. 19, 2018", 2 pgs.
"International Application Serial No. PCT/US2018/024093, Written Opinion mailed Jul. 19, 2018", 5 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"iVisit Mobile: Getting Started", IVISIT, [Online] Retrieved from the Internet: <URL: http://web.archive.org/web/20140830174355/http://ivisit.com/support_mobile>, (Dec. 4, 2013), 16 pgs.
"Korean Application Serial No. 10-2017-7001104, Response filed Jul. 25, 2017 to Office Action mailed Jun. 26, 2017", w/ Translation of Claims, 20 pgs.
"Korean Application Serial No. 10-2017-7012120, Notice of Preliminary Rejection mailed Jun. 17, 2020", w/ English Translation, 8 pgs.
"Korean Application Serial No. 10-2017-7012120, Response filed Sep. 3, 2020 to Notice of Preliminary Rejection mailed Jun. 17, 2020", w/ English Claims, 22 pgs.
"Korean Application Serial No. 10-2017-7014135, Final Office Action mailed Feb. 28, 2019", w/ English Translation, 7 pgs.
"Korean Application Serial No. 10-2017-7014135, Notice of Preliminary Rejection mailed Apr. 19, 2019", w/ English Translation, 14 pgs.
"Korean Application Serial No. 10-2017-7014135, Notice of Preliminary Rejection mailed Jul. 20, 2018", w/ English Translation, 13 pgs.
"Korean Application Serial No. 10-2017-7014135, Response filed Mar. 29, 2019 to Final Office Action mailed Feb. 28, 2019", w/ English Claims, 14 pgs.
"Korean Application Serial No. 10-2017-7014135, Response filed Jun. 19, 2019 to Notice of Preliminary Rejection mailed Apr. 19, 2019", w/ English Claims, 16 pgs.
"Korean Application Serial No. 10-2017-7014135, Response filed Sep. 17, 2018 to Notice of Preliminary Rejection mailed Jul. 20, 2018", w/ English Claims, 16 pgs.
"Korean Application Serial No. 10-2017-7020217, Final Office Action mailed Jan. 31, 2018", w/ English Translation, 10 pgs.
"Korean Application Serial No. 10-2017-7020217, Office Action mailed Sep. 15, 2017", w/ English Translation, 11 pgs.
"Korean Application Serial No. 10-2017-7020217, Response filed Feb. 23, 2018 to Final Office Action mailed Jan. 31, 2018", w/ English Translation, 13 pgs.
"Korean Application Serial No. 10-2017-7020217, Response filed Nov. 2, 2017 to Office Action mailed Sep. 15, 2017", w/ English Translation, 17 pgs.
"Korean Application Serial No. 10-2017-7029861, Notice of Preliminary Rejection mailed Jan. 17, 2019", w/ English Translation, 9 pgs.
"Korean Application Serial No. 10-2017-7029861, Response filed Mar. 15, 2019 to Notice of Preliminary Rejection mailed Jan. 17, 2019", w/ English Claims, 20 pgs.
"Korean Application Serial No. 10-2017-7035789, Notice of Preliminary Rejection mailed Nov. 12, 2018", w/ English Translation, 12 pgs.
"Korean Application Serial No. 10-2017-7035789, Response filed Jan. 10, 2019 to Notice of Preliminary Rejection mailed Nov. 12, 2018", w/ English Claims, 23 pgs.
"Korean Application Serial No. 10-2018-7002127, Notice of Preliminary Rejection mailed Apr. 10, 2018", w/ English Translation, 4 pgs.
"Korean Application Serial No. 10-2018-7002127, Response filed May 16, 2018 to Notice of Preliminary Rejection mailed Apr. 10, 2018", w/ English Claims, 14 pgs.
"Korean Application Serial No. 10-2018-7016881, Notice of Preliminary Rejection mailed Oct. 19, 2018", w/ English translation, 9 pgs.
"Korean Application Serial No. 10-2018-7016881, Response filed Nov. 30, 2018 to Notice of Preliminary Rejection mailed Oct. 19, 2018", w/ English Claims, 27 pgs.
"Korean Application Serial No. 10-2018-7031943, Notice of Preliminary Rejection mailed Feb. 11, 2020", w/ English Translation, 9 pgs.
"Korean Application Serial No. 10-2018-7031943, Response filed Jun. 18, 2020 to Notice of Preliminary Rejection mailed Feb. 11, 2020", w/ English Claims, 20 pgs.
"Korean Application Serial No. 10-2018-7037070, Notice of Final Rejection mailed Sep. 30, 2019", w/ English Translation, 5 pgs.
"Korean Application Serial No. 10-2018-7037070, Notice of Final Rejection mailed Nov. 25, 2019", w/ English Translation, 5 pgs.
"Korean Application Serial No. 10-2018-7037070, Notice of Preliminary Rejection mailed Mar. 20, 2019", w/ English Translation, 10 pgs.

(56) References Cited

OTHER PUBLICATIONS

"Korean Application Serial No. 10-2018-7037070, Response filed Oct. 23, 2019 to Notice of Final Rejection mailed Sep. 30, 2019", w/ English Claims, 16 pgs.
"Korean Application Serial No. 10-2018-7037070, Response filed May 14, 2019 to Notice of Preliminary Rejection mailed Mar. 20, 2019", w/ English Translation, 10 pgs.
"Korean Application Serial No. 10-2019-7025443, Notice of Preliminary Rejection mailed Feb. 2, 2021", w/ English Translation, 11 pgs.
"Korean Application Serial No. 10-2019-7025443, Response filed May 3, 2021 to Notice of Preliminary Rejection mailed Feb. 2, 2021", w/ English Claims, 29 pgs.
"Korean Application Serial No. 10-2019-7030235, Final Office Action mailed May 20, 2020", w/English Translation, 5 pgs.
"Korean Application Serial No. 10-2019-7030235, Notice of Preliminary Rejection mailed Nov. 28, 2019", w/ English Translation, 10 pgs.
"Korean Application Serial No. 10-2019-7030235, Response filed Jan. 28, 2020 to Notice of Preliminary Rejection mailed Nov. 28, 2019", w/ English Claims, 12 pgs.
"Korean Application Serial No. 10-2019-7030235, Response filed Jun. 22, 2020 to Final Office Action mailed May 20, 2020", w/ English Claims, 16 pgs.
"Korean Application Serial No. 10-2019-7031595, Notice of Preliminary Rejection mailed Sep. 1, 2020", w/ English translation, 11 pgs.
"Korean Application Serial No. 10-2019-7036962, Notice of Preliminary Rejection mailed Jan. 3, 2020", w/ English Translation, 11 pgs.
"Korean Application Serial No. 10-2019-7036962, Response filed Feb. 17, 2020 to Notice of Preliminary Rejection mailed Jan. 3, 2020", w/ English Claims, 25 pgs.
"Korean Application Serial No. 10-2019-7038483, Notice of Preliminary Rejection mailed Jan. 31, 2020", w/ English translation, 4 pgs.
"Korean Application Serial No. 10-2019-7038483, Response filed Mar. 10, 20 to Notice of Preliminary Rejection mailed Jan. 31, 2020", w/ English Claims, 19 pgs.
"Korean Application Serial No. 10-2020-7008140, Notice of Preliminary Rejection mailed Jun. 16, 2020", w/ English Translation, 7 pgs.
"Korean Application Serial No. 10-2020-7008140, Office Action mailed Dec. 30, 2020", w/ English Translation, 7 pgs.
"Korean Application Serial No. 10-2020-7008140, Response filed Jan. 28, 2021 to Office Action mailed Dec. 30, 2020", w/ English Claims, 16 pgs.
"Korean Application Serial No. 10-2020-7008140, Response filed Aug. 14, 2020 to Notice of Preliminary Rejection mailed Jun. 16, 2020", w/ English Claims, 21 pgs.
"Korean Application Serial No. 10-2020-7024025, Notice of Preliminary Rejection mailed Sep. 1, 2020", w/ English Translation, 4 pgs.
"Korean Application Serial No. 10-2021-7001942, Notice of Preliminary Rejection mailed Apr. 20, 2021", w/ English translation, 11 pgs.
"Korean Application Serial No. 10-2021-7001942, Notice of Preliminary Rejection mailed Oct. 28, 2021", w/ English Translation, 11 pgs.
"Korean Application Serial No. 10-2021-7001942, Response filed Jun. 15, 2021 to Notice of Preliminary Rejection mailed Apr. 20, 2021", w/ English Claims, 22 pgs.
"Korean Application Serial No. 10-2021-7004232, Notice of Preliminary Rejection mailed Feb. 23, 2021", w/ English translation, 12 pgs.
"Korean Application Serial No. 10-2021-7004232, Response filed May 24, 2021 to Notice of Preliminary Rejection mailed Feb. 23, 2021", w/ English Claims, 22 pgs.
"Korean Application Serial No. 10-2021-7004376, Notice of Preliminary Rejection mailed May 31, 2021", w/ English translation, 9 pgs.
"Korean Application Serial No. 10-2021-7004376, Response filed Aug. 12, 2021 to Notice of Preliminary Rejection mailed May 31, 2021", w/ English Translation, 47 pgs.
"Korean Application Serial No. 10-2021-7013085, Notice of Preliminary Rejection mailed Jul. 30, 2021", w/ English translation, 8 pgs.
"Korean Application Serial No. 10-2021-7013085, Response filed Sep. 30, 2021 to Notice of Preliminary Rejection mailed Jul. 30, 2021", w/ English Claims, 17 pgs.
"Korean Application Serial No. 10-2021-7039934, Notice of Preliminary Rejection mailed Jan. 13, 2022", w/ English Translation, 9 pgs.
"Korean Application Serial No. 10-2021-7042330, Notice of Preliminary Rejection mailed Mar. 8, 2022", w/ English translation, 12 pgs.
"Korean Application Serial No. 10-2022-7007037, Notice of Preliminary Rejection mailed Jul. 5, 2022", W/English Translation, 7 pgs.
"Korean Application Serial No. 10-2022-7007037, Response filed Sep. 5, 2022 to Notice of Preliminary Rejection mailed Jul. 5, 2022", w/ English Claims, 18 pgs.
"Korean Application Serial No. 10-2022-7039119, Notice of Preliminary Rejection mailed Jul. 13, 2023", With English translation, 6 pgs.
"Korean Application Serial No. 10-2022-7039119, Notice of Preliminary Rejection mailed Dec. 7, 2022", w/ English translation, 13 pgs.
"Korean Application Serial No. 10-2022-7039119, Response filed Feb. 15, 2023 to Notice of Preliminary Rejection mailed Dec. 7, 2022", w/ English Claims, 18 pgs.
"Korean Application Serial No. 10-2022-7039119, Response filed Aug. 25, 2023 to Notice of Preliminary Rejection mailed Jul. 13, 2023", With English claims, 15 pgs.
"Korean Application Serial No. 10-2023-7003584, Notice of Preliminary Rejection mailed Sep. 14, 2023", With English machine translation, 15 pgs.
"Korean Office Action Application Serial No. 10-2017-7001104, Office Action mailed Jun. 26, 2017", w/ English Translation, 12 pgs.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Mobile Location User Cases and Case Studies", Interactive Advertising Bureau, (Mar. 2014), 25 pgs.
"Pluraleyes by Red Giant", © 2002-2015 Red Giant LLC, [Online]. Retrieved from the Internet: <URL: http://www.redgiant.com/products/pluraleyes/, (Accessed Nov. 11, 2015), 5 pgs.
"Starbucks Cup Magic", [Online] Retrieved from the Internet: <URL: https://www.youtube.com/watch?v=RWwQXi9RG0w>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
"Surprise!", [Online] Retrieved from the Internet: <URL: https://www.snap.com/en-us/news/post/surprise>, (Oct. 3, 2013), 1 pg.
"To Err is Human. To Self Destruct Messages, There is iDelete for IOS", The Apple Google, [Online]. Retrieved from the Internet on Mar. 21, 2018: <http://theapplegoogle.com/2013/04/err-human-destruct-messages-idelete-ios/>, (2013), 2 pgs.

(56) References Cited

OTHER PUBLICATIONS

"WIPO; International Preliminary Report; WO201776739", (Sep. 10, 2018), 5 pgs.
"WIPO; Search Strategy; WO201776739", (Dec. 10, 2017), 6 pgs.
Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.
Carr, Dale, "Mobile Ad Targeting: A Labor of Love", Ad Week, [Online] Retrieved from the Internet on Feb. 11, 2019: <URL: https://www.adweek.com/digital/mobile-ad-targeting-a-labor-of-love/>, (Feb. 12, 2016), 7 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Castelluccia, Claude, et al., "EphPub: Toward robust Ephemeral Publishing", 19th IEEE International Conference on Network Protocols (ICNP), (Oct. 17, 2011), 18 pgs.
Chen, Datong, et al., "Protecting Personal Identification in Video", Protecting Privacy in Video Surveillance, Springer-Verlag London Ltd., (2009), 115-128.
Clarke, Tangier, "Automatically syncing multiple clips and lots of audio like PluralEyes possible?", [Online]. Retrieved from the Internet: <URL: https://forums.creativecow.net/thread/344/20553, (May 21, 2013), 8 pgs.
Constantinides, Stephen, "Real time geo-social visualization platform", U.S. Appl. No. 15/189,691, filed Jun. 22, 2016, 57 pgs.
Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.
Fajman, "An Extensible Message Format for Message Disposition Notifications", Request for Comments: 2298, National Institutes of Health, (Mar. 1998), 28 pgs.
Feldman, Douglas E, "Map-based remarks", U.S. Appl. No. 61/994,591, filed May 16, 2014, 43 pgs.
Garzon, Rodriguez Sandro, "Geofencing 2.0: Taking Location-based Notifications to the Next Level", (2012).
Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.
Isaac, Mike, "New Mobile App Vyclone Aims to Remix Social Video From Every Angle", All Things D, The Wallstreet Journal, [Online] Retrieved from the Internet: <URL: http://allthingsd.com/20120718/new-mobile-app-vyclone-aims-to-remix-social-video-from-every-angle/>, (Jul. 18, 2012), 4 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Kumar, S, "Optimization Issues in Web and Mobile Advertising", Chapter 2—Pricing Models in Web Advertising, SpringerBriefs in Operations Management, (2016), 6 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Lorenz, Taylor, "Snapchat revealsTaylor geofilters that can only be unlocked in the right place", Daily Mail Online, [Online] Retrieved from the Internet: <URL: http://www.dailymail.co.uk/sciencetech/article-2693196/Snapchat-introduces-location-specific-Geofilters.html>, (Jul. 17, 2014), 30 pgs.
Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Naylor, Joseph, "Geo-Precise Targeting: It's time to Get off the Fence", Be In The Know Blog, [Online] Retrieved from the internet by the examiner on May 16, 2019: <URL: http://blog.cmglocalsolutions.com/geo-precise-targeting-its-time-to-get-off-the-fence>, (May 15, 2015), 6 pgs.
Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.
Palmer, Alex, "Geofencing at events: how to reach potential customers live and on-site", Streetfight Mag, [Online] Retrieved form the internet by the examiner on May 16, 2019: <URL: http://streetfightmag.com/2015/08/20/geofencing-at-events-how-to-reach-potential-customers-live-and-on-site>, (Aug. 20, 2015), 6 pgs.
Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Peterson, Lisa, et al., "Location-Based Advertising", Peterson Mobility Solutions, (Dec. 2009), 39 pgs.
Quercia, Daniele, et al., "Mobile Phones and Outdoor Advertising: Measurable Advertising", IEEE Persuasive Computing, (2011), 9 pgs.
Rossignol, Joe, "How to screenshot Snapchat without sending notification", [Online] Retrieved from the Internet: <URL: https://www.idownloadblog.com/author/joerossignol/>, (May 3, 2014), 16 pgs.
Rush, David, "Real Time Relevancy Scoring System for Social Media Posts", U.S. Appl. No. 62/038,837, filed Aug. 19, 2014, 7 pgs.
Sawers, Paul, "Snapchat for iOS Lets You Send Photos to Friends and Set How long They're Visible For", [Online] Retrieved from the Internet: <URL: https://thenextweb.com/news/snapchat-for-ios-lets-you-send-photos-to-friends-and-set-how-long-theyre-visible-for>, (May 7, 2012), 5 pgs.
Shein, Esther, "Ephemeral Data", Communications of the ACM, vol. 56, No. 9, (Sep. 2013), 3 pgs.
Simonite, Tom, "Mobile Data: A Gold Mine for Telcos", MIT Technology Review, (May 27, 2010), 6 pgs.
Trice, Andrew, "My Favorite New Feature: Multi-Clip Sync in Premiere Pro CC", [Online]. Retrieved from the Internet: <URL: http://www.tricedesigns.com/2013/06/18/my-favorite-new-feature-multi-cam-synch-in-premiere-pro-cc/, (Jun. 18, 2013), 5 pgs.
Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.
Vaas, Lisa, "StealthText, Should You Choose to Accept It", [Online] Retrieved from the Internet: <URL: https://www.eweek.com/enterprise-apps/stealthtext-should-you-choose-to-accept-it/>, (Dec. 13, 2005), 3 pgs.
Virgillito, Dan, "Facebook Introduces Mobile Geo-Fencing With Local Awareness Ads", Adespresso, [Online] Retrieved from the internet by the examiner on May 16, 2019: <URL: https://adespresso.com/blog/facebook-local-business-ads-geo-fencing/>, (Oct. 8, 2014), 14 pgs.
Wagner, Kurt, "Snapchat Rolls Out Group-Sharing Feature for Concerts, Live Events", Mashable, [Online] Retrieved from the Internet on Sep. 12, 2019: < URL: https://mashable.com/2014/06/17/snapchat-our-story/?europe=true>, (Jun. 17, 2014), 16 pgs.
"U.S. Appl. No. 17/567,624, Examiner Interview Summary mailed Mar. 19, 2025", 2 pgs.
"U.S. Appl. No. 17/567,624, Examiner Interview Summary mailed Dec. 12, 2024", 2 pgs.
"U.S. Appl. No. 17/567,624, Final Office Action mailed Jan. 7, 2025", 39 pgs.

(56) References Cited

OTHER PUBLICATIONS

"U.S. Appl. No. 17/567,624, Non Final Office Action mailed Sep. 11, 2024", 36 pgs.
"U.S. Appl. No. 17/567,624, Notice of Allowance mailed Apr. 21, 2025", 10 pgs.
"U.S. Appl. No. 17/567,624, Response filed Apr. 7, 2025 to Final Office Action mailed Jan. 7, 2025", 9 pgs.
"U.S. Appl. No. 17/567,624, Response filed Jun. 26, 2024 to Final Office Action mailed Mar. 27, 2024", 10 pgs.
"U.S. Appl. No. 17/567,624, Response filed Dec. 10, 2024 to Non Final Office Action mailed Sep. 11, 2024", 9 pgs.
"U.S. Appl. No. 19/274,202, Non Final Office Action mailed Jul. 7, 2026", 30 pgs.

* cited by examiner

600

800

MUTABLE GEO-FENCING SYSTEM

RELATED APPLICATIONS

This application is a continuation of U.S. patent application Ser. No. 15/474,821, filed Mar. 30, 2017, which application claims the benefit of priority from U.S. Provisional Patent Application Ser. No. 62/318,049, filed on Apr. 4, 2016, both of which are hereby incorporated by reference in their entireties.

TECHNICAL FIELD

Embodiments of the present disclosure relate generally to mobile computing technology and, more particularly, but not by way of limitation, to mutable geo-fencing system.

BACKGROUND

Geo-fencing is the practice of using a global positioning system (GPS) or radio frequency identification (RFID) to define a geographic boundary that may encompass a region. Once the virtual boundary is established, an administrator can set triggers to transmit content when devices enter (or exit) the specified region. Advertisers often use geo-fences to distribute marketing campaigns to devices that may enter a particular region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
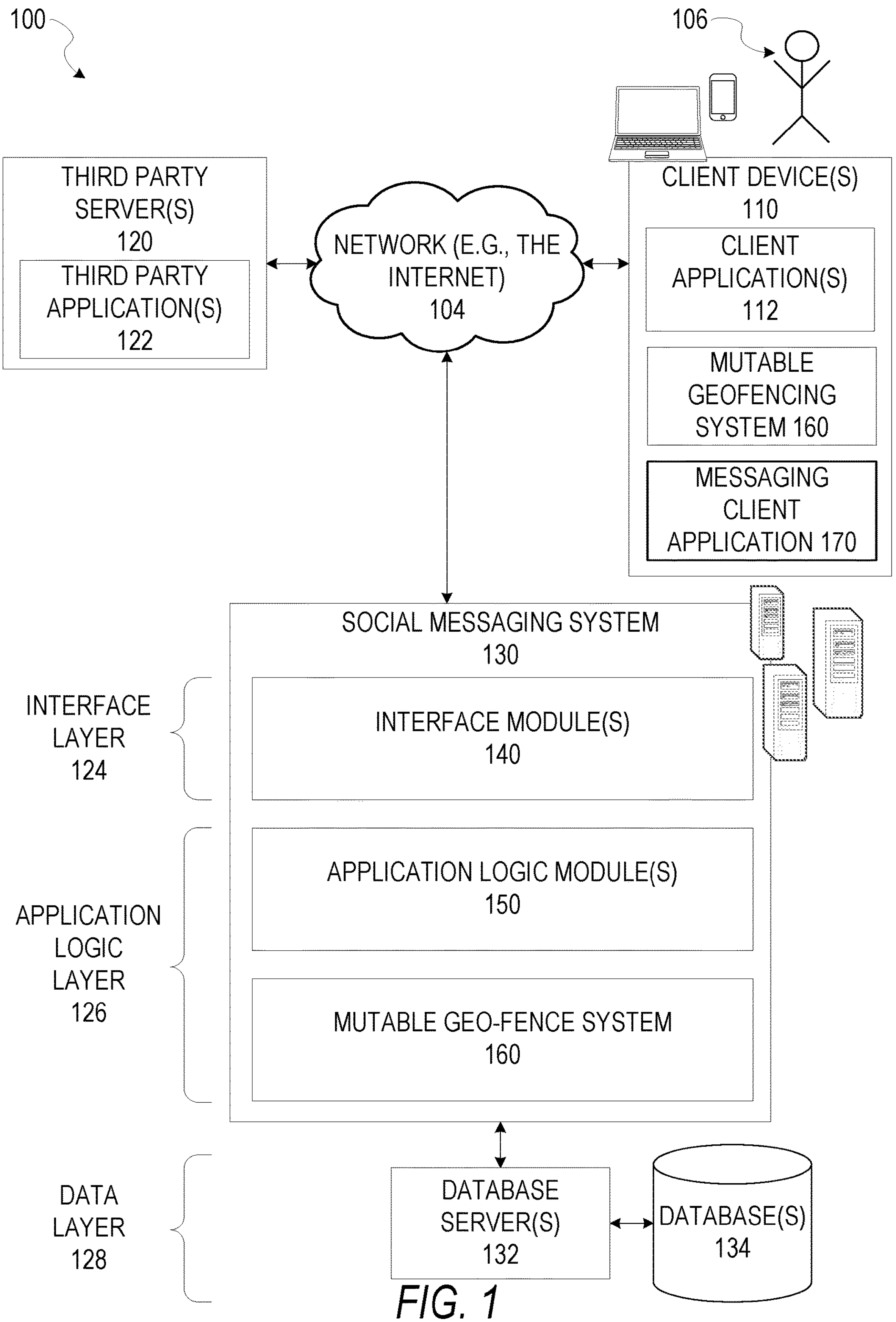
FIG. 1 is a block diagram showing an example messaging system for exchanging data (e.g., messages and associated content) over a network.

In various embodiments, boundaries of geo-fences can be made mutable based on principles described herein. The term "mutable" refers to the ability of a thing (in this case, the boundary of a geo-fence) to change and adjust. In a typical embodiment, a mutable geo-fence system is configured to generate and monitor a geo-fence that encompasses a region, in order to dynamically vary the boundary of the geo-fence based on a number of boundary variables. The term "geo-fence" as used herein describes a virtual perimeter (e.g., a boundary) for a real-world geographic area. A geo-fence could be a radius around a point (e.g., a store), or a set of otherwise-defined boundaries. The real-world geographic area within a given geo-fence will be referenced herein as a geo-fenced area. Boundary variables, as used herein, refers to a set of variables used by the mutable geo-fence system in determining a location of the boundary of the geo-fence.

Geo-fences are often used by advertisers to deliver or enable content to devices that cross over the boundary of the geo-fence, into the geo-fenced area. The content may include a campaign managed by an advertiser to deliver coupons or digital media content (e.g., images, videos, interactive digital information) to devices that enter into or near the geo-fenced area. For example, an advertiser may employ the mutable geo-fence system to configure a geo-fence managed by the mutable geo-fence system to deliver customized media content to devices that enter into a particular geo-fenced area.

For purposes of this disclosure, the mutable geo-fence system may be or include any instrumentality or aggregate of instrumentalities operable to compute, process, store, display, generate, communicate, or apply various forms of data for geo-fencing, control, or other purposes. For example, the mutable geo-fence system may be or include a group of one or more server machines configured to request and receive geo-location data that defines one or more locations of interest, monitor the geo-fenced areas encompassed by the geo-fence (e.g., monitoring locations of devices relative to the geo-fence), and adjust a boundary of the geo-fence based on one or more boundary variables. The boundary variables may include a size and shape of the geo-fence, a distribution of devices within the geo-fence, as well as usage metrics of the geo-fence itself. A location of interest may include one or more real-world locations and events, such as, retail locations, concerts, parties, community events, as well as public locations.

The geo-location data may include a set of coordinates that define a point (e.g., longitude, latitude, and altitude), a polygon or free-form shape that encompasses a region in a map image corresponding to a real-world location, as well as satellite and image data. The mutable geo-fence system generates a geo-fence with a boundary that encompasses a region defined by the geo-location data received. For example, the geo-location data may include coordinates, or an address, of a retail location, and in response to receiving the coordinates, the mutable geo-fence system generates a geo-fence having a radius and boundary that encompasses the retail location. The geo-fence may be circular (e.g., a radius distance and a point defined by latitude and longitude), or a polygon, based on the geo-location data received.

Having generated the geo-fence, the mutable geo-fence system provides access to media content associated with the location of interest encompassed by the boundary of the geo-fence to devices that cross into the geo-fenced area. The media content may include digital images, audio, video and image or media overlays, that a user of a device located within the boundary of the geo-fence may access or append to digital messages (e.g., SMS, email, ephemeral messages). For example, the media content may include visual content, audio content and image or media overlays associated with the location of interest. While the device is located within the geo-fenced area, a user of the device may transmit an ephemeral message that includes the media overlay (e.g., an interactive filter) associated with the location of interest.

The ephemeral message transmitted by the device may be a text, an image, a video, and the like. The access time for the ephemeral message may be set by the message sender. Alternatively, the access time may be a default setting or a setting specified by the recipient. Regardless of the setting technique, the message is transitory.

An image or media overlay may include audio and visual content and visual effects that may be applied to an image captured or provided by a user of a device. Examples of audio and visual content include pictures, texts, logos, animations, and sound effects. An example of a visual effect includes color overlaying. The audio and visual content or the visual effects can be applied to a media content item (e.g., a photo) at a client device. For example, the media overlay including text that can be overlaid on top of a photograph generated taken by the client device. In another example, the media overlay includes an identification of a location overlay (e.g., Venice Beach), a name of a live event, or a name of a merchant overlay (e.g., Beach Coffee House).

The mutable geo-fence system determines a distribution of devices that access the media content associated with the location of interest within the geo-fenced area. In some example embodiments, to determine the distribution, the mutable geo-fence system divides the geo-fenced area into a grid that comprises a set of cells, where each cell represents portions (in some instances the portions are equal) of the physical location within the geo-fenced area, and wherein the set of cells sum to make up the whole physical location encompassed by the geo-fence. The mutable geo-fence system may track and monitor the set of cells to calculate a usage metric of each cell. The usage metric of a cell among the set of cells may be calculated based on: a number of messages transmitted from devices within the cell that include the media content over a predefined period of time; a frequency in which messages that include the media content are transmitted from the cell over a predefined period of time; as well as a number of devices that access (e.g., view or receive) the media content while within the cell over a predefined period of time.

Based on the usage metrics of each cell among the set of cells, the mutable geo-fence system adjusts the boundary of the geo-fence to more accurately encompass the location of interest. For example, the mutable geo-fence system may adjust the boundary to exclude cells among the set of cells that have a usage metric below a predefined threshold value, and to include cells that have a usage metric above the predefined threshold value. In some example embodiments, the mutable geo-fence system may expand the boundary of the geo-fence when the usage metric of cells along a perimeter of the geo-fence are above a threshold value. The threshold value may be calculated based on historical, or average usage metrics associated with the geo-fenced area.

In some example embodiments, the geo-fences generated by the mutable geo-fence system are available to advertisers to deliver content (e.g., a campaign) to devices that cross into the geo-fenced area. For example, the mutable geo-fence system may calculate a value (e.g., price) of the geo-fenced area (or of a cell of the geo-fenced area) based on predicted usage metrics. The predicted usage metrics of the geo-fenced area may be based on: the calculated usage metrics of the set of cells (e.g., as discussed above); a size of the geo-fenced area; a duration of time in which the advertiser wants to use the geo-fence (e.g., one hour, one day, one week); a time period in which the advertiser wants to use the campaign (e.g., March, Saturdays, 2:00 pm-5:00 pm, etc.); as well as information indicating upcoming events (e.g., through a third party API accessed by the mutable geo-fence system).

The mutable geo-fence system may receive campaign information from an advertiser, such as a location of interest to administer the campaign, a duration and time of the campaign, campaign content (e.g., media content), as well as demographics information associated with desired recipients of the campaign. Based on the campaign information and the predicted usage metrics of the corresponding geo-fence, the mutable geo-fence system calculates a value of the geo-fenced area. In some example embodiments, the value is updated in real-time, as the mutable geo-fence system received the campaign information.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1. represents a set of executable software instructions and the corresponding hardware (e.g., memory and processor) for executing the instructions. To avoid obscuring the inventive subject matter with unnecessary detail, various functional components and engines that are not germane to conveying an understanding of the inventive subject matter have been omitted from FIG. 1. Additional functional components and engines may be used with a social messaging system, such as that illustrated in FIG. 1, to facilitate additional functionality that is not specifically described herein. Furthermore, the various functional components and engines depicted in FIG. 1 may reside on a single server computer, or may be distributed across several server computers in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface components (e.g., a web server) 140, which receive requests from various client-computing devices and servers, such as client devices 110 executing client applications 112, a mutable geo-fencing system 160, and messaging client applications 170, and third party servers 120 executing third party applications 122. In response to received requests, the interface components 140 communicate appropriate responses to requesting devices via a network 104. For example, the interface components 140 can receive requests such as Hypertext Transfer Protocol (HTTP) requests or other web-based Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™ ANDROID™, WINDOWS® PHONE). In an example, the client devices 110 are executing the client applications 112. The client applications 112 can provide functionality to present information to a user 106 and communicate via the network 104 to exchange information with the social messaging system 130. Each of the client devices 110 can comprise a computing device that includes at least a display and communication capabilities with the network 104 to access the social messaging system 130. Users 106 can include a person, a machine, or other means of interacting with the client devices 110. In some embodiments, the users 106 interact with the social messaging system 130 via the client devices 110.

As shown in FIG. 1, the data layer 128 has one or more database servers 132 that facilitate access to information storage repositories or databases 134. The databases 134 are storage devices that store data such as sets of images of external areas generated by client devices 110 and sent to social messaging system 130; sets of façade data generated from images including buildings; map data matching images and façade data to geolocations; and other such data. In one embodiment, a database stores images captured from a street and associates those images with map data. Some implementations of such an embodiment may use filters or image cropping to remove people from the images, such as an embodiment that only stores image data above a height that includes people. Databases 134 may also store data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface components 140, generate various user interfaces with data retrieved from various data sources or data services in the data layer 128. Individual application logic components 150 may be used to implement the functionality associated with various applications, services, and features of the social messaging system 130, including aspects of the mutable geo-fence system 160. For instance, a social messaging application can be implemented with one or more of the application logic components 150. The social messaging application provides a messaging mechanism for users of the client devices 110 to send and receive messages that include text and media content such as pictures and video. The client device(s) 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application server component(s) 150.

Figure 2:
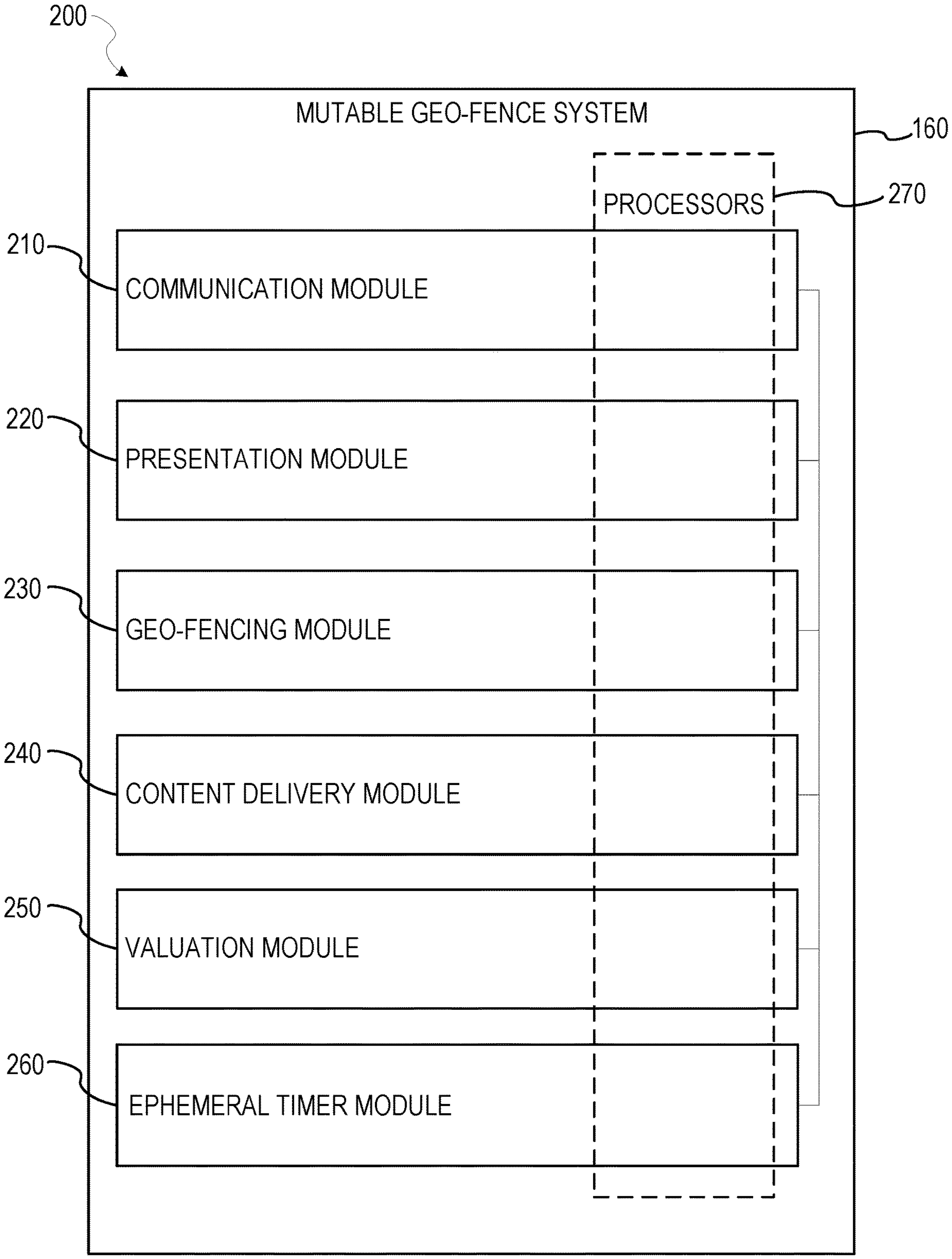
FIG. 2 is block diagram illustrating various components of a mutable geo-fence system, according to example embodiments.

FIG. 2 is a block diagram illustrating components of the mutable geo-fence system 160 that configure the mutable geo-fence system 160 to receive geo-location data to generate and manage a mutable geo-fence, according to some example embodiments. The mutable geo-fence system 160 is shown as including a communication component 210, a presentation component 220, a geo-fencing component 230, a content delivery component 240, a valuation component 250, and an ephemeral timer module 260, all configured to communicate with each other (e.g., via a bus, shared memory, or a switch). Any one or more of these components may be implemented using one or more processors 270 (e.g., by configuring such one or more processors to perform functions described for that component) and hence may include one or more of the processors 270.

Figure 3:
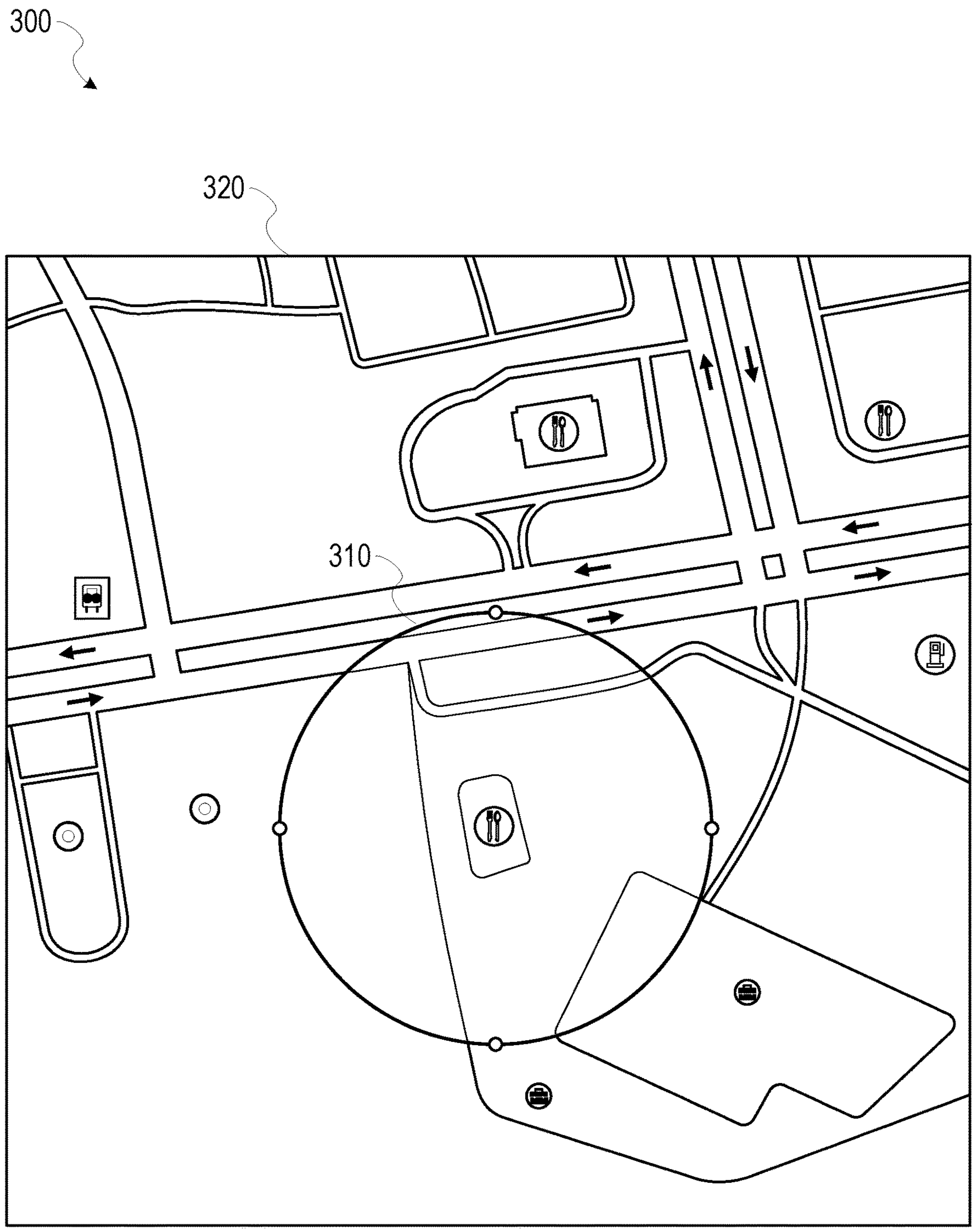
FIG. 3 is a diagram illustrating a geo-fence generated by a mutable geo-fence system, according to example embodiments.

FIG. 3 is a diagram 300 illustrating a geo-fence 310 generated by the mutable geo-fence system 160, according to example embodiments. As discussed above, the geo-fence 310 may comprise a boundary that encompasses a geographic region in a map image 320, wherein the map image 320 represents a real-world geographic region.

To generate the geo-fence 310, the communication module 210 may receive geo-location data that defines a location of interest. For example, a user 106 may provide a user input selecting a particular location of interest through a user interface displayed at a client device 110. The user input may include a selection of a point in the map image 320, or the selection of a search result from among a set of search results, wherein the search results corresponds to a location on the map image 320. The geo-fence module 230 generates the geo-fence 310, wherein a size and a location of the geo-fence 310 is based on the geo-location data.

Figure 4:
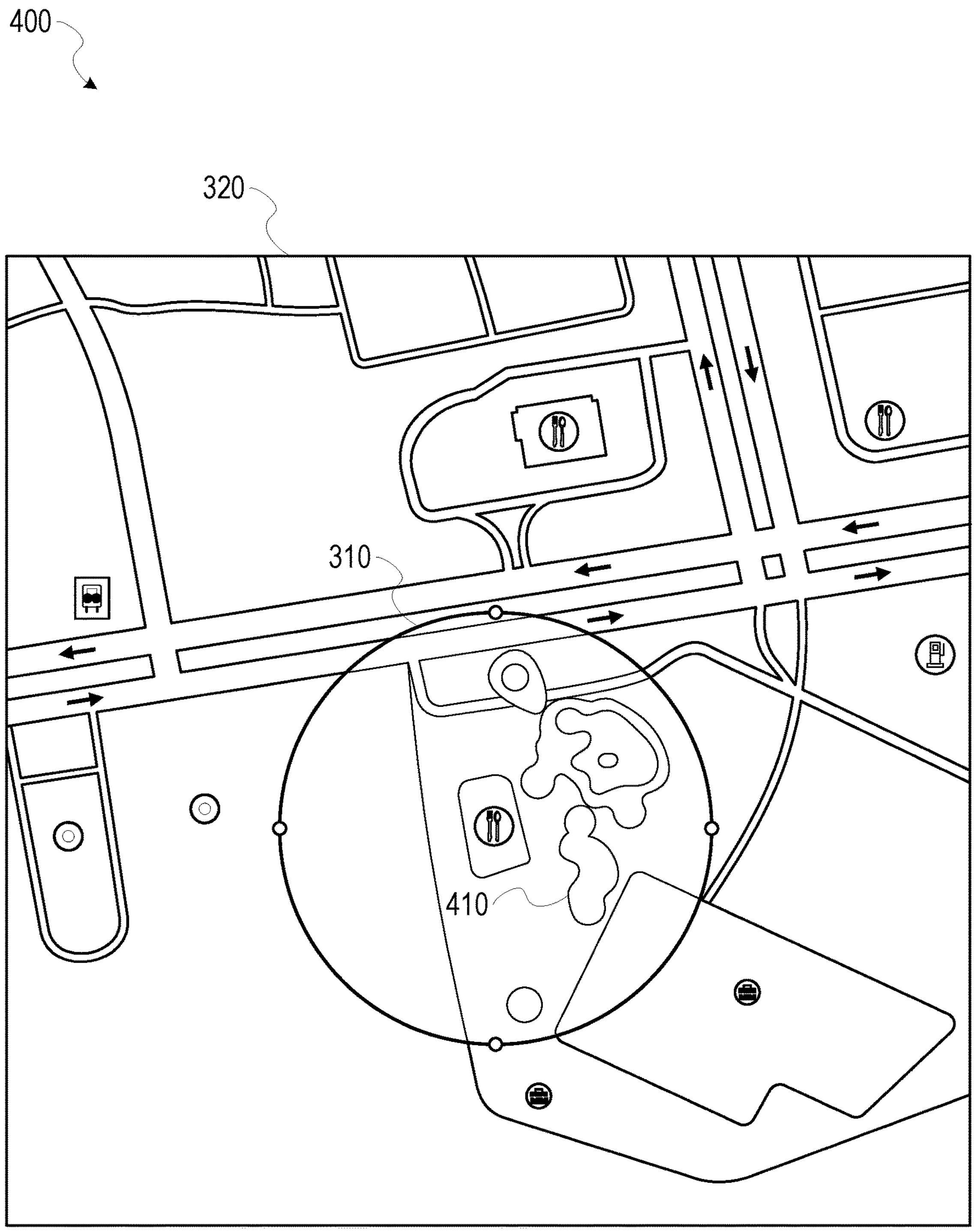
FIG. 4 is a diagram illustrating a distribution of devices within a geo-fenced area, as determined by a mutable geo-fence system, according to example embodiments.

FIG. 4 is a diagram 400 illustrating a distribution of devices 410 located within a geo-fence 310, within the map image 320, as determined by the mutable geo-fence system 160, according to example embodiments. The distribution of devices 410 may be defined as a physical density of devices within the geo-fence 310. For example, the distribution of device 410 may indicate specification physical locations of devices within the geo-fence 310.

The communication module 210 may monitor usage data of devices located within, or near, the geo-fence 310. The usage data may, for example, include: a number of messages transmitted from devices within the cell that include the media content over a predefined period of time; a frequency in which messages that include the media content are transmitted from the cell over a predefined period of time; as well as a number of devices that access (e.g., view or receive) the media content while within the cell over a predefined period of time. Based on the usage data, the geo-fence module 230 may determine the distribution of devices 410.

The usage metric of a cell among the set of cells may be calculated based on: a number of messages transmitted from devices within the cell that include the media content over a predefined period of time; a frequency in which messages that include the media content are transmitted from the cell over a predefined period of time; as well as a number of devices that access (e.g., view or receive) the media content while within the cell over a predefined period of time.

Figure 5:
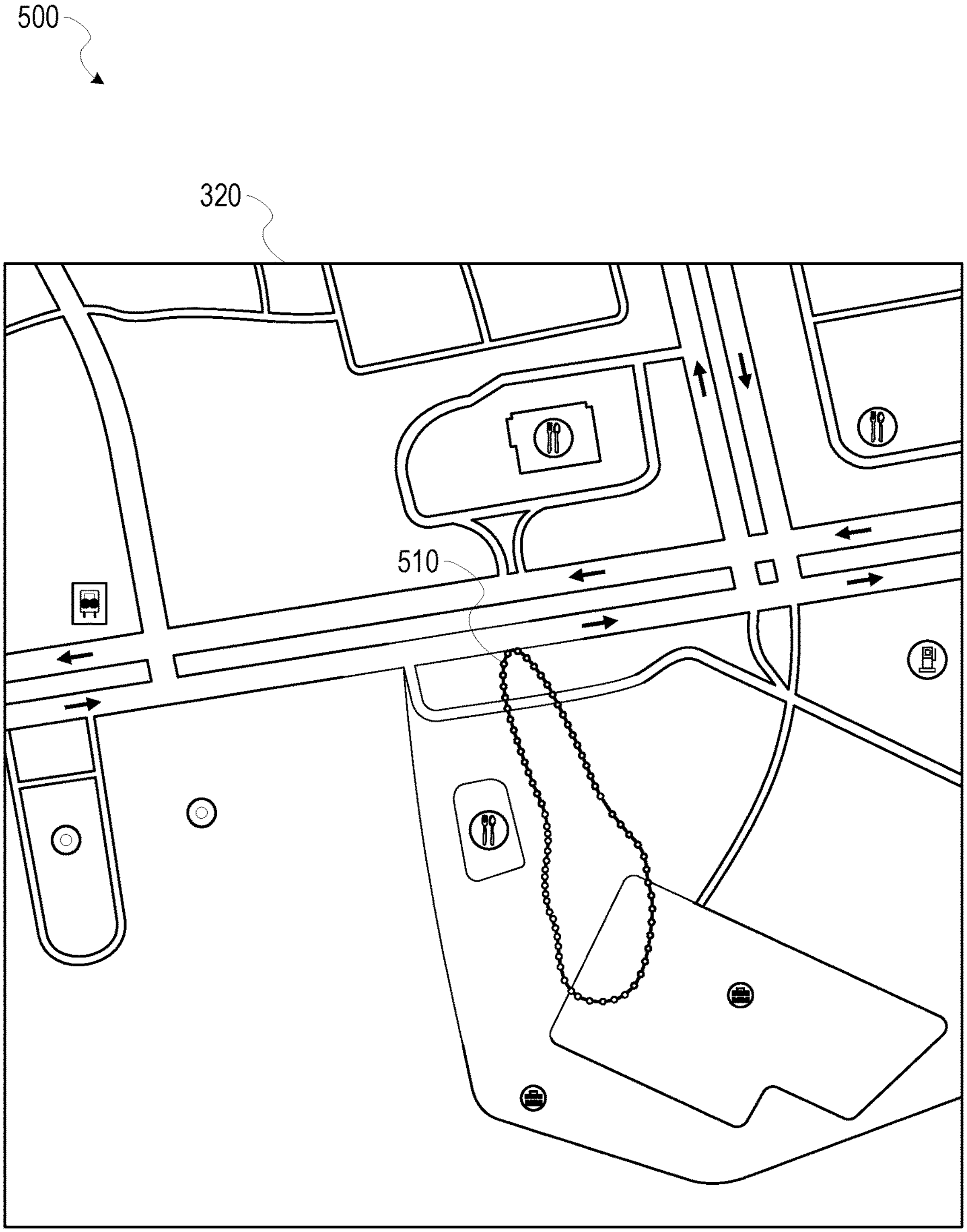
FIG. 5 is a diagram illustrating a boundary of a geo-fence, adjusted by a mutable geo-fence system, according to example embodiments.

FIG. 5 is a diagram 500 illustrating a boundary 510 of the geo-fence 310 of FIGS. 3 and 4, adjusted by the mutable geo-fence system 160, based on the distribution of devices 410, according to example method discussed herein. The geo-fence module 230 may receive the usage data to determine the distribution of devices 410, and in response, adjust the boundary of the geo-fence 310 to more accurately target devices within the geo-fences area. Although FIG. 5 depicts one enclosure formed by the mutated geo-fence, in other example embodiments, the geo-fence module 230 adjust the boundary of the geo-fence 310 such that there are multiple independent geo-fence.

Figure 6:
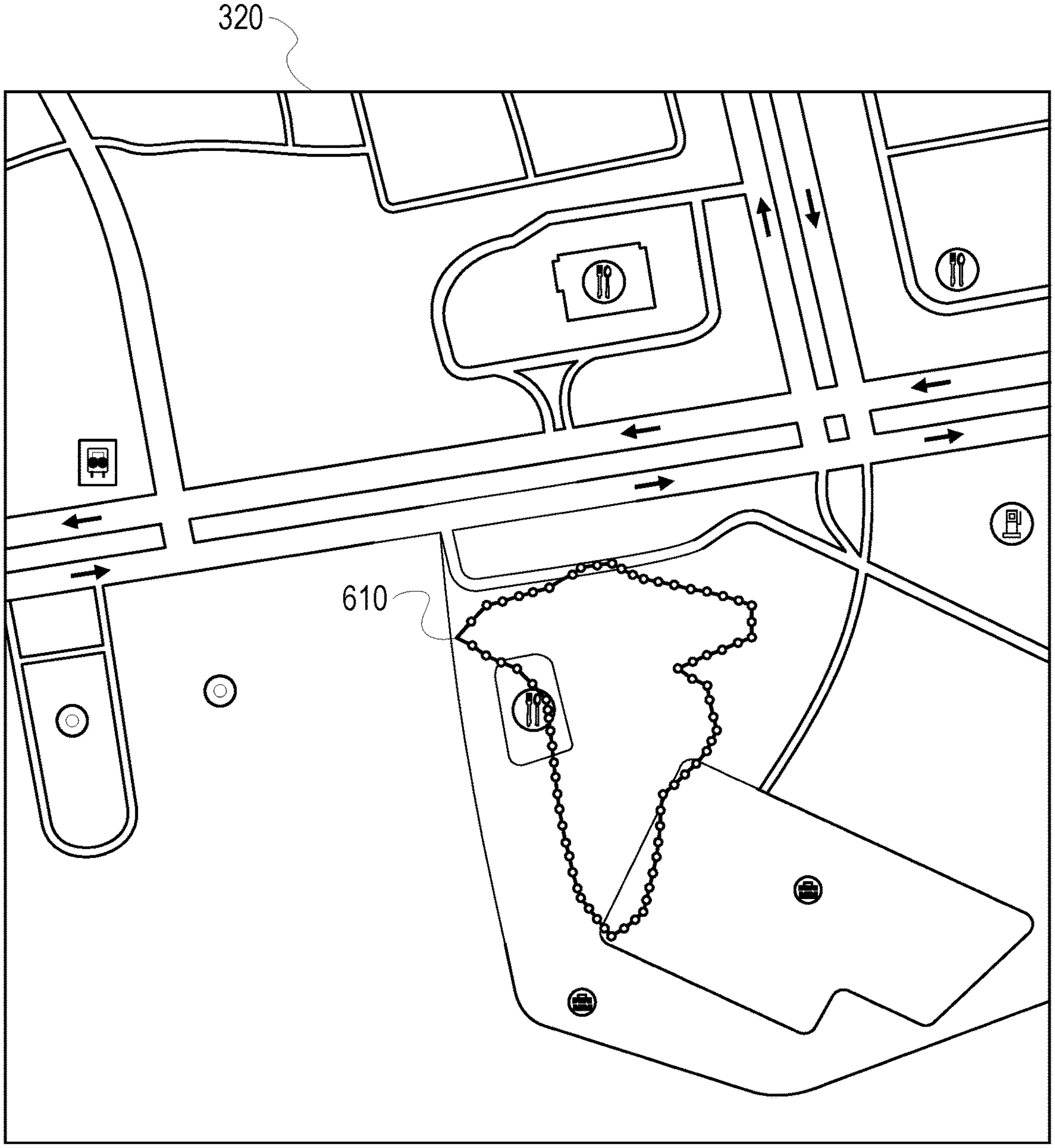
FIG. 6 is a diagram illustrating a boundary of a geo-fence, adjusted by a mutable geo-fence system, according to example embodiments.

FIG. 6 is a diagram 600 illustrating a boundary 610 of the geo-fence 310, adjusted by the mutable geo-fence system 160, according to example methods discussed herein. In some example embodiments, the geo-fence module 230 may adjust a boundary of the geo-fence 310, based on usage data collected in real-time. For example, as the communication module 210 collects usage data, the geo-fence module 230 may recalculate a distribution of devices within the geo-fenced area, and adjust the boundary 610 of the geo-fence in real-time.

In some example embodiments, the geo-fence module 230 may vary the boundary 610 of the geo-fence based on time of day. For example, the geo-fence module 230 may maintain the boundary 510 of FIG. 5 for a first period of time, and then maintain the boundary 610 for a second period of time. In some example embodiments, the periods of time may be determined based on the usage data collected by the communication module 210. Although FIGS. 3, 4, 5, and 6 depict two-dimensional geo-fences, the techniques described in this specification can be applied to three-dimensional space with geo-fences defined in three dimensions (e.g., different media content is available at the base of the Empire State Building than at the observation deck).

Figure 7:
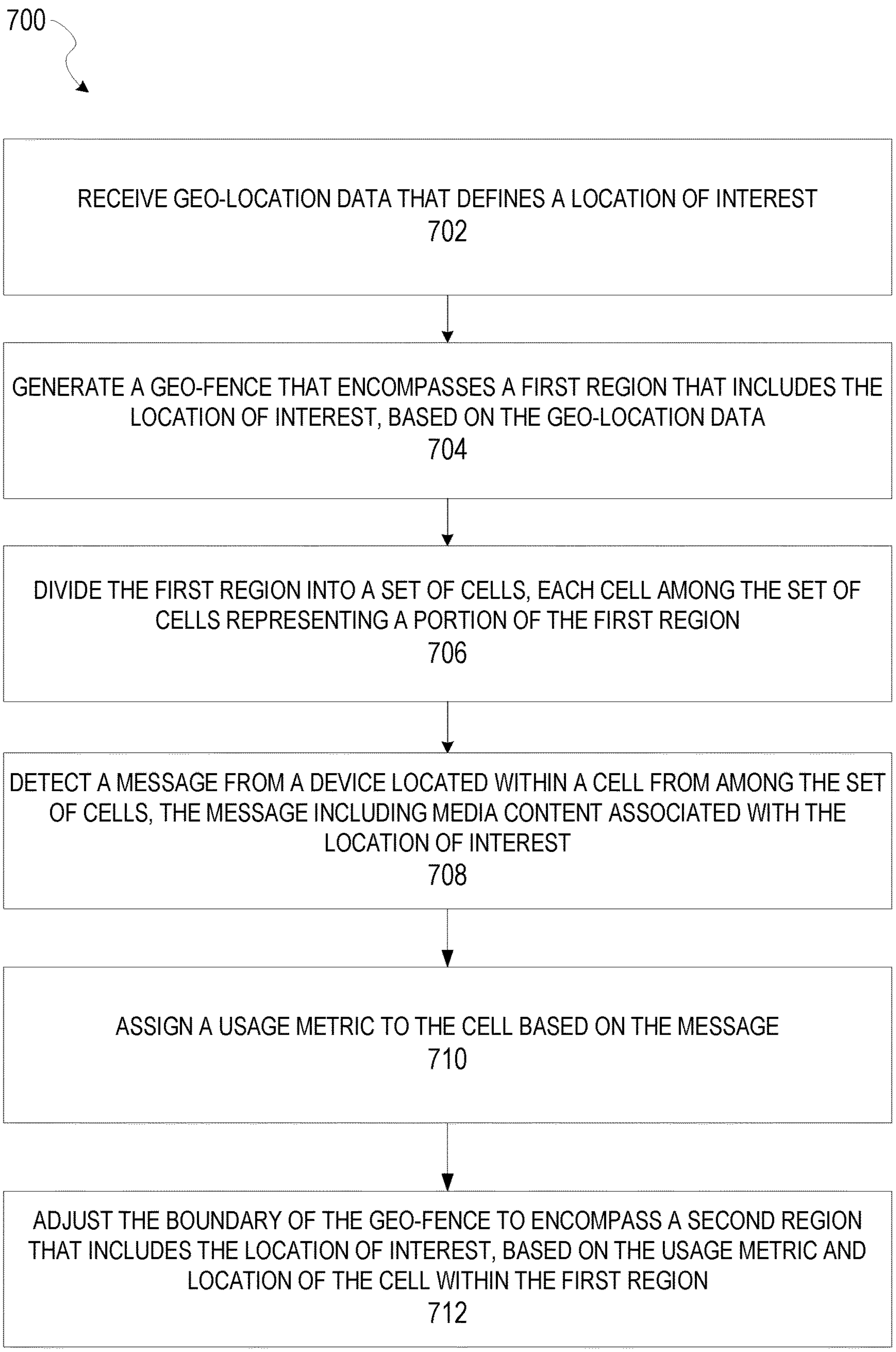
FIG. 7 is a flow diagram illustrating an example method for adjusting a boundary of a geo-fence, according to example embodiments.

FIG. 7 is a flow diagram illustrating operations of the mutable geo-fence system 160 in performing an example method 700 for adjusting a boundary of a geo-fence, according to example embodiments. As shown in FIG. 7, one or more operations 702, 704, 706, 708, 710, and 712 may be performed as part (e.g., a precursor task, a subroutine, or a portion) of the method 700, according to some example embodiments.

Operation 702 may be performed by the communication module 210. At operation 702, the communication module 210 receives geo-location data indicating a location of interest. As discussed above with respect to FIG. 3, a user 106 may provide user inputs identifying or otherwise selecting a particular location of interest through a user interface displayed at a client device 110. The user input may include a selection of a point in the map image 320, or the selection of a search result from among a set of search results, wherein the search results corresponds to a location on the map image 320. The geo-fence module 230 generates the geo-fence 310, wherein a size and a location of the geo-fence 310 is based on the geo-location data.

Operation 704 may be performed by the geo-fence module 230. At operation 704, the geo-fence module 230 generates a geo-fence that encompasses a first region that includes the region of interest, based on the geo-location data received by the communication module 210. The geo-fence generated by the geo-fence module 230 may have a corresponding size and location based on the geo-location data.

The geo-fence generated by the geo-fence module 230 may initially be over-inclusive, to capture a large region that encompasses the region of interest identified by the geo-location data. The geo-fence may be a radius around a point (e.g., the location of interest), or a set of otherwise-defined boundaries.

Operation 706 may be performed by the geo-fence module 230. At operation 706, the geo-fence module 230 divides the region encompassed by the geo-fence into a set of cells (e.g., a grid), wherein each cell among the set of cells represents a portion of the region within the geo-fence. For example, the number of cells within the region may be defined based on a size of the geo-fence, or based on user input.

Operation 708 may be performed by the communication module 210. At operation 708, the communication module 210 collects usage data from devices located within the geo-fenced area. The usage data may include corresponding geo-location data indicating a cell from among the set of cells in which the usage data originated (i.e., indicating a location of a device within the geo-fenced area). The communication module 210 may identify usage data associated with the location of interest, from among the usage data collected. For example, the communication module 210 may identify the usage data associated with the location of interest based on the message including media content associated with the location of interest encompassed by the geo-fence. For example, the usage data may include a message from a first client device located within a cell within the location of interest, wherein the message includes media content identifying the location of interest (e.g., a photo, a filter).

Operation 710 may be performed by the geo-fence module 230. At operation 710 the geo-fence module 220 calculates a usage metric based on the usage data associated with the location of interest. The usage data may for example include: a number of messages transmitted from devices within the cell that include the media content over a predefined period of time; a frequency in which messages that include the media content are transmitted from the cell over a predefined period of time; as well as a number of devices that access (e.g., view or receive) the media content while within the cell over a predefined period of time. Based on the usage data, and geo-location data indicating a cell in which a source device of the usage data is located within the geo-fence, the geo-fence module 230 may determine a distribution of devices within the geo-fenced area.

Operation 710 may be performed by the geo-fence module 230. Based on the usage data, the geo-fence module 230 calculates and assigns a usage metric to each cell among the set of cells within the region encompassed by the geo-fence. At operation 712, the geo-fence module 230 adjusts a boundary of the geo-fence based on the usage metrics of each cell among the set of cells. In some example embodiments, the geo-fence module 230 adjusts the boundary of the geo-fence based on a constraint. For example, the geo-fence module 230 may adjust the geo-fence such that it does not extend outside of the first region or extends a predetermined distance outside of the first region to prevent unintended drifting or shifts in the mutated geo-fence over time.

Figure 8:
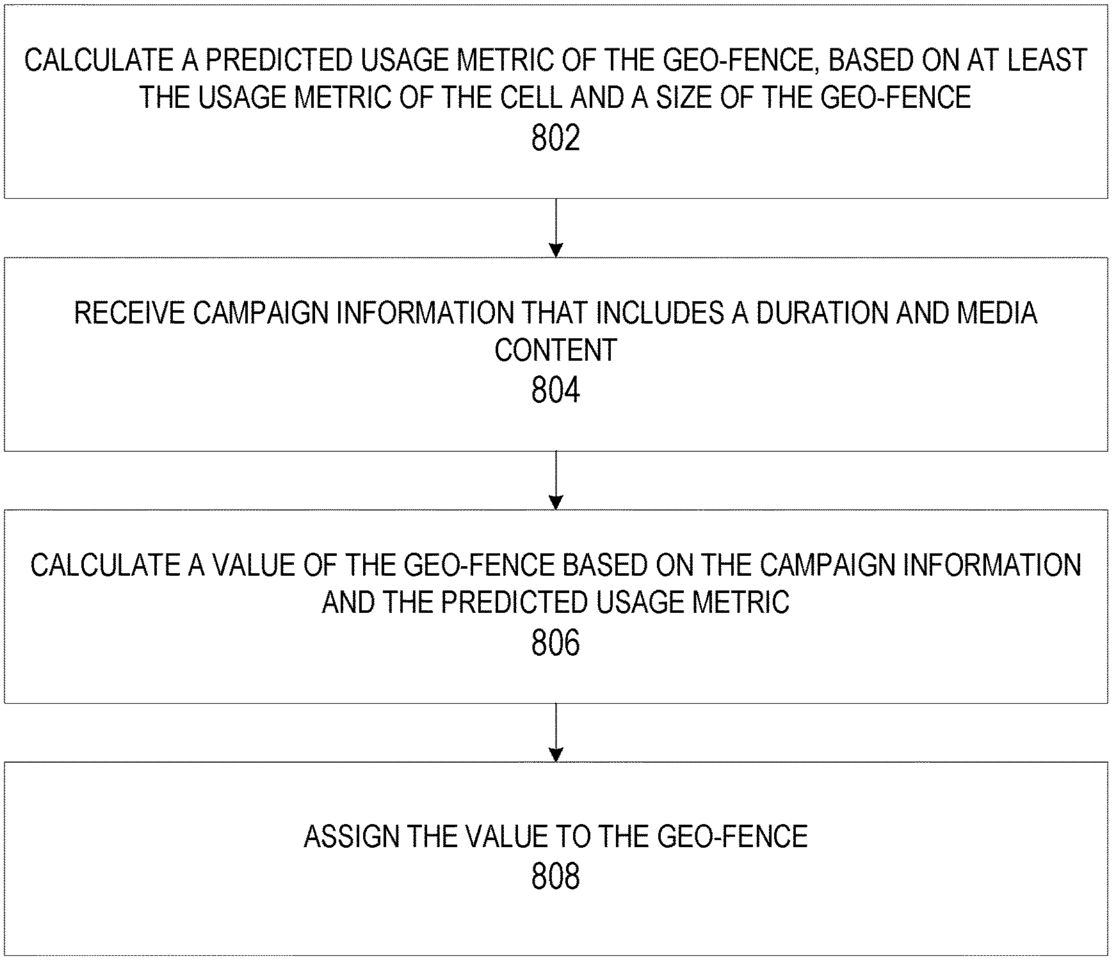
FIG. 8 is a flow diagram illustrating an example method for calculating a value of a geo-fenced area, according to example embodiments.

FIG. 8 is a flow diagram illustrating operations of the mutable geo-fence system 160 in performing an example method 800 for calculating a value of a geo-fenced area, according to example embodiments. As shown in FIG. 8, one or more operations 802, 804, 806, and 808 may be performed as part (e.g., a precursor task, a subroutine, or a portion) of the method 800, according to some example embodiments.

Operation 802 may be performed by the geo-fence module 230. At operation 802, the geo-fence module 230 calculates a usage metric of a geo-fence based on at least the usage metric of one or more cells within the geo-fence and the size and shape of the geo-fence.

For example, as discussed above with respect to FIG. 7, the communication module 210 collects usage data from devices located within the one or more cells comprising and within the geo-fence. The usage data may for example include: a number of messages transmitted from devices within the cell that include the media content over a predefined period of time; a frequency in which messages that include the media content are transmitted from the cell over a predefined period of time; access requests for media content; the type of media content being access by devices within the geo-fence and/or each cell of the geo-fence; as well as a number of devices that access (e.g., view or receive) the media content while within the cell over a predefined period of time. The geo-fence module 230 calculates a predicted usage metric of the geo-fence based on the usage data from each of the one or more cells, and the size and shape of the geo-fence.

Operation 804 may be performed by the communication module 210. At operation 210, the communication module 210 receives campaign information from a third party server 120, or a client device 110 associated with an advertiser. The campaign information may include a specification of a media content type, a duration of a campaign, as well as indications of a target audience of the campaign.

Operations 806 and 808 may be performed by the geo-fence module 230. At operation 806, the geo-fence module 230 calculates a value of the geo-fence based on the campaign information and the predicted usage metric, and at operation 808, assigns the value to the geo-fence. The value may include a fixed value over a predefined period of time (e.g., per day, per hour), or in some example embodiments may be based on a number of deliveries of media content to devices located within the geo-fence (e.g., value per 100 devices, value per device).

Figure 9:
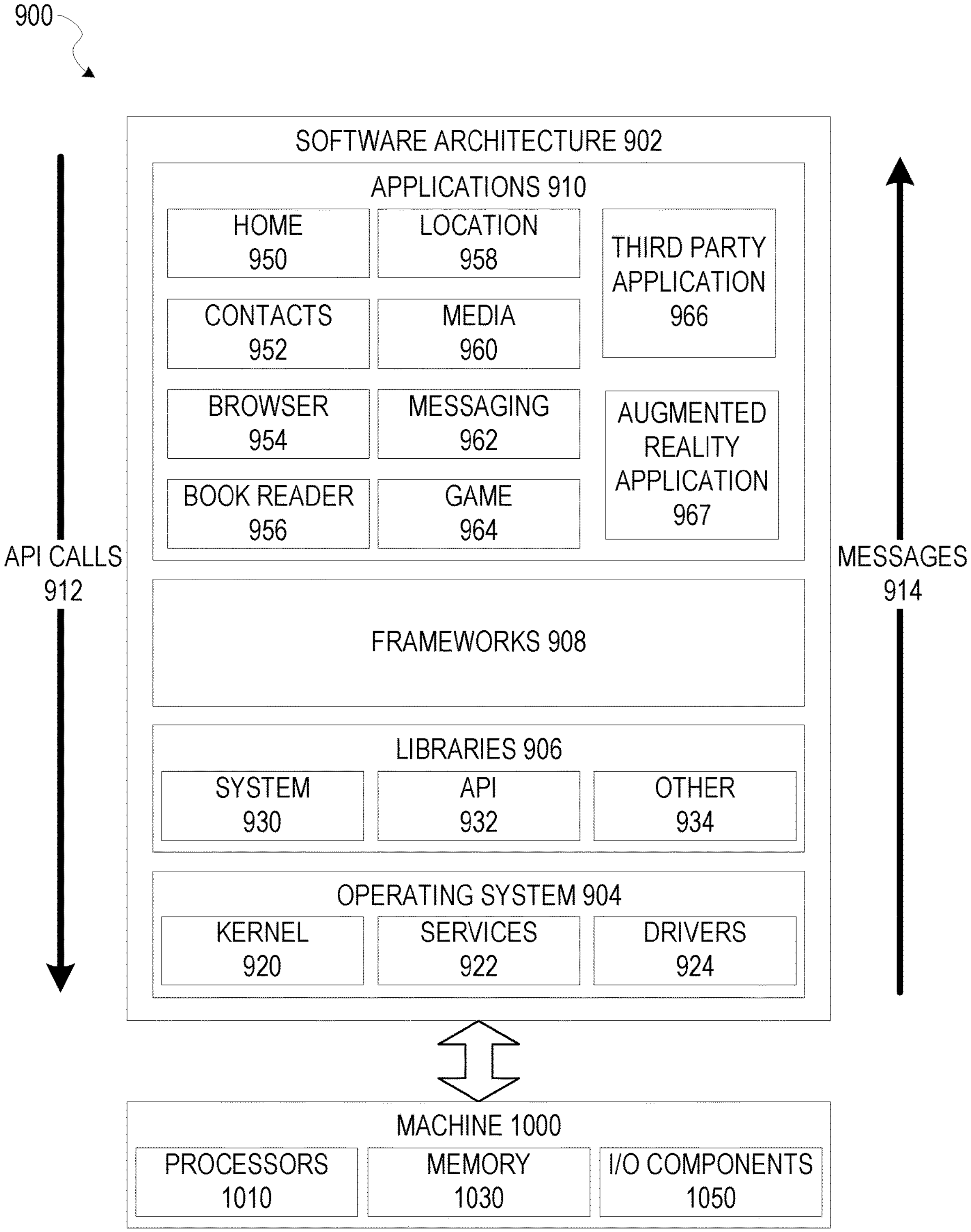
FIG. 9 is a block diagram illustrating an example of a software architecture that may be installed on a machine, according to some example embodiments.

FIG. 9 is a block diagram 900 illustrating an architecture of software 902, which can be installed on any one or more of the devices described above. FIG. 9 is merely a non-limiting example of a software architecture, and it will be appreciated that many other architectures can be implemented to facilitate the functionality described herein. In various embodiments, the software 902 is implemented by hardware such as machine 1000 of FIG. 10 that includes processors 1010, memory 1030, and I/O components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application 966 can invoke the API calls 912 provided by the operating system 904 to facilitate functionality described herein.

Figure 10:
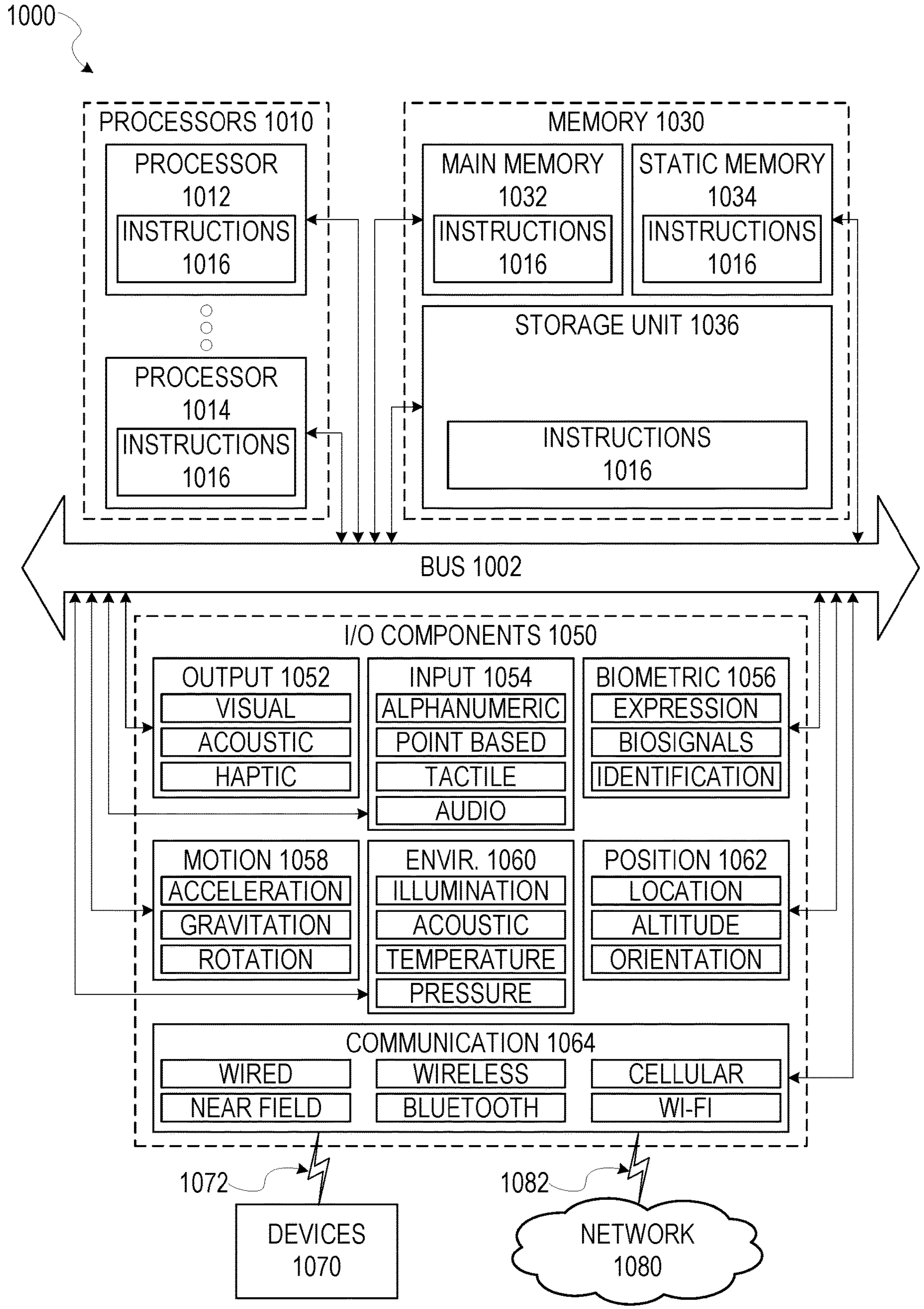
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1012 and a processor 1014 that may execute the instructions 1016. The term "processor" is intended to include multi-core processors that may comprise two or more independent processors (also referred to as "cores") that can execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown in an example embodiment to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, communication components 1064 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a Universal Serial Bus (USB)).

Moreover, in some embodiments, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting an BLUETOOTH® or NFC beacon signal that may indicate a particular location, and so forth.

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the medium should be considered as being transportable from one physical location to another. Additionally, since the machine-readable medium 1038 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016, SNAPCHAT, INC., All Rights Reserved.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A computer-implemented method comprising:

generating, by one or more processors, a geo-fence that comprises a boundary that encompasses a region that includes a location of interest;

dividing the region encompassed by the geo-fence into a set of cells, each cell among the set of cells representing an equal portion of the region;

receiving, by one or more processors, a plurality of requests to access media content associated with the location of interest located within the geo-fence from one or more devices located within the geo- fence;
identifying a subset of the one or more devices located within a cell from among the one or more cells;
determining a quantity of the subset of the one or more devices based on a portion of the plurality of requests received from the one or more devices located within the cell;
calculating a usage metric of the cell based on the portion of the plurality of requests to access the media content associated with the geo-fence, the usage metric reflecting device activity within the cell;
determining the usage metric is below a threshold value;
adjusting the boundary of the geo-fence to exclude the cell based on the usage metric of the cell being below the threshold value;
calculating a predicted usage metric of the geo-fence based on at least the usage metric of the cell and a size of the geo-fence;
receiving campaign information that includes a duration and media content;
calculating a value of the geo-fence based on the campaign information and the predicted usage metric; and
assigning the value to the geo-fence.

2. The computer-implemented method of claim 1, wherein the adjusting the boundary of the geo-fence based on the usage metric includes:
reducing the boundary of the geo-fence to exclude the cell based on the usage metric of the cell.

3. The computer-implemented method of claim 1, wherein the media content comprises one or more of image data, video data, audio data, and textual data.

4. The computer-implemented method of claim 1, wherein the calculating the usage metric of the cell based on the portion of the plurality of requests to access the media content associated with the geo-fence includes:
determining a rate of the portion of the plurality of requests; and
calculating the usage metric based on the rate.

5. The computer-implemented method of claim 1, wherein boundary of the geo- fence comprises a polygonal shape.

6. The computer-implemented method of claim 1, wherein the adjusting the boundary of the geo-fence based on the usage metric includes:
determining the usage metric is below a threshold value; and
adjusting the boundary of the geo-fence responsive to determining that the usage metric is below the threshold value.

7. The computer-implemented method of claim 6, wherein the threshold value is calculated based on historical usage metrics associated with the geo-fence.

8. A system comprising:
a memory; and
at least one hardware processor couple to the memory and comprising instructions that cause the system to perform operations comprising:
generating, by one or more processors, a geo-fence that comprises a boundary that encompasses a region that includes a location of interest;
dividing the region encompassed by the geo-fence into a set of cells, each cell among the set of cells representing an equal portion of the region;
receiving, by one or more processors, a plurality of requests to access media content associated with the location of interest located within the geo-fence from one or more devices located within the geo- fence;
identifying a subset of the one or more devices located within a cell from among the one or more cells;
determining a quantity of the subset of the one or more devices based on a portion of the plurality of requests received from the one or more devices located within the cell;
calculating a usage metric of the cell based on the portion of the plurality of requests to access the media content associated with the geo-fence, the usage metric reflecting device activity within the cell;
determining the usage metric is below a threshold value;
adjusting the boundary of the geo-fence to exclude the cell based on the usage metric of the cell being below the threshold value;
calculating a predicted usage metric of the geo-fence based on at least the usage metric of the cell and a size of the geo-fence;
receiving campaign information that includes a duration and media content;
calculating a value of the geo-fence based on the campaign information and the predicted usage metric; and
assigning the value to the geo-fence.

9. The system of claim 8, wherein the adjusting the boundary of the geo-fence based on the usage metric includes:
reducing the boundary of the geo-fence to exclude the cell based on the usage metric of the cell.

10. The system of claim 8, wherein the media content comprises one or more of image data, video data, audio data, and textual data.

11. The system of claim 8, wherein the calculating the usage metric of the cell based on the portion of the plurality of requests to access the media content associated with the geo-fence includes:
determining a rate of the portion of the plurality of requests; and
calculating the usage metric based on the rate.

12. The system of claim 8, wherein boundary of the geo-fence comprises a polygonal shape.

13. The system of claim 8, wherein the adjusting the boundary of the geo-fence based on the usage metric includes:
determining the usage metric is below a threshold value; and
adjusting the boundary of the geo-fence responsive to determining that the usage metric is below the threshold value.

14. The system of claim 13, wherein the threshold value is calculated based on historical usage metrics associated with the geo-fence.

15. A non-transitory machine-readable storage medium comprising instructions that, when executed by one or more processors of a machine, cause the machine to perform operations including:
generating, by one or more processors, a geo-fence that comprises a boundary that encompasses a region that includes a location of interest;
dividing the region encompassed by the geo-fence into a set of cells, each cell among the set of cells representing an equal portion of the region;
receiving, by one or more processors, a plurality of requests to access media content associated with the location of interest located within the geo-fence from one or more devices located within the geo- fence;

identifying a subset of the one or more devices located within a cell from among the one or more cells;

determining a quantity of the subset of the one or more devices based on a portion of the plurality of requests received from the one or more devices located within the cell;

calculating a usage metric of the cell based on the portion of the plurality of requests to access the media content associated with the geo-fence, the usage metric reflecting device activity within the cell;

determining the usage metric is below a threshold value; adjusting the boundary of the geo-fence to exclude the cell based on the usage metric of the cell being below the threshold value;

calculating a predicted usage metric of the geo-fence based on at least the usage metric of the cell and a size of the geo-fence;

receiving campaign information that includes a duration and media content;

calculating a value of the geo-fence based on the campaign information and the predicted usage metric; and assigning the value to the geo-fence.

16. The non-transitory machine-readable storage medium of claim 15, wherein the adjusting the boundary of the geo-fence based on the usage metric includes:

reducing the boundary of the geo-fence to exclude the cell based on the usage metric of the cell.

17. The non-transitory machine-readable storage medium of claim 15, wherein the media content comprises one or more of image data, video data, audio data, and textual data.

18. The non-transitory machine-readable storage medium of claim 15, wherein the calculating the usage metric of the cell based on the portion of the plurality of requests to access the media content associated with the geo-fence includes:

determining a rate of the portion of the plurality of requests; and calculating the usage metric based on the rate.

19. The non-transitory machine-readable storage medium of claim 15, wherein boundary of the geo-fence comprises a polygonal shape.

20. The non-transitory machine-readable storage medium of claim 15, wherein the adjusting the boundary of the geo-fence based on the usage metric includes:

determining the usage metric is below a threshold value; and adjusting the boundary of the geo-fence responsive to determining that the usage metric is below the threshold value.

* * * * *